(12) United States Patent
Alluboyina et al.

(10) Patent No.: US 10,817,380 B2
(45) Date of Patent: Oct. 27, 2020

(54) IMPLEMENTING AFFINITY AND ANTI-AFFINITY CONSTRAINTS IN A BUNDLED APPLICATION

(71) Applicant: Robin Systems, Inc., San Jose, CA (US)

(72) Inventors: Ravi Kumar Alluboyina, Santa Clara, CA (US); Dhanashankar Venkatesan, San Jose, CA (US)

(73) Assignee: ROBIN SYSTEMS, INC., San Jose, CA (US)

( * ) Notice: Subject to any disclaimer, the term of this patent is extended or adjusted under 35 U.S.C. 154(b) by 0 days.

(21) Appl. No.: 16/050,655

(22) Filed: Jul. 31, 2018

(65) Prior Publication Data
US 2020/0042392 A1    Feb. 6, 2020

(51) Int. Cl.
*G06F 11/14* (2006.01)
*H04L 12/24* (2006.01)
(Continued)

(52) U.S. Cl.
CPC ...... *G06F 11/1435* (2013.01); *G06F 9/45558* (2013.01); *G06F 9/5033* (2013.01);
(Continued)

(58) Field of Classification Search
CPC .. G06F 11/1435; G06F 11/1464; G06F 16/27; G06F 9/45558; G06F 9/5077;
(Continued)

(56) References Cited

U.S. PATENT DOCUMENTS

| 4,310,883 A | 1/1982 | Clifton |
| 5,602,993 A | 2/1997 | Stromberg |

(Continued)

FOREIGN PATENT DOCUMENTS

WO    WO2017008675    1/2017

OTHER PUBLICATIONS

Segment map (Continued)

*Primary Examiner* — Hiep T Nguyen
(74) *Attorney, Agent, or Firm* — David R. Stevens; Stevens Law Group

(57) ABSTRACT

A new snapshot of a storage volume is created by suppressing write requests. Once pending write requests from the computing nodes are completed, storage nodes create a new snapshot for the storage volume by allocating a new segment to the new snapshot. Subsequent write requests to the storage volume are then performed on the segments allocated to the new snapshot. An orchestration layer implements a bundled application that is provisioned with storage volumes and containers. A snapshot of the application may be created and used to rollback or clone the application. The amount of processing cores, memory, and containers may be increased or decreased based on usage. Components of the bundled application may be assigned to nodes to satisfy affinity and anti-affinity rules. Device sets may be generated according to these rules and used to plan for the assignment of storage volumes and containers of the bundled application.

20 Claims, 29 Drawing Sheets

(51) Int. Cl.
*G06F 9/50* (2006.01)
*G06F 9/455* (2018.01)
*G06F 16/27* (2019.01)

(52) U.S. Cl.
CPC ........ *G06F 9/5077* (2013.01); *G06F 11/1464* (2013.01); *G06F 16/27* (2019.01); *H04L 41/0806* (2013.01); *H04L 41/0873* (2013.01); *H04L 41/0893* (2013.01); *G06F 2201/84* (2013.01); *G06F 2209/506* (2013.01)

(58) Field of Classification Search
CPC ............... G06F 9/5033; G06F 2201/84; G06F 2209/506; H04L 41/0873; H04L 41/0893; H04L 41/0806
See application file for complete search history.

(56) References Cited

U.S. PATENT DOCUMENTS

| | | |
|---|---|---|
| 6,014,669 A | 1/2000 | Slaughter |
| 6,052,797 A | 4/2000 | Ofek |
| 6,119,214 A | 9/2000 | Dirks |
| 6,157,963 A | 12/2000 | Courtright, II |
| 6,161,191 A | 12/2000 | Slaughter |
| 6,298,478 B1 | 10/2001 | Nally |
| 6,301,707 B1 | 10/2001 | Carroll |
| 6,311,193 B1 | 10/2001 | Sekido |
| 6,851,034 B2 | 2/2005 | Challenger |
| 6,886,160 B1 | 4/2005 | Lee |
| 6,895,485 B1 | 5/2005 | Dekoning |
| 6,957,221 B1 | 10/2005 | Hart |
| 7,096,465 B1 | 8/2006 | Dardinski |
| 7,111,055 B2 | 9/2006 | Falkner |
| 7,171,659 B2 | 1/2007 | Becker |
| 7,246,351 B2 | 7/2007 | Bloch |
| 7,305,671 B2 | 12/2007 | Davidov |
| 7,461,374 B1 | 12/2008 | Balint |
| 7,590,620 B1 | 9/2009 | Pike |
| 7,698,698 B2 | 4/2010 | Skan |
| 7,721,283 B2 | 5/2010 | Kovachka |
| 7,734,859 B2 | 6/2010 | Daniel |
| 7,738,457 B2 | 6/2010 | Nordmark |
| 7,779,091 B2 | 8/2010 | Wilkinson |
| 7,797,693 B1 | 9/2010 | Gustafson |
| 7,984,485 B1 | 7/2011 | Rao |
| 8,037,471 B2 | 10/2011 | Keller |
| 8,121,874 B1 | 2/2012 | Guheen |
| 8,171,141 B1 | 5/2012 | Offer |
| 8,219,821 B2 | 7/2012 | Zimmels |
| 8,261,295 B1 | 9/2012 | Risbood |
| 8,326,883 B2 | 12/2012 | Pizzorni |
| 8,392,498 B2 | 3/2013 | Berg |
| 8,429,346 B1 | 4/2013 | Chen |
| 8,464,241 B2 | 6/2013 | Hayton |
| 8,505,003 B2 | 8/2013 | Bowen |
| 8,527,544 B1 | 9/2013 | Colgrove |
| 8,601,467 B2 | 12/2013 | Hofhansl |
| 8,620,973 B1 | 12/2013 | Veeraswamy |
| 8,666,933 B2 | 3/2014 | Pizzorni |
| 8,745,003 B2 | 6/2014 | Patterson |
| 8,775,751 B1 | 7/2014 | Pendharkar |
| 8,782,632 B1 | 7/2014 | Chigurapati |
| 8,788,634 B2 | 7/2014 | Krig |
| 8,832,324 B1 | 9/2014 | Hodges |
| 8,886,806 B2 | 11/2014 | Tung |
| 8,909,885 B2 | 12/2014 | Corbett |
| 8,966,198 B1 | 2/2015 | Harris |
| 9,134,992 B2 | 9/2015 | Wong |
| 9,146,769 B1 | 9/2015 | Shankar |
| 9,148,465 B2 | 9/2015 | Gambardella |
| 9,152,337 B2 | 10/2015 | Kono |
| 9,167,028 B1 | 10/2015 | Bansal |
| 9,280,591 B1 | 3/2016 | Kharatishvili |
| 9,330,155 B1 | 5/2016 | Bono |
| 9,336,060 B2 | 5/2016 | Nori |
| 9,342,444 B2 | 5/2016 | Minckler |
| 9,367,301 B1 | 6/2016 | Serrano |
| 9,436,693 B1 | 9/2016 | Lockhart |
| 9,521,198 B1 | 12/2016 | Agarwala |
| 9,569,274 B2 | 2/2017 | Tarta |
| 9,600,193 B2 | 3/2017 | Ahrens |
| 9,619,389 B1 | 4/2017 | Roug |
| 9,635,132 B1 | 4/2017 | Lin |
| 9,667,470 B2 | 5/2017 | Prathipati |
| 9,747,096 B1 | 8/2017 | Searlee |
| 9,870,366 B1 | 1/2018 | Duan |
| 9,892,265 B1 | 2/2018 | Tripathy |
| 9,998,955 B1 | 6/2018 | MacCarthaigh |
| 10,019,459 B1 | 7/2018 | Agarwala |
| 10,042,628 B2 | 8/2018 | Thompson |
| 10,061,520 B1 | 8/2018 | Zhao |
| 10,191,778 B1 | 1/2019 | Yang |
| 10,241,774 B2 | 3/2019 | Spivak |
| 10,282,229 B2 | 5/2019 | Wagner |
| 10,353,634 B1 | 7/2019 | Greenwood |
| 10,430,434 B2 | 10/2019 | Sun |
| 2004/0153703 A1 | 8/2004 | Vigue |
| 2004/0221125 A1 | 11/2004 | Ananthanarayanan |
| 2005/0065986 A1 | 3/2005 | Bixby |
| 2005/0216895 A1 | 9/2005 | Tran |
| 2006/0085674 A1 | 4/2006 | Ananthamurthy |
| 2007/0006015 A1 | 1/2007 | Rao |
| 2007/0067583 A1 | 3/2007 | Zohar |
| 2007/0260842 A1 | 11/2007 | Faibish |
| 2007/0277056 A1 | 11/2007 | Varadarajan |
| 2007/0288791 A1 | 12/2007 | Allen |
| 2008/0068899 A1 | 3/2008 | Ogihara |
| 2008/0189468 A1 | 8/2008 | Schmidt |
| 2008/0270592 A1 | 10/2008 | Choudhary |
| 2009/0144497 A1 | 6/2009 | Withers |
| 2009/0172335 A1 | 7/2009 | Kulkarni |
| 2009/0307249 A1 | 12/2009 | Koifman |
| 2010/0161941 A1 | 6/2010 | Vyshetsky |
| 2010/0162233 A1* | 6/2010 | Ku .............................. G06F 8/60 717/178 |
| 2010/0211815 A1 | 8/2010 | Mankovskii |
| 2010/0274984 A1 | 10/2010 | Inomata |
| 2010/0299309 A1 | 11/2010 | Maki |
| 2010/0306495 A1 | 12/2010 | Kumano |
| 2010/0332730 A1 | 12/2010 | Royer |
| 2011/0083126 A1 | 4/2011 | Bhakta |
| 2011/0188506 A1 | 8/2011 | Arribas |
| 2011/0208928 A1 | 8/2011 | Chandra |
| 2011/0246420 A1 | 10/2011 | Wang |
| 2011/0276951 A1 | 11/2011 | Jain |
| 2012/0005557 A1 | 1/2012 | Mardiks |
| 2012/0066449 A1 | 3/2012 | Colgrove |
| 2012/0102369 A1 | 4/2012 | Hiltunen |
| 2012/0216052 A1 | 8/2012 | Dunn |
| 2012/0226667 A1 | 9/2012 | Volvovski |
| 2012/0240012 A1 | 9/2012 | Weathers |
| 2012/0265976 A1 | 10/2012 | Spiers |
| 2012/0311671 A1 | 12/2012 | Wood |
| 2012/0331113 A1 | 12/2012 | Jain |
| 2013/0054552 A1 | 2/2013 | Hawkins |
| 2013/0054932 A1 | 2/2013 | Acharya |
| 2013/0080723 A1 | 3/2013 | Sawa |
| 2013/0282662 A1 | 10/2013 | Kumarasamy |
| 2013/0339659 A1 | 12/2013 | Bybell |
| 2013/0346709 A1 | 12/2013 | Wang |
| 2014/0006465 A1 | 1/2014 | Davis |
| 2014/0047263 A1 | 2/2014 | Coatney |
| 2014/0047341 A1 | 2/2014 | Breternitz |
| 2014/0047342 A1 | 2/2014 | Breternitz |
| 2014/0058871 A1 | 2/2014 | Marr |
| 2014/0059527 A1 | 2/2014 | Gagliardi |
| 2014/0059528 A1 | 2/2014 | Gagliardi |
| 2014/0108483 A1 | 4/2014 | Tarta |
| 2014/0130040 A1 | 5/2014 | Lemanski |
| 2014/0195847 A1 | 7/2014 | Webman |
| 2014/0245319 A1 | 8/2014 | Fellows |
| 2014/0282596 A1 | 9/2014 | Bourbonnais |
| 2015/0046644 A1 | 2/2015 | Karp |

(56) References Cited

U.S. PATENT DOCUMENTS

| | | |
|---|---|---|
| 2015/0067031 A1 | 3/2015 | Acharya |
| 2015/0074358 A1 | 3/2015 | Flinsbaugh |
| 2015/0112951 A1 | 4/2015 | Narayanamurthy et al. |
| 2015/0134857 A1 | 5/2015 | Hahn |
| 2015/0149605 A1 | 5/2015 | de la Iglesia |
| 2015/0186217 A1 | 7/2015 | Eslami |
| 2015/0278333 A1 | 10/2015 | Hirose |
| 2015/0326481 A1 | 11/2015 | Rector |
| 2015/0379287 A1 | 12/2015 | Mathur |
| 2016/0011816 A1 | 1/2016 | Aizman |
| 2016/0042005 A1 | 2/2016 | Liu |
| 2016/0124775 A1 | 5/2016 | Ashtiani |
| 2016/0197995 A1 | 7/2016 | Lu |
| 2016/0259597 A1 | 9/2016 | Worley |
| 2016/0283261 A1 | 9/2016 | Nakatsu |
| 2016/0357456 A1 | 12/2016 | Iwasaki |
| 2016/0357548 A1 | 12/2016 | Stanton |
| 2017/0060710 A1 | 3/2017 | Ramani |
| 2017/0060975 A1 | 3/2017 | Akyureklier |
| 2017/0149843 A1 | 5/2017 | Amulothu |
| 2017/0168903 A1 | 6/2017 | Dornemann |
| 2017/0192889 A1 | 7/2017 | Sato |
| 2017/0214550 A1 | 7/2017 | Kumar |
| 2017/0235649 A1 | 8/2017 | Shah |
| 2017/0242719 A1 | 8/2017 | Tsirkin |
| 2017/0244557 A1 | 8/2017 | Riel |
| 2017/0244787 A1 | 8/2017 | Rangasamy |
| 2017/0322954 A1 | 11/2017 | Horowitz |
| 2017/0337492 A1 | 11/2017 | Chen |
| 2017/0371551 A1 | 12/2017 | Sachdev |
| 2018/0006896 A1 | 1/2018 | MacNamara |
| 2018/0024889 A1 | 1/2018 | Verma |
| 2018/0046553 A1 | 2/2018 | Okamoto |
| 2018/0082053 A1 | 3/2018 | Brown |
| 2018/0107419 A1 | 4/2018 | Sachdev |
| 2018/0113625 A1 | 4/2018 | Sancheti |
| 2018/0113770 A1 | 4/2018 | Hasanov |
| 2018/0136931 A1 | 5/2018 | Hendrich |
| 2018/0137306 A1 | 5/2018 | Brady |
| 2018/0159745 A1 | 6/2018 | Byers |
| 2018/0165170 A1 | 6/2018 | Hegdal |
| 2018/0218000 A1 | 8/2018 | Setty |
| 2018/0246745 A1 | 8/2018 | Aronovich |
| 2018/0247064 A1 | 8/2018 | Aronovich |
| 2018/0276215 A1 | 9/2018 | Chiba |
| 2018/0285164 A1 | 10/2018 | Hu |
| 2018/0285223 A1 | 10/2018 | McBride |
| 2018/0285353 A1 | 10/2018 | Ramohalli |
| 2018/0287883 A1 | 10/2018 | Joshi |
| 2018/0302335 A1 | 10/2018 | Gao |
| 2018/0329981 A1 | 11/2018 | Gupte |
| 2018/0364917 A1 | 12/2018 | Ki |
| 2018/0375728 A1 | 12/2018 | Gangil |
| 2019/0065061 A1 | 2/2019 | Kim |
| 2019/0065323 A1 | 2/2019 | Dhamdhere |
| 2019/0073132 A1 | 3/2019 | Zhou |
| 2019/0073372 A1 | 3/2019 | Venkatesan |
| 2019/0079928 A1 | 3/2019 | Kumar |
| 2019/0089651 A1 | 3/2019 | Pignataro |
| 2019/0109756 A1 | 4/2019 | Abu Lebdeh |
| 2019/0156023 A1 | 5/2019 | Gerebe |
| 2019/0163460 A1 | 5/2019 | Kludy |
| 2019/0188094 A1 | 6/2019 | Ramamoorthi |
| 2019/0190803 A1 | 6/2019 | Joshi |
| 2019/0199601 A1 | 6/2019 | Lynar |
| 2019/0213085 A1* | 7/2019 | Alluboyina ......... G06F 11/1464 |
| 2019/0215313 A1 | 7/2019 | Doshi |
| 2019/0220266 A1 | 7/2019 | Doshi |
| 2019/0220315 A1* | 7/2019 | Vallala .................. G06F 9/455 |
| 2019/0235895 A1 | 8/2019 | Ovesea |
| 2019/0250849 A1 | 8/2019 | Compton |
| 2019/0278624 A1 | 9/2019 | Bade |
| 2019/0324666 A1 | 10/2019 | Kusters |
| 2020/0019414 A1 | 1/2020 | Byard |
| 2020/0034193 A1 | 1/2020 | Jayaram |
| 2020/0083909 A1 | 3/2020 | Kusters |

OTHER PUBLICATIONS

Fast and Secure Append-Only storage with Infinite Capacity, Zheng.
User Mode and Kernel Mode, Microsoft.
Implementing time critical functionalities with a distributed adaptive container architecture, Stankovski.
Precise memory leak detection for java software using container profiling, Xu.
Segment map, Google, Feb. 4, 2019.
Fast and Secure Append-Only storage with Infinite Capacity, Zheng, Aug. 27, 2003.
User Mode and Kernel Mode, Microsoft, Apr. 19, 2017.
Precise memory leak detection for java software using container profiling, Xu, Jul. 2013.
Mogi et al., "Dynamic Parity Stripe Reorganizations for RAID5 Disk Arrays," 1994, IEEE, pp. 17-26.
Syed et al, "The Container Manager Pattern", ACM, pp. 1-9 (Year 2017).
Rehmann et al., "Performance of Containerized Database Management Systems", ACM, pp. 1-6 (Year 2018).
Awada et al, " Improving Resource Efficiency of Container-instance Clusters on Clouds", IEEE, pp. 929-934 (Year 2017).
Stankovski et al, "Implementing Time—Critical Functionalities with a Distributed Adaptive Container Architecture", ACM, pp. 1-5 (Year 2016).
Dhakate et al, "Distributed Cloud Monitoring Using Docker as Next Generation Container Virtualization Technology" IEEE, pp. 1-5 (Year 2015).
Crameri et al, "Staged Deployment in Mirage, an Integrated Software Upgrade Testing and Distribution System", ACM, pp. 221-236 (Year: 2007).
Cosmo et al, "Packages Upgrades in FOSS Distributions: Details and Challenges", AMC, pp. 1-5 (Year: 2008).
Burg et al, "Atomic Upgrading of Distributed Systems", ACM, pp. 1-5 (Year: 2008).
Souer et al, "Component Based Architecture forWeb Content Management: Runtime Deployable Web Manager Component Bundles", IEEE, pp. 366-369 (Year: 2008).
Weingartner et al, "A distributed autonomic management framework for cloud computing orchestration." in 2016 IEEE World Congress on Services (Year: 2016).

* cited by examiner

IMPLEMENTING AFFINITY AND ANTI-AFFINITY CONSTRAINTS IN A BUNDLED APPLICATION

BACKGROUND

Field of the Invention

This invention relates to orchestration of roles in an application instantiated in a distributed storage and computation system.

Background of the Invention

In many contexts, it is helpful to be able to return a database to an original state or some intermediate state. In this manner, changes to software or other database configuration parameters may be tested without fear of corrupting critical data.

The systems and methods disclosed herein provide an improved approach for creating snapshots of a database and returning to a previous snapshot.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
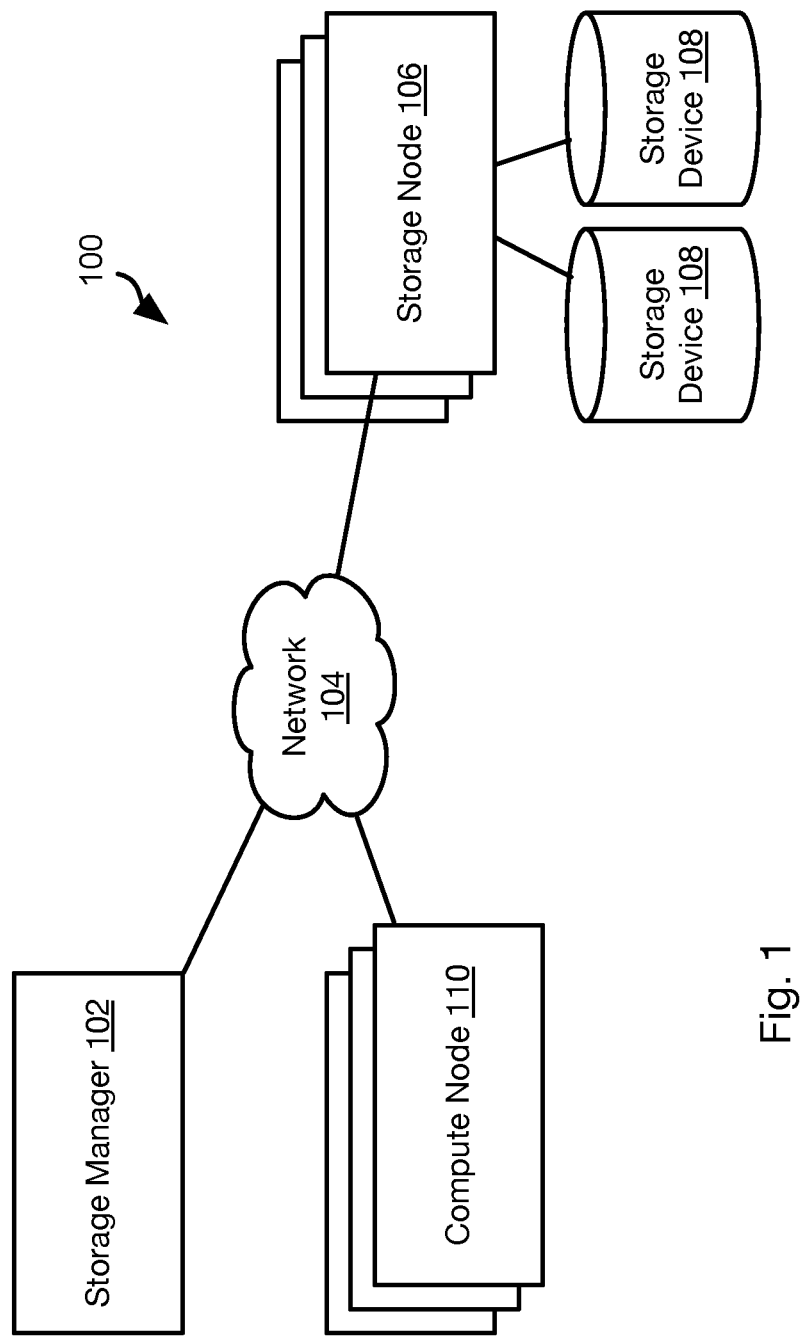
FIG. 1 is a schematic block diagram of a network environment for implementing methods in accordance with an embodiment of the present invention.

Referring to FIG. 1, the methods disclosed herein may be performed using the illustrated network environment 100. The network environment 100 includes a storage manager 102 that coordinates the creation of snapshots of storage volumes and maintains records of where snapshots are stored within the network environment 100. In particular, the storage manager 102 may be connected by way of a network 104 to one or more storage nodes 106, each storage node having one or more storage devices 108, e.g. hard disk drives, flash memory, or other persistent or transitory memory. The network 104 may be a local area network (LAN), wide area network (WAN), or any other type of network including wired, fireless, fiber optic, or any other type of network connections.

One or more compute nodes 110 are also coupled to the network 104 and host user applications that generate read and write requests with respect to storage volumes managed by the storage manager 102 and stored within the memory devices 108 of the storage nodes 108.

The methods disclosed herein ascribe certain functions to the storage manager 102, storage nodes 106, and compute node 110. The methods disclosed herein are particularly useful for large scale deployment including large amounts of data distributed over many storage nodes 106 and accessed by many compute nodes 110. However, the methods disclosed herein may also be implemented using a single computer implementing the functions ascribed herein to some or all of the storage manager 102, storage nodes 106, and compute node 110.

Figure 2:
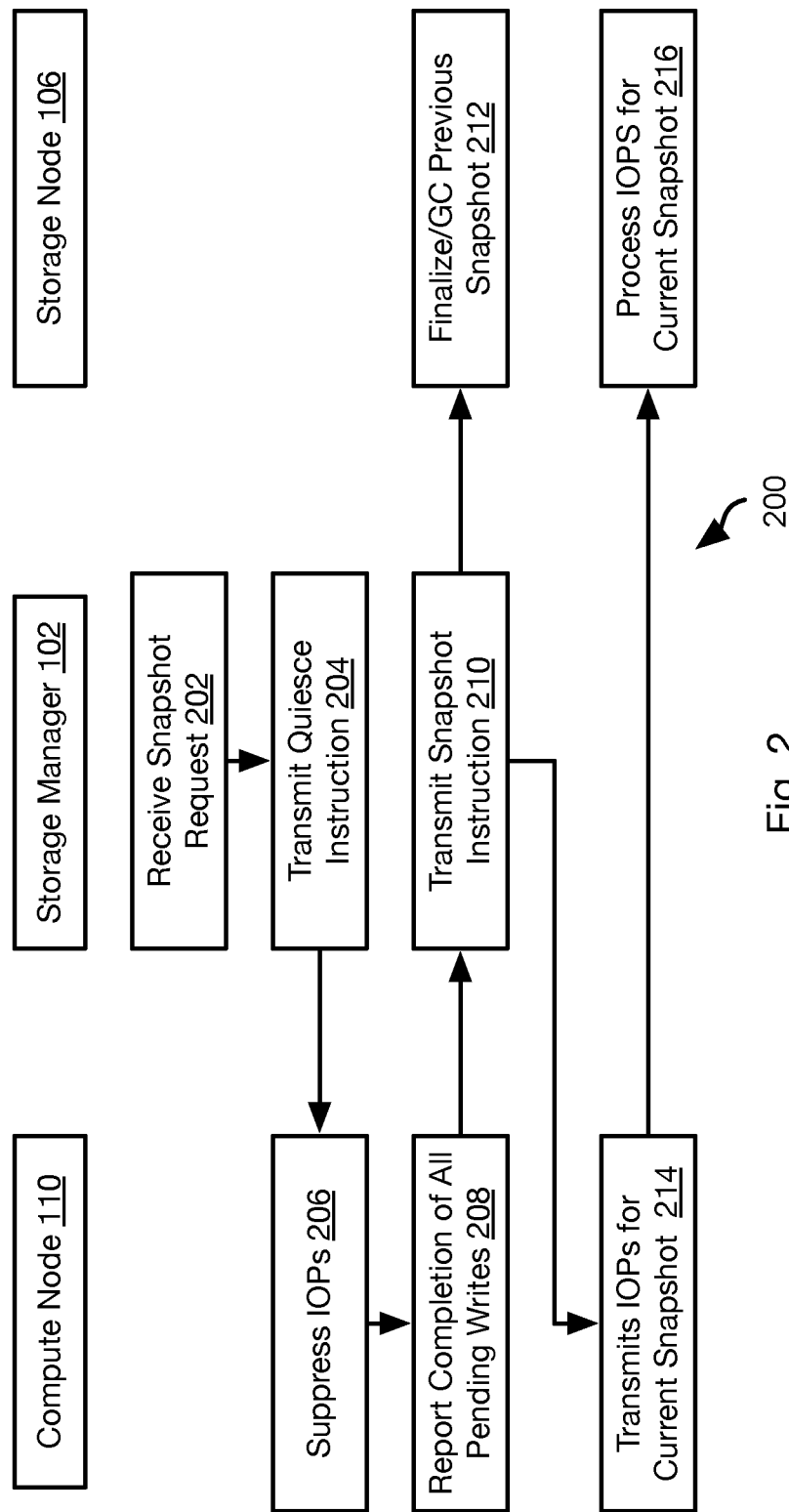
FIG. 2 is a process flow diagram of a method for coordinating snapshot creation with compute nodes and storage nodes in accordance with an embodiment of the present invention.

Referring to FIG. 2, the illustrated method 200 may be performed in order to invoke the creation of a new snapshot. Other than a current snapshot, which is still subject to change, a snapshot captures the state of a storage volume at a moment in time and is preferably not altered in response to subsequent writes to the storage volume.

The method 200 includes receiving, by the storage manager 102 a request to create a new snapshot for a storage volume. A storage volume as referred to herein may be a virtual storage volume that may divided into individual slices. For example, storage volumes as described herein may be 1 TB and be divided into 1 GB slices. In general, a slice and its snapshot are stored on a single storage node 106, whereas a storage volume may have the slices thereof stored by multiple storage nodes 106.

The request received at step 202 may be received from a human operator or generated automatically, such as according to backup scheduler executing on the storage manager 102 or some other computing device. The subsequent steps of the method 200 may be executed in response to receiving 202 the request The method 200 may include transmitting 204 a quiesce instruction to all compute nodes 110 that are associated with the storage volume. For example, all compute nodes 110 that have pending write requests to the storage volume. In some embodiments, the storage manager 102 may store a mapping of compute nodes 110 to a particular storage volume used by the compute nodes 110. Accordingly, step 204 may include sending 204 the quiesce instruction to all of these compute nodes. Alternatively, the instruction may be transmitted 204 to all compute nodes 110 and include an identifier of the storage volume. The compute nodes 110 may then suppress any write instructions referencing that storage volume.

The quiesce instruction instructs the compute nodes 110 that receive it to suppress 206 transmitting write requests to the storage nodes 106 for the storage volume referenced by the quiesce instruction. The quiesce instruction may further cause the compute nodes 110 that receive it to report 208 to the storage manager 102 when no write requests are pending for that storage volume, i.e. all write requests issued to one or more storage nodes 106 and referencing slices of that storage volume have been acknowledged by the one or more storage nodes 106.

In response to receiving the report of step 208 from one or more compute nodes, e.g. all compute nodes that are mapped to the storage node that is the subject of the snapshot request of step 202, the storage manager 102 transmits 210 an instruction to the storage nodes 106 associated with the storage volume to create a new snapshot of that storage volume. Step 210 may further include transmitting 210 an instruction to the compute nodes 110 associated with the storage volume to commence issuing write commands to the storage nodes 106 associated with the storage volume. In some embodiments, the instruction of step 110 may include an identifier of the new snapshot. Accordingly, subsequent input/output operations (IOPs) transmitted 214 from the compute nodes may reference that snapshot identifier. Likewise, the storage node 106 may associate the snapshot identifier with data subsequently written to the storage volume, as described in greater detail below.

In response to receiving 210 the instruction to create a new snapshot, each storage node 106 finalizes 212 segments associated with the current snapshot, which may include performing garbage collection, as described in greater detail below. In addition, subsequent IOPs received by the storage node may also be processed 216 using the new snapshot as the current snapshot, as is also described in greater detail below.

The storage node 102 may further manage errors in the method 200. For example, it may occur that a compute node 110 fails to quiesce. In such instances, the storage node 102 may be programmed to abort the creation of a new snapshot. For example, if a compute node 110 to which the storage volume is mounted fails to quiesce within a timeout period, the storage node 102 may abort the method 200 and retry, such as after a wait period or in response to an instruction to do so from an administrator.

Figure 3:
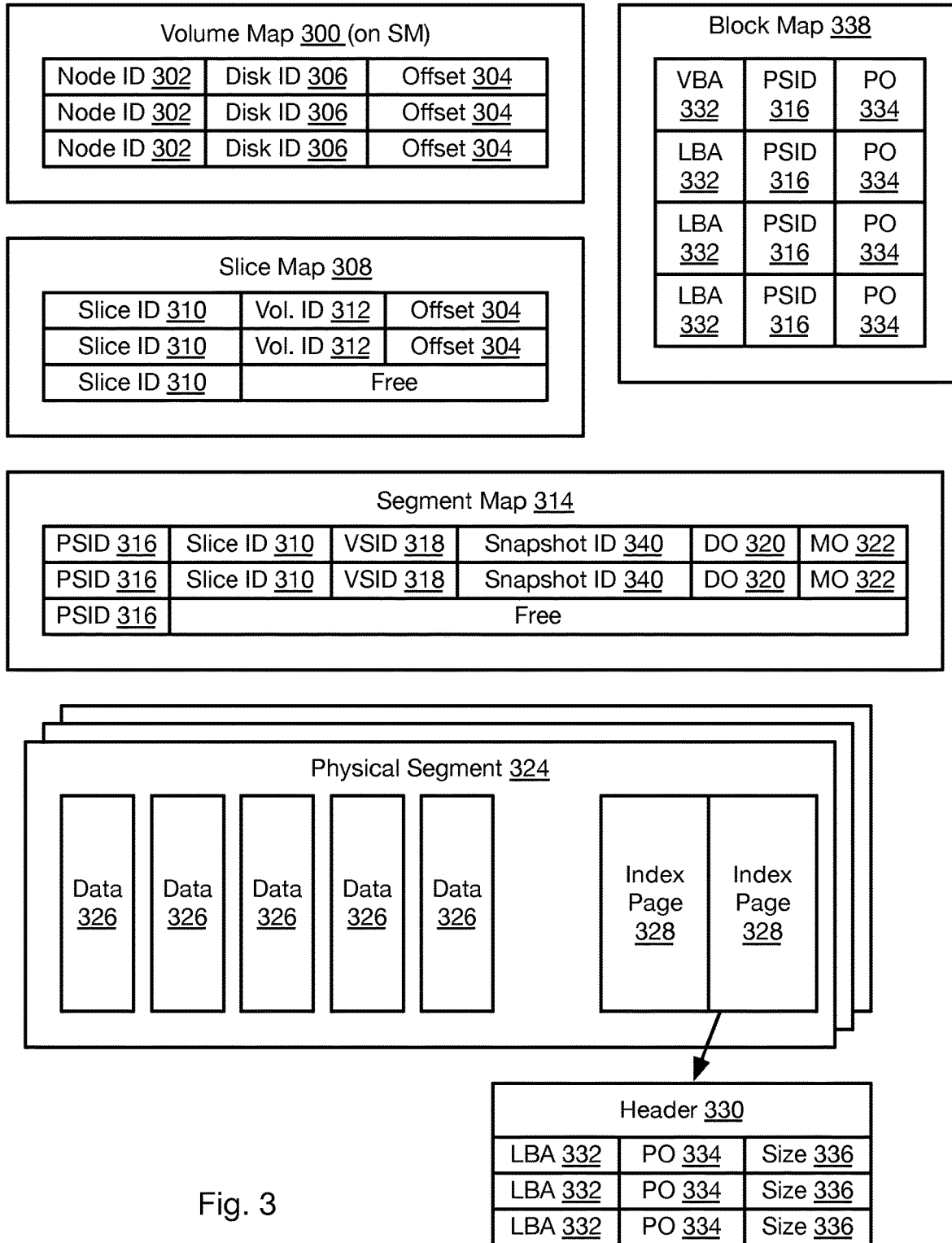
FIG. 3 is a schematic diagram illustrating the storage of data within a storage node in accordance with an embodiment of the present invention.

Referring to FIG. 3, the method by which slices are allocated, reassigned, written to, and read from may be understood with respect to the illustrated data storage scheme. The data of the storage scheme may be stored in transitory or persistent memory of the storage node 106, such as in the storage devices 108.

For each logical volume, the storage manager 102 may store and maintain a volume map 300. For each slice in the logical volume, the volume map may include an entry including a node identifier 302 identifying the storage node 106 to which the slice is assigned and an offset 304 within the logical volume at which the slice begins. In some embodiments, slices are assigned both to a storage node 106 and a specific storage device hosted by the storage node 106. Accordingly, the entry may further include a disk identifier of the storage node 106 referencing the specific storage device to which the slice is assigned.

The remaining data structures of FIG. 3 are stored on each storage node 106. The storage node 106 may store a slice map 308. The slice map 308 may include entries including a local slice identifier 310 that uniquely identifies each slice of the storage node 106, e.g. each slice of each storage device hosted by the storage node 106. The entry may further include a volume identifier 312 that identifies the logical volume to which the local slice identifier 310 is assigned. The entry may further include the offset 304 within the logical volume of the slice of the logical volume assigned to the storage node 106.

In some embodiments, an entry in the slice map 308 is created for a slice of the logical volume only after a write request is received that references the offset 304 for that slice. This further supports the implementation of overprovisioning such that slices may be assigned to a storage node 106 in excess of its actual capacity since the slice is only tied up in the slice map 308 when it is actually used.

The storage node 106 may further store and maintain a segment map 314. The segment map 314 includes entries either including or corresponding to a particular physical segment identifier (PSID) 316. For example, the segment map 314 may be in an area of memory such that each address in that area corresponds to one PSID 316 such that the entry does not actually need to include the PSID 316. The entries of the segment map 314 may further include a slice identifier 310 that identifies a local slice of the storage node 106 to which the PSID 316 has been assigned. The entry may further include a virtual segment identifier (VSID) 318. As described in greater detail below, each time a segment is assigned to logical volume and a slice of a logical volume, it may be assigned a VSID 318 such that the VSIDs 318 increase in value monotonically in order of assignment. In this manner, the most recent PSID 316 assigned to a logical volume and slice of a logical volume may easily be determined by the magnitude of the VSIDs 318 mapped to the PSIDs 316. In some embodiments, VSIDs 318 are assigned in a monotonically increasing series for all segments assigned to volume ID 312. In other embodiments, each offset 304 and its corresponding slice ID 310 is assigned VSIDs separately, such that each slice ID 310 has its own corresponding series of monotonically increasing VSIDs 318 assigned to segments allocated to that slice ID 310.

The entries of the segment map 314 may further include a data offset 320 for the PSID 316 of that entry. As described in greater detail below, when data is written to a segment it may be written at a first open position from a first end of the segment. Accordingly, the data offset 320 may indicate the location of this first open position in the segment. The data offset 320 for a segment may therefore be updated each time data is written to the segment to indicate where the new first open position is.

The entries of the segment map 314 may further include a metadata offset 322. As described in detail below, for each write request written to a segment, a metadata entry may be stored in that segment at a first open position from a second end of the segment opposite the first end. Accordingly, the metadata offset 322 in an entry of the segment map 314 may indicate a location of this first open position of the segment corresponding to the entry.

Each PSID 316 corresponds to a physical segment 324 on a device hosted by the storage node 106. As shown, data payloads 326 from various write requests are written to the physical segment 324 starting from a first end (left) of the physical segment. The physical segment may further store index pages 328 such that index pages are written starting from a second end (right) of the physical segment 324.

Each index page 328 may include a header 330. The header 330 may be coded data that enables identification of a start of an index page 328. The entries of the index page 328 each correspond to one of the data payloads 326 and are written in the same order as the data payloads 326. Each entry may include a logical block address (LBA) 332. The LBA 332 indicates an offset within the logical volume to which the data payload corresponds. The LBA 332 may indicate an offset within a slice of the logical volume. For example, inasmuch as the PSID 316 is mapped to a slice ID 310 that is mapped to an offset 304 within a particular volume ID 312, maps 308 and 314, and an LBA 332 within the slice may be mapped to the corresponding offset 304 to obtain a fully resolved address within the logical volume.

In some embodiments, the entries of the index page 328 may further include a physical offset 334 of the data payload 326 corresponding to that entry. Alternatively or additionally, the entries of the index page 328 may include a size 336 of the data payload 326 corresponding to the entry. In this manner, the offset to the start of a data payload 326 for an entry may be obtained by adding up the sizes 336 of previously written entries in the index pages 328.

The metadata offset 322 may point to the last index page 328 (furthest from right in illustrated example) and may further point to the first open entry in the last index page 328. In this manner, for each write request, the metadata entry for that request may be written to the first open position in the last index page 328. If all of the index pages 328 are full, a new index page 328 may be created and stored at the first open position from the second end and the metadata for the write request may be added at the first open position in that index page 328.

The storage node 106 may further store and maintain a block map 338. A block map 338 may be maintained for each logical volume and/or for each slice offset of each logical volume, e.g. for each local slice ID 310 which is mapped to a slice offset and logical volume by slice map 308. The entries of the block map 338 map include entries corresponding to each LBA 332 within the logical volume or slice of the logical volume. The entries may include the LBA 332 itself or may be stored at a location within the block map corresponding to an LBA 332.

The entry for each LBA 332 may include the PSID 316 identifying the physical segment 324 to which a write request referencing that LBA was last written. In some embodiments, the entry for each LBA 332 may further indicate the physical offset 334 within that physical segment 324 to which the data for that LBA was written. Alternatively, the physical offset 324 may be obtained from the index pages 328 of that physical segment. As data is written to an LBA 332, the entry for that LBA 332 may be overwritten to indicate the physical segment 324 and physical offset 334 within that segment 324 to which the most recent data was written.

In embodiments implementing multiple snapshots for a volume and slice of a volume, the segment map 314 may additionally include a snapshot ID 340 identifying the snapshot to which the PSID 316 has been assigned. In particular, each time a segment is allocated to a volume and slice of a volume, the current snapshot identifier for that volume and slice of a volume will be included as the snapshot ID 340 for that PSID 316.

In response to an instruction to create a new snapshot for a volume and slice of a volume, the storage node 106 will store the new current snapshot identifier, e.g. increment the previously stored current snapshot ID 340, and subsequently allocated segments will include the current snapshot ID 340. PSIDs 316 that are not filled and are allocated to the previous snapshot ID 340 may no longer be written to. Instead, they may be finalized or subject to garbage collection (see FIGS. 5 and 6).

Figure 4:
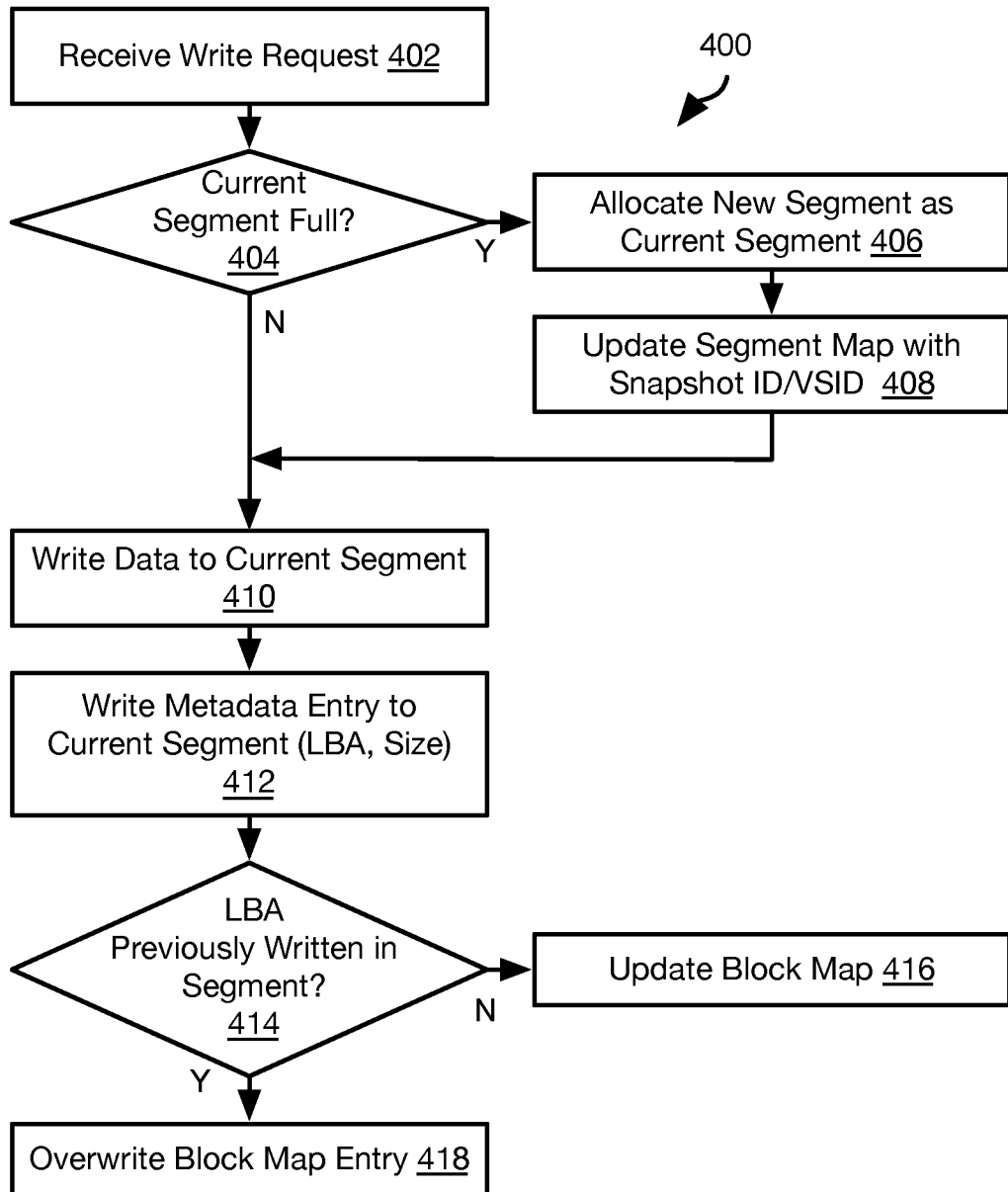
FIG. 4 is a process flow diagram of a method for processing write requests in a storage node in accordance with an embodiment of the present invention.

FIG. 4 illustrates a method 400 for executing write instructions by a storage node 106, such as write instructions received from an application executing on a compute node 110.

The method 400 includes receiving 402 a write request. The write request may include payload data, payload data size, and an LBA as well as fields such as a slice identifier, a volume identifier, and a snapshot identifier. Where a slice identifier is included, the LBA may be an offset within the slice, otherwise the LBA may be an address within the storage volume.

The method 400 may include evaluating 404 whether a PSID 316 is allocated to the snapshot referenced in the write request and whether the physical segment 324 corresponding to the PSID 316 ("the current segment") has space for the payload data. In some embodiments, as write requests are performed with respect to a PSID 316, the amount of data written as data 326 and index pages 328 may be tracked, such as by way of the data offset 320 and metadata offset 322 pointers. Accordingly, if the amount of previously-written data 326 and the number of allocated index pages 328 plus the size of the payload data and its corresponding metadata entry exceeds the capacity of the current segment it may be determined to be full at step 404.

If the current segment is determined 404 to be full, the method 400 may include allocating 406 a new PSID 316 as the current PSID 316 and its corresponding physical segment 324 as the current segment for the snapshot referenced in the write request. In some embodiments, the status of PSIDs 316 of the physical storage devices 108 may be flagged in the segment map 314 as allocated or free as a result of allocation and garbage collection, which is discussed below. Accordingly, a free PSID 316 may be identified in the segment map 314 and flagged as allocated.

The segment map 314 may also be updated 408 to include a slice ID 310 and snapshot ID 340 mapping the current PSID 316 to the snapshot ID, volume ID 312, and offset 304 included in the write request. Upon allocation, the current PSID 316 may also be mapped to a VSID (virtual segment identifier) 318 that will be a number higher than previously VSIDs 318 such that the VSIDs increase monotonically, subject, of course, to the size limit of the field used to store the VSID 318. However, the size of the field may be sufficiently large that it is not limiting in most situations.

The method 400 may include writing 410 the payload data to the current segment. As described above, this may include writing 410 payload data 326 to the free location closest to the first end of the current segment.

The method 400 may further include writing 412 a metadata entry to the current segment. This may include writing the metadata entry (LBA, size) to the first free location closest to the second end of the current segment. Alternatively, this may include writing the metadata entry to the first free location in an index page 328 that has room for it or creating a new index page 328 located adjacent a previous index page 328. Steps 410, 412 may include updating one or more pointers or table that indicates an amount of space available in the physical segment, such as a pointer 320 to the first free address closest to the first end and a pointer 322 to the first free address closest to the second end, which may be the first free address before the last index page 328 and/or the first free address in the last index page. In particular, these pointers may be maintained as the data offset 320 and metadata offset in the segment map 314 for the current PSID 316.

The method 400 may further include updating 416 the block map 338 for the current snapshot. In particular, for each LBA 332 referenced in the write request, an entry in the block map 338 for that LBA 332 may be updated to reference the current PSID 316. A write request may write to a range of LBAs 332. Accordingly, the entry for each LBA 332 in that range may be updated to refer to the current PSID 316.

Updating the block map 338 may include evaluating 414 whether an entry for a given LBA 332 referenced in the write request already exists in the block map 338. If so, then that entry is overwritten 418 to refer to the current PSID 316. If not, an entry is updated 416 in the block map 318 that maps the LBA 332 to the current PSID 316. In this manner, the block map 338 only references LBAs 332 that are actually written to, which may be less than all of the LBAs 332 of a storage volume or slice. In other embodiments, the block map 338 is of fixed size and includes an entry for each LBA 332 regardless of whether it has been written to previously. The block map 338 may also be updated to include the physical offset 334 within the current segment to which the data 326 from the write request was written.

In some embodiments, the storage node 106 may execute multiple write requests in parallel for the same LBA 332. Accordingly, it is possible that a later write can complete first and update the block map 338 whereas a previous write request to the same LBA 332 completes later. The data of the previous write request is therefore stale and the block map 338 should not be updated.

Suppressing of updating the block map 338 may be achieved by using the VSIDs 318 and physical offset 334. When executing a write request for an LBA, the VSID 318 mapped to the segment 324 and the physical offset 334 to which the data is to be, or was, written may be compared to the VSID 318 and offset 334 corresponding to the entry in the block map 338 for the LBA 332. If the VSID 318 mapped in the segment map 314 to the PSID 316 in the entry of the block map 338 corresponding to the LBA 332, then the block map 338 will not be updated. Likewise, if the VSID 318 corresponding to the PSID 316 in the block map 338 is the same as the VSID 318 for the write request and the physical offset 334 in the block map 338 is higher than the offset 334 to which the data of the write request is to be or was written, the block map 338 will not be updated for the write request.

As a result of steps 414-418, the block map 338 only lists the PSID 316 where the valid data for a given LBA 332 is stored. Accordingly, only the index pages 328 of the physical segment 324 mapped to the PSID 316 listed in the block map 338 need be searched to find the data for a given LBA 332. In instances where the physical offset 334 is stored in the block map 338, no searching is required.

Figure 5:
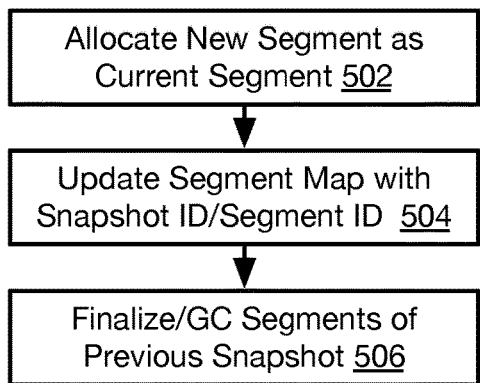
FIG. 5 is a process flow diagram of a method for processing a snapshot instruction by a storage node in accordance with an embodiment of the present invention.

FIG. 5 illustrates a method 500 executed by a storage node 106 in response to the new snapshot instruction of step 210 for a storage volume. The method 500 may be executed in response to an explicit instruction to create a new snapshot or in response to a write request that includes a new snapshot ID 340. The method 500 may also be executed with respect to a current snapshot that is still being addressed by new write requests. For example, the method 500 may be executed periodically or be triggered based on usage.

The method 500 may include allocating 502 a new PSID 316 and its corresponding physical segment 324 as the current PSID 316 and current segment for the storage volume, e.g., by including a slice ID 310 corresponding to a volume ID 312 and offset 304 included in the new snapshot instruction or the write request referencing the new snapshot ID 340. Allocating 502 a new segment may include updating 504 an entry in the segment map 314 that maps the current PSID 316 to the snapshot ID 340 and a slice ID 310 corresponding to a volume ID 312 and offset 304 included in the new snapshot instruction.

As noted above, when a PSID 316 is allocated, the VSID 318 for that PSID 316 will be a number higher than all VSIDs 318 previously assigned to that volume ID 312, and possibly to that slice ID 310 (where slices have separate series of VSIDs 318). The snapshot ID 340 of the new snapshot may be included in the new snapshot instruction or the storage node 106 may simply assign a new snapshot ID that is the previous snapshot ID 340 plus one.

The method 500 may further include finalizing 506 and performing garbage collection with respect to PSIDs 316 mapped to one or more previous snapshots IDs 340 for the volume ID 312 in the segment map 314, e.g., PSIDs 316 assigned to the snapshot ID 340 that was the current snapshot immediately before the new snapshot instruction was received.

Figure 6:
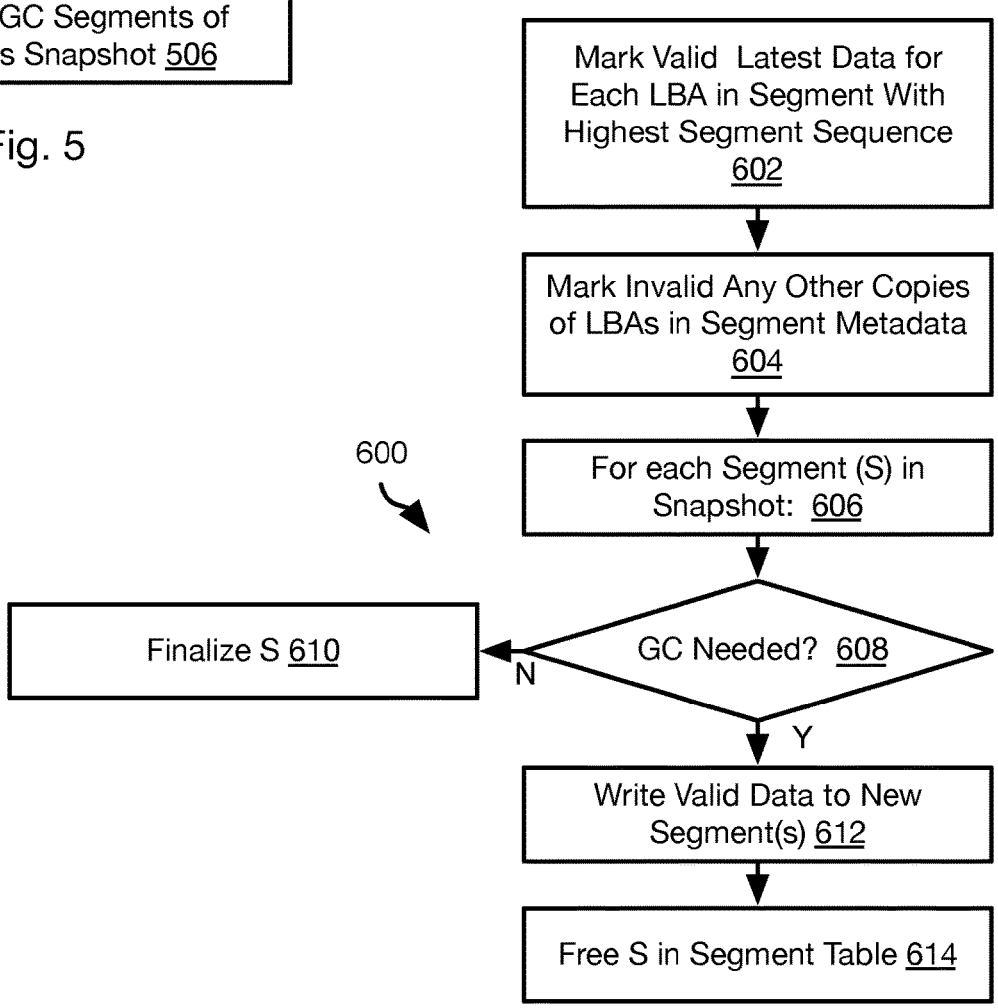
FIG. 6 is a process flow diagram of a method for performing garbage collection on segments in accordance with an embodiment of the present invention.

FIG. 6 illustrates a method 600 for finalizing and performing garbage collection with respect to segment IDs 340 for a snapshot ("the subject snapshot"), which may include the current snapshot or a previous snapshot. The method 600 may include marking 602 as valid latest-written data for an LBA 332 in the PSID 316 having the highest VSID 318 in the segment map 314 and to which data was written for that LBA 332. Marking 602 data as valid may include making an entry in a separate table that lists the location of valid data or entries for metadata in a given physical segment 324 or setting a flag in the metadata entries stored in the index pages 328 of a physical segment 324, e.g., a flag that indicates that the data referenced by that metadata is invalid or valid.

Note that the block map 338 records the PSID 316 for the latest version of the data written to a given LBA 332. Accordingly, any references to that LBA 332 in the physical segment 324 of a PSID 316 mapped to a lower-numbered VSID 318 may be marked 604 as invalid. For the physical segment 324 of the PSID 316 in the block map 338 for a given LBA 332, the last metadata entry for that LBA 332 may be found and marked as valid, i.e. the last entry referencing the LBA 332 in the index page 328 that is the last index page 328 including a reference to the LBA 332. Any other references to the LBA 332 in the physical segment 324 may be marked 604 as invalid. Note that the physical offset 334 for the LBA 332 may be included in the block map 334, so all metadata entries not corresponding to that physical offset 334 may be marked as invalid.

The method 600 may then include processing 606 each segment ID S of the PSIDs 316 mapped to the subject snapshot according to steps 608-620. In some embodiments, the processing of step 606 may exclude a current PSID 316, i.e. the last PSID 302 assigned to the subject snapshot. As described below, garbage collection may include writing valid data from a segment to a new segment. Accordingly, step 606 may commence with the PSID 316 having the lowest-valued VSID 318 for the subject snapshot. As any segments 324 are filled according to the garbage collection process, they may also be evaluated to be finalized or subject to garbage collection as described below.

The method 600 may include evaluating 608 whether garbage collection is needed for the segment ID S. This may include comparing the amount of valid data in the physical segment 324 for the segment ID S to a threshold. For example, if only 40% of the data stored in the physical segment 324 for the segment ID S has been marked valid, then garbage collection may be determined to be necessary. Other thresholds may be used, such as value between 30% and 80%. In other embodiments, the amount of valid data is compared to the size of the physical segment 324, e.g., the segment ID S is determined to need garbage collection if the amount of valid data is less than X % of the size of the physical segment 324, where X is a value between 30 and 80, such as 40.

If garbage collection is determined 608 not to be needed, the method 600 may include finalizing 610 the segment ID S. Finalizing may include flagging the segment ID S in the segment map 314 as full and no longer available to be written to. This flag may be stored in another table that lists finalized PSIDs 316.

If garbage collection is determined 608 to be needed, then the method 600 may include writing 612 the valid data to a new segment. For example, if the valid data may be written to a current PSID 316, i.e. the most-recently allocated PSID 316 for the subject snapshot, until its corresponding physical segment 324 full. If there is no room in the physical segment 324 for the current PSID 316, step 612 may include assigning a new PSID 316 as the current PSID 316 for the subject snapshot. The valid data, or remaining valid data, may then be written to the physical segment 324 corresponding to the current PSID 316 for the subject snapshot.

Note that writing 612 the valid data to the new segment maybe processed in the same manner as for any other write request (see FIG. 4) except that the snapshot ID used will be the snapshot ID 340 of the subject snapshot, which may not be the current snapshot ID. In particular, the manner in which the new PSID 316 is allocated to the subject snapshot may be performed in the same manner described above with respect to steps 406-48 of FIG. 4. Likewise, the manner in which the valid data is written to the current segment may be performed in the same manner as for steps 410-412 of FIG. 4. In some embodiments, writing of valid data to a new segment as part of garbage collection may also include updating the block map with the new location of the data for an LBA 332, such as according to steps 414-418 of FIG. 4. When the physical segment 324 of the current PSID 316 is found to be full, it may itself be subject to the process 600 by which it is finalized or subject to garbage collection.

After the valid data is written to a new segment, the method 600 may further include freeing 614 the PSID S in the segment map 314, e.g., marking the entry in segment map 314 corresponding to PSID S as free.

The process of garbage collection may be simplified for PSIDs 316 that are associated with the subject snapshot in the segment map 314 but are not listed in the block map 338 with respect to any LBA 332. The physical segments 324 of such PSIDs 316 do not store any valid data. Entries for such PSIDs 316 in the segment map 314 may therefore simply be deleted and marked as free in the segment map 314

Figure 7:
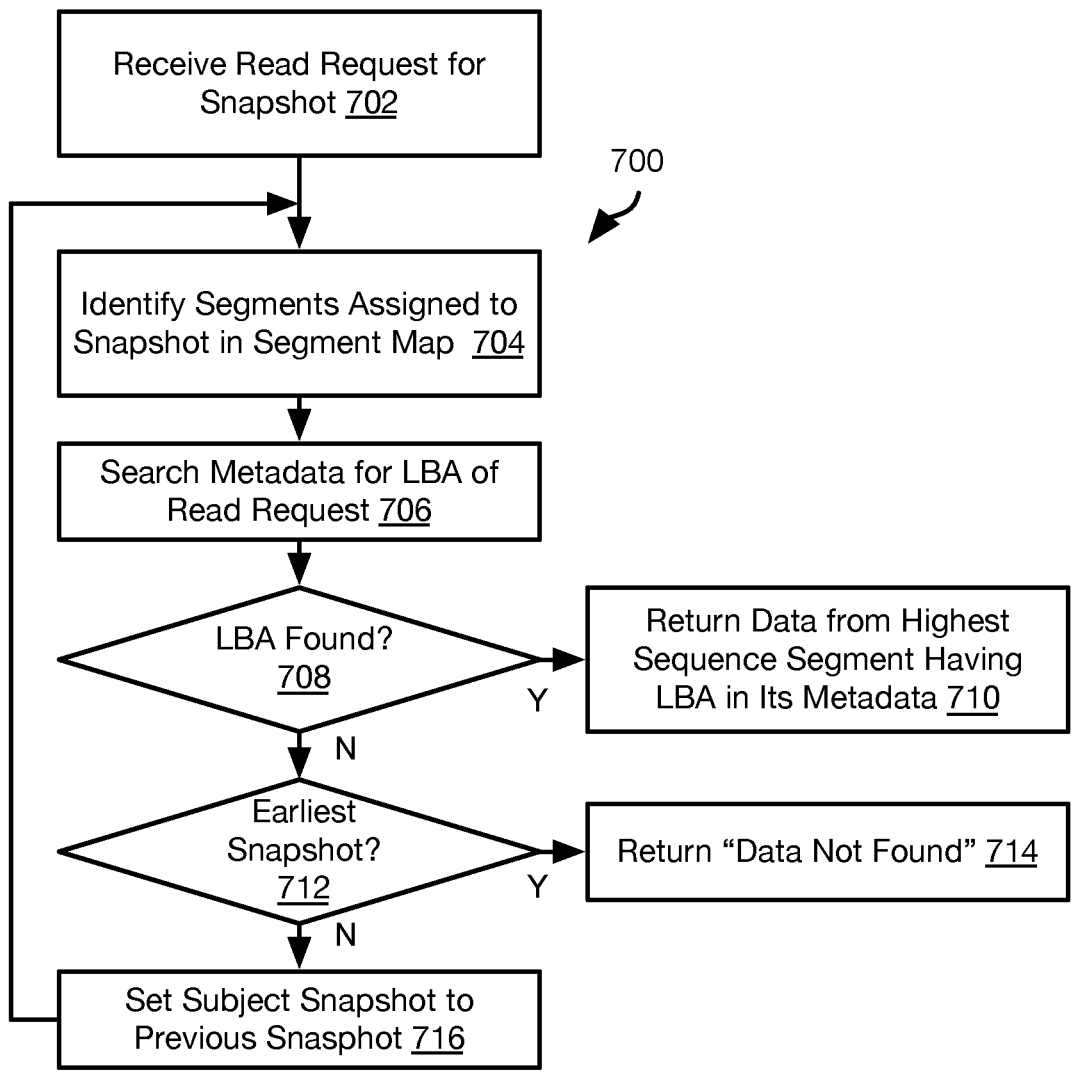
FIG. 7 is a process flow diagram of a method for reading data from a snapshot in accordance with an embodiment of the present invention.

FIG. 7 illustrates a method 700 that may be executed by a storage node 106 in response to a read request. The read request may be received from an application executing on a compute node 110. The read request may include such information as a snapshot ID, volume ID (and/or slice ID), LBA, and size (e.g. number of 4 KB blocks to read).

The following steps of the method 700 may be initially executed using the snapshot ID 340 included in the read request as "the subject snapshot," i.e., the snapshot that is currently being processed to search for requested data. The method 700 includes receiving 702 the read request by the storage node 106 and identifying 704 one or more PSIDs 316 in the segment map 314 assigned to the subject snapshot and searching 706 the metadata entries for these PSIDs 316 for references to the LBA 332 included in the read request.

The searching of step 706 may be performed in order of decreasing VSID 318, i.e. such that the metadata entries for the last allocated PSID 316 is searched first. In this manner, if reference to the LBA 332 is found, the metadata of any previously-allocated PSIDs 316 does not need to be searched.

Searching 706 the metadata for a PSID 316 may include searching one or more index pages 328 of the physical segment 324 corresponding to the PSID 316. As noted above, one or more index pages 328 are stored at the second end of the physical segment 324 and entries are added to the index pages 328 in the order they are received. Accordingly, the last-written metadata including the LBA 332 in the last index page 328 (furthest from the second end of the physical segment 324) in which the LBA 332 is found will correspond to the valid data for that LBA 332. To locate the data 326 corresponding to the last-written metadata for the LBA 332 in the physical segment 324, the sizes 336 for all previously-written metadata entries may be summed to find a start address in the physical segment 324 for the data 326. Alternatively, if the physical offset 334 is included, then the data 326 corresponding to the metadata may be located without summing the sizes 336.

If reference to the LBA 332 is found 708 in the physical segment 324 for any of the PSIDs 316 allocated to the subject snapshot, the data 326 corresponding to the last-written metadata entry including that LBA 332 in the physical segment 324 mapped to the PSID 316 having the highest VSID 318 of all PSIDs 316 in which the LBA is found will be returned 710 to the application that issued the read request.

If the LBA 332 is not found in the metadata entries for any of the PSIDs 316 mapped to subject snapshot, the method 700 may include evaluating 712 whether the subject snapshot is the earliest snapshot for the storage volume of the read request on the storage node 106. If so, then the data requested is not available to be read and the method 700 may include returning 714 a "data not found" message or otherwise indicating to the requesting application that the data is not available.

If an earlier snapshot than the subject snapshot is present for the storage volume on the storage node 106, e.g., there exists at least one PSID 316 mapped to a snapshot ID 340 that is lower than the snapshot ID 340 of the subject snapshot ID, then the immediately preceding snapshot ID 340 will be set 716 to be the subject snapshot and processing will continue at step 704, i.e. the PSIDs 316 mapped to the subject snapshot will be searched for the LBA 332 in the read request as described above.

The method 700 is particularly suited for reading data from snapshots other than the current snapshot that is currently being written to. In the case of a read request from the current snapshot, the block map 338 may map each LBA 332 to the PSID 316 in which the valid data for that LBA 332 is written. Accordingly, for such embodiments, step 704 may include retrieving the PSID 332 for the LBA 332 in the write request from the block map 338 and only searching 706 the metadata corresponding to that PSID 316. Where the block map 338 stores a physical offset 334, then the data is retrieved from that physical offset within the physical segment 314 of the PSID 336 mapped to the LBA 332 of the read request.

In some embodiments, the block map 332 may be generated for a snapshot other than the current snapshot in order to facilitate executing read requests, such as where a large number of read requests are anticipated in order to reduce latency. This may include searching the index pages 328 of the segments 324 allocated to the subject snapshot and its preceding snapshots to identify, for each LBA 332 to which data has been written, the PSID 316 having the highest VSID 318 of the PSIDs 316 having physical segments 324 storing data written to the each LBA 332. This PSID 316 may then be written to the block map 318 for the each LBA 332. Likewise, the physical offset 334 of the last-written data for that LBA 332 within the physical segment 324 for that PSID 316 may be identified as described above (e.g., as described above with respect to steps 704-716).

Figure 8:
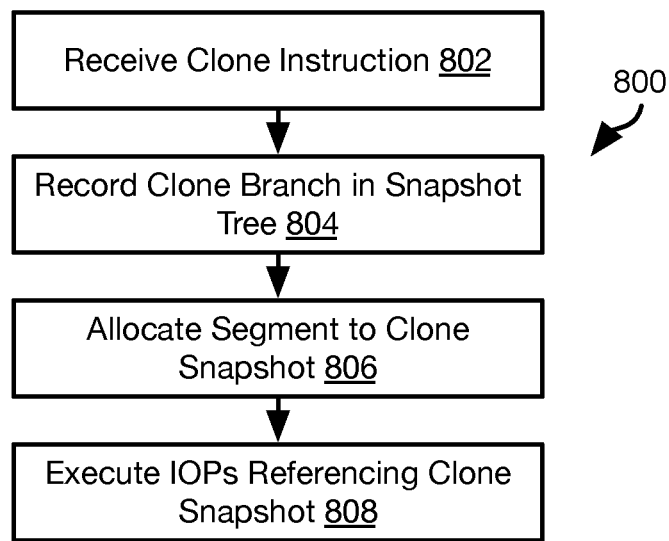
FIG. 8 is a process flow diagram of a method for cloning a snapshot in accordance with an embodiment of the present invention.

Referring to FIG. 8, in some instances it may be beneficial to clone a storage volume. This may include capturing a current state of a principal copy of a storage volume and making changes to it without affecting the principal copy of the storage volume. For purposes of this disclosure a "principal copy" or "principal snapshot" of a storage volume refers to an actual production copy that is part of a series of snapshots that is considered by the user to be the current, official, or most up-to-date copy of the storage volume. In contrast, a clone volume is a snapshot created for experimentation or evaluation but changes to it are not intended by the user to become part of the production copy of the storage volume. Stated differently, only one snapshot may be a principal snapshot with respect to an immediately preceding snapshot, independent of the purpose of the snapshot. Any other snapshots that are immediate descendants of the immediately preceding snapshot are snapshots of a clone volume.

The illustrated method 800 may be executed by the storage manager 102 and one or more storage nodes 106 in order to implement this functionality. The method 800 may include receiving 802 a clone instruction and executing the remaining steps of the method 800 in response to the clone instruction. The clone instruction may be received by the storage manager 102 from a user or be generated according to a script or other program executing on the storage manager 102 or a remote computing device in communication with the storage manager 102.

Figure 9:
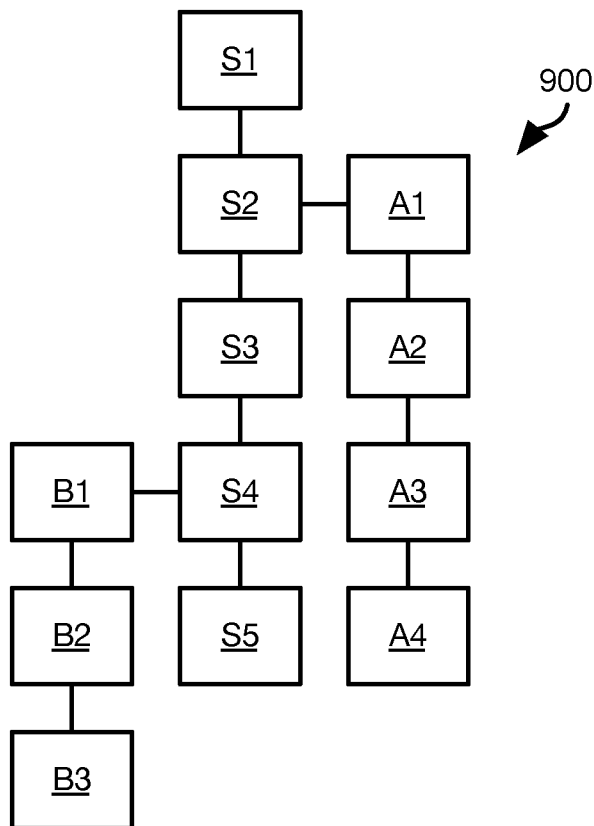
FIG. 9 illustrates a snapshot hierarchy created in accordance with an embodiment of the present invention.

The method 800 may include recording 804 a clone branch in a snapshot tree. For example, referring to FIG. 9, in some embodiments, for each snapshot that is created for a storage volume, the storage manager 102 may create a node S1-S5 in a snapshot hierarchy 900. In response to a clone instruction, the storage manager 102 may create a clone volume and branch to a node A1 representing the clone volume. In the illustrated example, a clone instruction was received with respect to the snapshot of node S2. This resulted in the creation of a clone volume represented by node A1 that branches from node S2. Note node S3 and its descendants are also connected to node S2 in the hierarchy.

In some embodiments, the clone instruction may specify which snapshot the clone volume is of. In other embodiments, the clone instruction may be inferred to be a snapshot of a current snapshot. In such embodiments, a new principal snapshot may be created and become the current snapshot. The previous snapshot will then be finalized and be subject to garbage collection as described above. The clone will then branch from the previous snapshot. In the illustrated example, if node S2 represented the current snapshot, then a new snapshot represented by node S3 would be created. The snapshot of node S2 would then be finalized and subject to garbage collection and the snapshot of the clone volume represented by A1 would be created and node A1 would be added to the hierarchy as a descendent of node S2.

In some embodiments, the clone node A1, and possibly its descendants A2 to A4 (representing subsequent snapshots of the clone volume), may be distinguished from the nodes S1 to S5 representing principal snapshots, such as by means of a flag, a classification of the connection between the node A1 and node S2 that is its immediate ancestor, or by storing data defining node A1 in a separate data structure.

Following creation of a clone volume, other principal snapshots of the storage volume may be created and added to represented in the hierarchy by one or more nodes S2 to S5. A clone may be created of any of these snapshots and represented by additional clone nodes. In the illustrated example, node B1 represents a snapshot of a clone volume that is a clone of the snapshot represented by node S4. Subsequent snapshots of the clone volume are represented by nodes B1 to B3.

Referring again to FIG. 8, the creation of a snapshot for a clone volume on the storage node 106 may be performed in the identical manner as for any other snapshot, such as according to the methods of FIGS. 2 through 6. In particular, one or more segments 806 may be allocated to the clone volume on storage nodes 106 storing slices of the cloned storage volume and mapped to the clone volume. IOPs referencing the clone volume may be executed 808, such as according to the method 400 of FIG. 4.

In some instances, it may be desirable to store snapshots of a clone volume on a different storage node 106 than the principal snapshots. Accordingly, the method 800 may include allocating 806 segments to the clone volume on the different storage node 106. This may be invoked by sending a new snapshot instruction referencing the clone volume (i.e., an identifier of the clone volume) to the different storage node 106 and instructing one or more compute nodes 110 to route IOPs for the clone volume to the different storage node 106.

The storage node 102 may store in each node of the hierarchy, data identifying one or more storage nodes 106 that store data for the snapshot represented by that node of the hierarchy. For example, each node may store or have associated therewith one or more identifiers of storage nodes 106 that store a particular snapshot ID for a particular volume ID. The node may further map one or more slice IDs (e.g., slice offsets) of a storage volume to one storage nodes 106 storing data for that slice ID and the snapshots for that slice ID.

Figure 10:
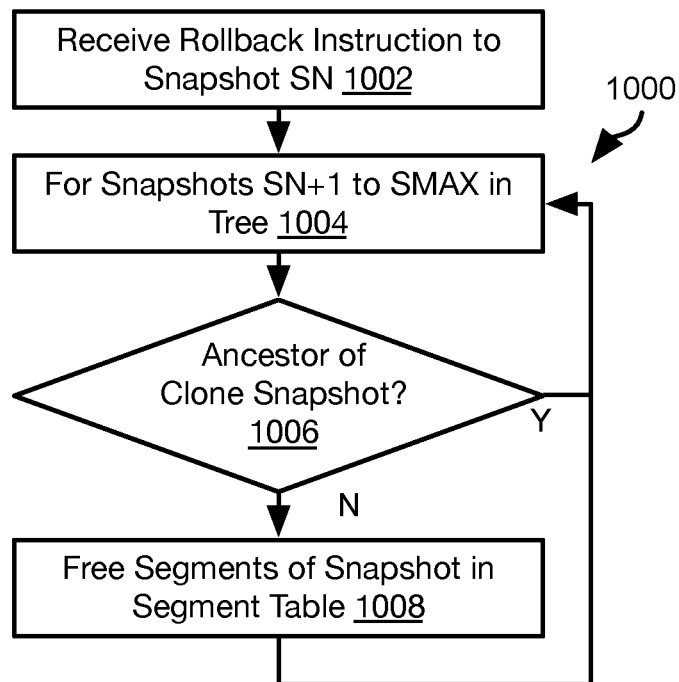
FIG. 10 is a process flow diagram of a method for rolling back to a prior snapshot in accordance with an embodiment of the present invention.

Referring to FIG. 10, one of the benefits of snapshots is the ability to capture the state of a storage volume such that it can be restored at a later time. FIG. 10 illustrates a method 1000 for rolling back a storage volume to a previous snapshot, particularly for a storage volume having one or more clone volumes.

The method 1000 includes receiving 1002, by the storage manager 102, an instruction to rollback a storage volume to a particular snapshot SN. The method 1000 may then include processing 1004 each snapshot that is a represented by a descendent node of the node representing snapshot SN in the snapshot hierarchy, i.e. snapshots SN+1 to SMAX, where SMAX is the last principal snapshot that is a descendent of snapshot SN (each "descendent snapshot"). For each descendent snapshot, processing 1004 may include evaluating 1006 whether the each descendent is an ancestor of a node representing a snapshot of a clone volume. If not, then the storage manager 102 may instruct all storage nodes 106 storing segments mapped to the descendent snapshot to free 1008 these segments, i.e. delete entries from the segment map referencing the descendent snapshot and marking corresponding PSIDs 316 as free in the segment map 314.

If the descendent snapshot is found 1006 to be an ancestor of a snapshot of a clone volume, then step 1008 is not performed and the snapshot and any segments allocated to it are retained.

Figure 11:
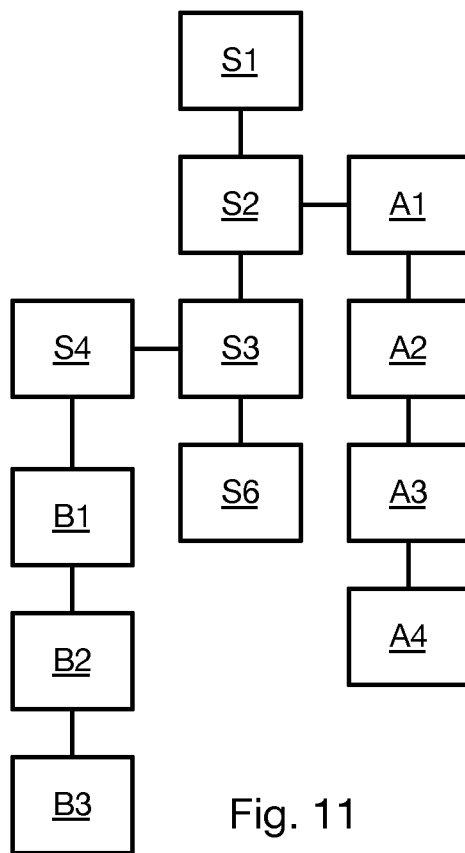
FIG. 11 illustrates the snapshot hierarchy of FIG. 9 as modified according to the method of FIG. 10 in accordance with an embodiment of the present invention.

FIG. 11 illustrates the snapshot hierarchy following execution of the method 1000 with respect to the snapshot represented by node S3. As is apparent, snapshot S5 has been removed from the hierarchy and any segments corresponding to these snapshots will have been freed on one or more storage nodes 106.

However, since node S4 is an ancestor of clone node B1, it is not removed and segments corresponding to it are not freed on one or more storage nodes in response to the roll back instruction. Inasmuch as each snapshot contains only data written to the storage volume after it was created, previous snapshots may be required to recreate the storage volume. Accordingly, the snapshots of nodes S3 to S1 are needed to create the snapshot of the storage volume corresponding to node B1.

Subsequent principal snapshots of the storage volume will be added as descendants of the node to which the storage volume was rolled back. In the illustrated example, a new principal snapshot is represented by node S6 that is an immediate descendent of node S3. Node S4 is only present due to clone node B1 and therefore may itself be classified as a clone node in the hierarchy in response to the rollback instruction of step 1002.

Note that FIG. 11 is a simple representation of a hierarchy. There could be any number of clone volumes, snapshots of clone volumes, clones of clone volumes and descendent snapshots of any snapshots of any clone volume represented by nodes of a hierarchy. Accordingly, to roll back to a particular snapshot of a clone, the method 1000 is the same, except that descendants of a snapshot of a clone volume are treated the same as principal snapshots and clones of any of these descendants are treated the same as a snapshot of a clone volume.

Figure 12:
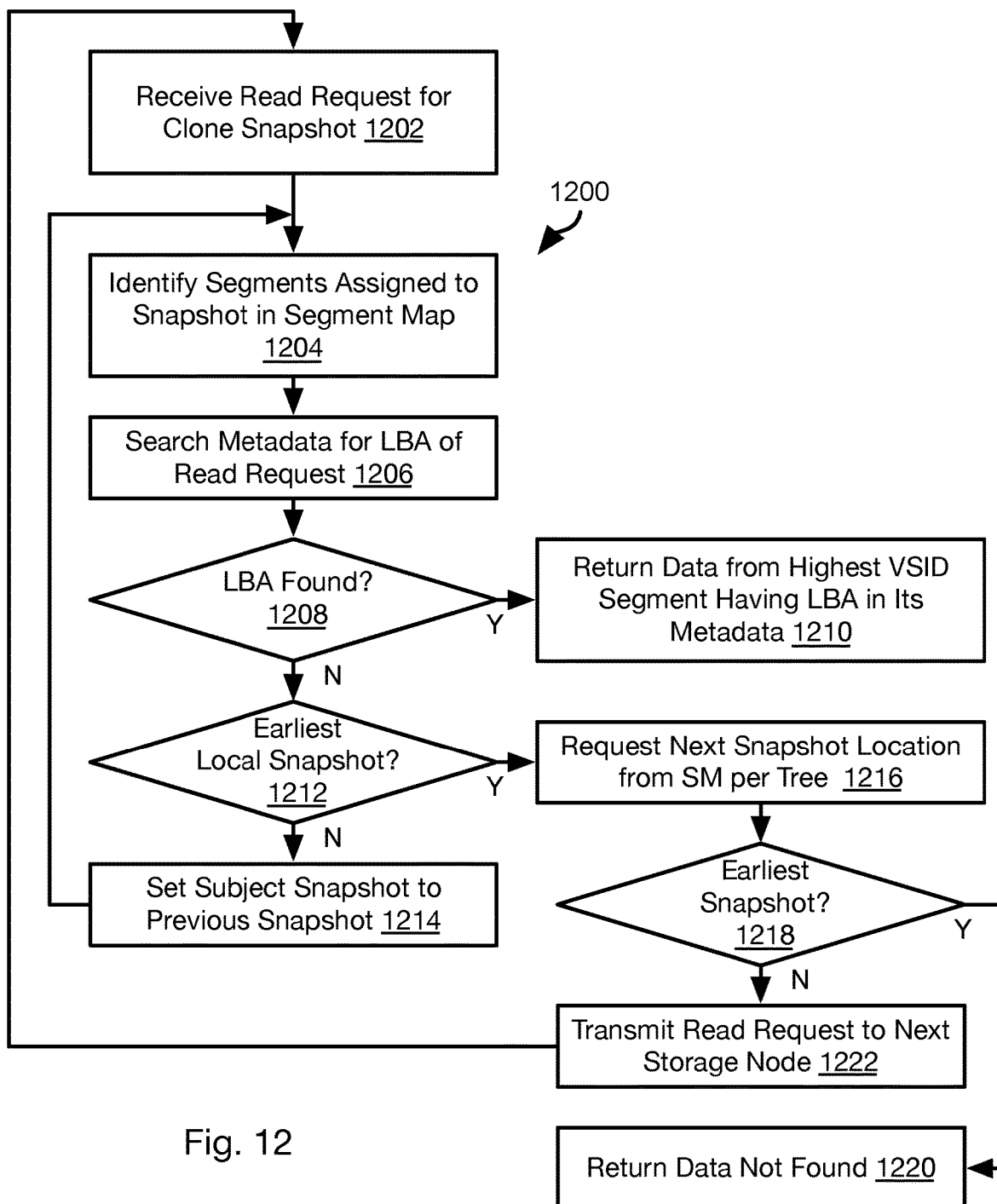
FIG. 12 is a process flow diagram of a method for reading from a clone volume in accordance with an embodiment of the present invention.

Referring to FIG. 12, the illustrated method 1200 may be used to execute a read request with respect to a storage volume that is represented by a hierarchy generated as described above with respect to FIGS. 8 through 11. The illustrated method 1200 may also be executed with respect to a storage volume that includes only principal snapshots that are distributed across multiple storage nodes, i.e., all the segments corresponding to snapshots of the same slice of the storage volume are not located on the same storage node 106. In that case, the hierarchy stored on the storage manager 102 stores the location of the segments for each snapshot and therefore enables them to be located.

The method 1200 may be executed by a storage node 106 ("the current storage node") with information retrieved from the storage manager 102 as noted below. The method 1200 may include receiving 1202 a read request, which may include such information as a snapshot ID, volume ID (and/or slice ID), LBA, and size (e.g. number of 4 KB blocks to read).

Note that the read request may be issued by an application executing on a compute node 110. The compute node 110 may determine which storage node 106 to transmit the read request using information from the storage manager 102. For example, the compute node 110 may transmit a request to obtain an identifier for the storage node 102 storing data for a particular slice and snapshot of a storage volume. The storage manager may then obtain an identifier and/or address for the storage node 106 storing that snapshot and slice of the storage volume from the hierarchical representation of the storage volume and return it to the requesting compute node 110. For example, the storage manager 102 may retrieve this information from the node in the hierarchy representing the snapshot included in the read request.

In response to the read request, the current storage node performs the algorithm illustrated by subsequent steps of the method 1200. In particular, the method 1200 may include identifying 1204 segments assigned to the snapshot ID of the read request in the segment ("the subject snapshot").

The method 1200 may include searching 1206 the metadata of the segments identified in step 1204 for the LBA of the read request. If the LBA is found, the data from the highest numbered segment having the LBA in its metadata is returned, i.e. the data that corresponds to the last-written metadata entry including the LBA.

If the LBA is not found in any of the segments mapped to subject snapshot, then the method 1200 may include evaluating 1212 whether the subject snapshot is the earliest snapshot on the current storage node. If not, then steps processing continues at step 1204 with the previous snapshot set 1214 as the subject snapshot.

Steps 1204-1214 may be performed in the same manner as for steps 704-714 of the method 700, including the various modifications and variations described above with respect to the method 700.

In contrast to the method 700, if the LBA is not found in any of the segments corresponding to the subject snapshot for any of the snapshots evaluated, then the method 1200 may include requesting 1216 a location, e.g. storage node identifier, where an earlier snapshot for the volume ID or slice ID is stored. In response to this request, the storage manager 102 determines an identifier of a storage node 106 storing the snapshot corresponding to the immediate ancestor of the earliest snapshot stored on the current storage node in the hierarchy. The storage manager 102 may determine an identifier of the storage node 106 relating to the immediate-ancestor snapshot and that stores data for a slice ID and volume ID of the read request as recorded for the ancestor nearest ancestor node in the hierarchy of the node corresponding to the earliest snapshot stored on the current storage node.

If the current storage node is found 1218 to be the earliest snapshot for the storage volume ID and/or slice ID of the read request, then the data the storage manager 102 may report this fact to the storage node, which will then return 1220 a message indicating that the requested LBA is not available for reading, such as in the same manner as step 714 of the method 700.

If another storage node stores an earlier snapshot for the volume ID and/or slice ID of the read request, then the read request may be transmitted 1222 to this next storage node by either the current storage node or the storage manager 102. The processing may then continue at step 1202 with the next storage node as the current storage node. The read request transmitted at step 1222 may have a snapshot ID set to the latest snapshot ID for the storage volume ID and or slice ID of the original read request.

The method 1200 may be performed repeatedly across multiple storage nodes 106 until the earliest snapshot is encountered or the LBA of the read request is located.

Figure 13:
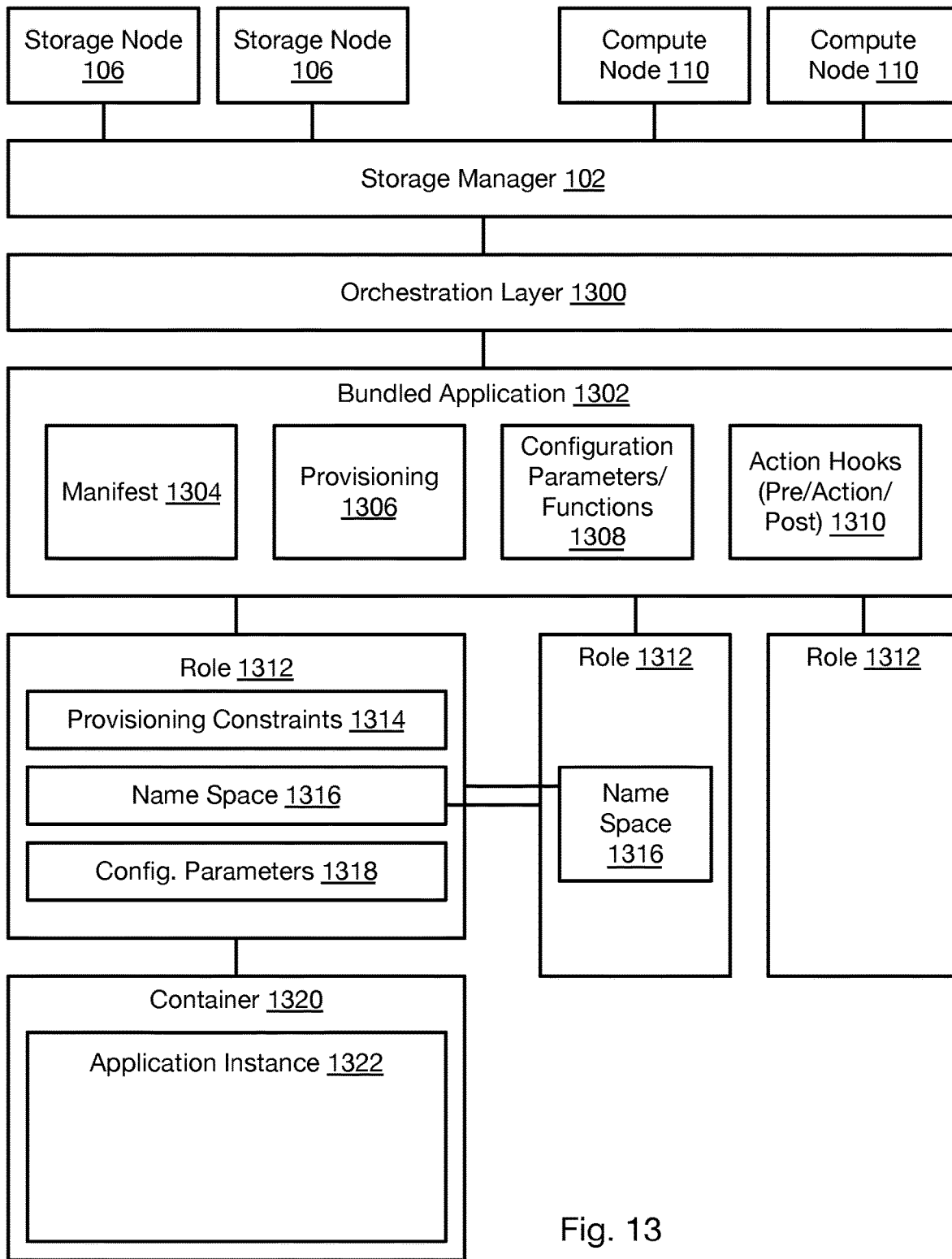
FIG. 13 is a schematic block diagram of components for implementing orchestration of multi-role applications in accordance with an embodiment of the present invention.

Referring to FIG. 13, storage according to the above-described methods and systems may be incorporated into an application-orchestration approach. In the illustrates approach, an orchestration layer 1300 implements a bundled application 1302 including a plurality of roles. In the following description, "bundled application" refers to a bundle of applications as implemented using the orchestration layer. A "role" is an instance of an executable that is managed by the orchestration layer as described herein as part of the bundled application. Accordingly, a "role" may itself be a standalone application, such as a database, webserver, blogging application, or any other application. Examples of roles include CASSANDRA, HADOOP, SPARK, DRUID, SQL database, ORACLE database, MONGODB database, WORDPRESS, and the like.

The orchestration layer 1300 may implement a bundled application 1302 defining roles and relationships between roles as described in greater detail below. The bundled application 1302 may include a manifest 1304 that defines the roles of the bundled application 1302, which may include identifiers of roles and possibly a number of instances for each role identified. The manifest 1304 may define dynamic functions define how the number of instances of particular role may grow or shrink depending on usage. The orchestration layer 1300 may then create or remove instances for a role as described below as indicated by usage and one or more functions for that role. The manifest 1304 may define a topology of the bundled application 1302, i.e. the relationship between roles, such as services of a role that are accessed by another role.

The bundled application 1302 may include provisioning 1306. The provisioning 1306 defines the resources of storage nodes 106 and compute nodes 110 required to implement the bundle. The provisioning 1306 may define resources for the bundle as a whole or for individual roles. Resources may include a number of processors (e.g., processing cores), an amount of memory (e.g., RAM (random access memory), an amount of storage (e.g., GB (gigabytes) on a HDD (Hard Disk Drive) or SSD (Solid State Drive)). As described below, these resources may be provisioned in a virtualized manner such that the bundled application 1302 and individual roles 1312 are not informed of the actual location or processing and storage resources and are relieved from any responsibility for managing such resources. In particular, storage resources may be virtualized by the storage manager 102 using the methods described above such that storage volumes are allocated and used without requiring the bundled application 1302 or roles to manage the underlying storage nodes 106 and storage device 108 on which the data of the storage volumes is written.

Provisioning 1306 may include static specification of resources and may also include dynamic provisioning functions that will invoke allocation of resources in response to usage of the bundled application. For example, as a database fills up, additional storage volumes may be allocated. As usage of a bundled application increases, additional processing cores and memory may be allocated to reduce latency.

A bundled application 1302 may further include configuration parameters 1308. Configuration parameters may include variables and settings for each role of the bundle. The configuration parameters are defined by the developer of the role and therefore may include any example of such parameters for any application known in the art. The configuration parameters may be dynamic or static. For example, some parameters may be dependent on resources such as an amount of memory, processing cores, or storage. Accordingly, these parameters may be defined as a function of these resources. The orchestration layer will then update such parameters according to the function in response to changes in provisioning of those resources that are inputs to the function. For example, CASSANDRA defines a variable Max_Heap_Size that is normally set to half the memory limit. Accordingly, as the memory provisioned for a CASSANDRA role increases, the value of Max_Heap_Size may be increased to half the increased memory.

The bundled application 1302 may further include action hooks 1310 for various actions that may be taken with respect to the bundled application and/or particular roles of the bundled applications. Actions may include some or all of stopping, starting, restarting, taking snapshots, cloning, and rolling back to a prior snapshot. For each action, one or more action hooks may be defined. A hook is a programmable routine that is executed by the orchestration layer when the corresponding action is invoked. A hook may specify a script of commands or configuration parameters input to one or more roles in a particular order. Hooks for an action may include a pre-action hook (executed prior to implementing an action), an action hook (executed to actually implement the action), and a post action hook (executed following implementation of the action).

The bundled application 1302 may define a plurality of roles 1312. Each role may include one or more provisioning constraints. As noted above, the bundled application 1302 and roles 1312 are not aware of the underlying storage nodes 106 and compute nodes 110 inasmuch as these are virtualized by the storage manager 102 and orchestration layer 1300. Accordingly, any constraints on allocation of hardware resources may be included in the provisioning constraints 1314. As described in greater detail below, this may include constraints to create separate fault domains in order to implement redundancy and constraints on latency.

The role 1312 may define a name space 1316. A name space 1316 may include variables, functions, services, and the like implemented by a role. In particular, interfaces and services exposed by a role may be included in the name space. The name space may be referenced through the orchestration layer 1300 by an addressing scheme, e.g. <Bundle ID>.<Role ID>.<Name>. In some embodiments, references to the namespace 1316 of another role may be formatted and processed according to the JINJA template engine or some other syntax. Accordingly, each role 1312 may access the variables, functions, services, etc. in the name space 1316 of another role 1312 on order to implement a complex application topology. In some instances, credentials for authorizing access to a role 1312 may be shared by accessing the namespace 1316 of that role.

A role 1312 may further include various configuration parameters 1318 defined by the role, i.e. as defined by the developer that created the executable for the role. As noted above, these parameters 1318 may be set by the orchestration layer 1300 according to the static or dynamic configuration parameters 1308. Configuration parameters may also be referenced in the name space 1316 and be accessible (for reading and/or writing) by other roles 1312.

Each role 1312 may include a container 1320 executing an instance 1322 of the application for that role. The container 1320 may be a virtualization container, such as a virtual machine, that defines a context within which the application instance 1322 executes, facilitating starting, stopping, restarting, and other management of the execution of the application instance 1322. Containers 1320 may include any container technology known in the art such as DOCKER, LXC, LCS, KVM, or the like. In a particular bundled application 1302, there may be containers 1320 of multiple different types in order to take advantage of a particular container's capabilities to execute a particular role 1312. For example, one role 1312 of a bundled application 1302 may execute a DOCKER container 1320 and another role 1312 of the same bundled application 1302 may execute an LCS container 1320. The manifest 1304 and/or provisioning 1306 may define a particular container 1320 of the bundled application 1320 to mount each provisioned storage volume for use by that container 1320.

Note that a bundled application 1302 as configured in the foregoing description may be instantiated and used or may be saved as a template that can be used and modified later.

Figure 14:
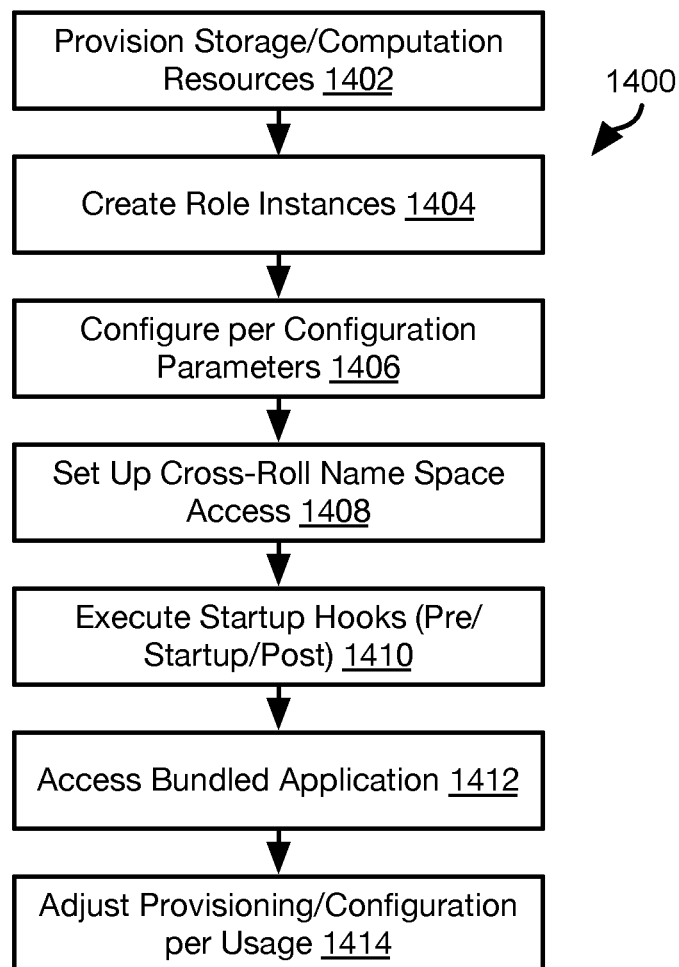
FIG. 14 is a process flow diagram of a method for orchestrating the deployment of a multi-role application in accordance with an embodiment of the present invention.

FIG. 14 illustrates a method 1400 for executing a bundled application 1302 using the orchestration layer 1300. The method 1400 may include provisioning 1402 storage and computation resources according to the provisioning 1306. This may include allocating storage volumes according to the storage requirements, assigning the storage volumes to storage nodes 106, and selecting a compute node 110 or storage node 106 providing the required computational resources (processor cores and memory).

The method 1400 may include creating 1404 role instances for the roles 1312 defined by the bundled application 1302. As described above, this may include creating a container 1320 and instantiating the application instance 1322 of the role 1312 within the container 1320. The order in which instances 1322 are created and started may be defined in the manifest 1304.

The method 1400 may include configuring 1406 each role according to the configuration parameters 1308, including executing any included functions to determine values for dynamic parameters. As noted above, starting a bundled application 1302 may further include setting up 1408 the roles 1312 to reference resources in the name space 1316 of another role 1312. For example, a webserver may be configured to access a database by referencing configuration parameters and services implemented by the database.

The method 1400 may further include executing 1410 any hooks 1310 defined for the initial startup of the bundled applications. Accordingly, pre-startup, startup, and post startup hooks may be executed. Some or all of the functions of steps 1402-1410 may be defined as part of the pre-startup hook. Other functions may also be performed prior to steps 1402-1408 as defined by a pre-startup hook.

The actual commencement of execution of the instances 1322 of the bundled application 1302 may be performed in an order specified by the startup hook and may include performing any attendant functions of these instances 1322 as specified by the startup hook. Following startup, one or more other actions may be performed as specified by the developer in the post-startup hook. These actions may invoke functions of the instances 1322 themselves or executed by the orchestration layer 1300 outside of the instances 1322, such as with respect to an operating system executing the containers 1320 for the instances 1322.

The bundled application 1302 may then be accessed 1412 in order to perform the programmed functionality of the application instances 1322. As usage occurs, processing resources will be loaded and storage may be filled. The method 1400 may further include adjusting 1414 provisioning according to this usage and may performed adjustment to configuration parameters of the roles 1312 according to this provisioning as defined by the provisioning 1306 and configuration functions 1308.

As noted above, instances of roles may also be created or removed according to usage. Accordingly, where indicate by the manifest 1304, instances 1322 for a role 1312 may be created according to steps 1402-1410 throughout execution of the bundled application 1302 as defined by one or more dynamic functions in the manifest 1304 for that role 1312.

Figure 15:
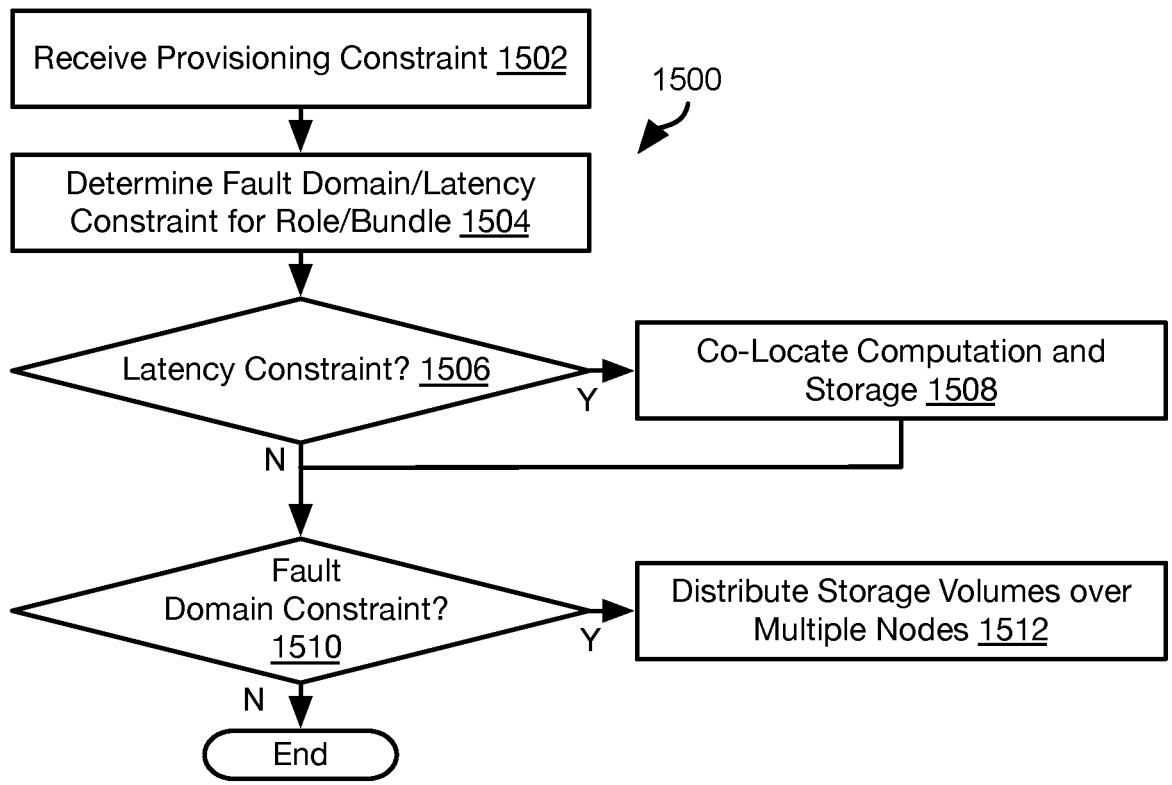
FIG. 15 is a process flow diagram of a method for implementing provisioning constraints in accordance with an embodiment of the present invention.

Referring to FIG. 15, the illustrated method 1500 may be used to implement provisioning constraints 1314 for a role 1312 or constraints for an entire bundled application 1302. The method 1500 may be executed by the orchestration layer 1300, storage manager 102, or a combination of the two.

The method 1500 may include receiving 1502 the provisioning constraint 1314 for one or more roles 1312 of the bundled application 1302 and determining 1504 whether the constraint 1314 specify one or both of a fault domain constraint and a latency constraint.

If a latency constraint is found 1506 to be included for a role 1312, then computational resources and storage resources to be provisioned for the role 1312 may be constrained 1508 to be co-located. In particular, latency may be specified in terms of (a) a minimum network delay, (b) a minimum network throughput, (c) an explicit constraint to place computation and storage resources in the same subnetwork, or (d) an explicit constraint to place computation and storage resources on the same node, i.e. a hybrid compute and storage node 110, 106 that performs the functions of both types of nodes with a single computer.

This constraint may be passed to the storage manager 102, which then allocates computational and storage requirements according to it. In particular, one or more storage volumes for the role 1312 will be assigned to storage nodes 106 that can either (a) meet the latency requirement with respect to compute nodes 110 allocated to the role 1312 (b) also provide the computational resources required for the role 1312.

If the constrain for a role 1312 is found 1510 to include a fault domain constraint, then storage volumes for the role 1312 may be distributed 1512 among the storage nodes 106 of the distributed storage system 100 according to this requirement. For example, if storage volume B is a redundant (e.g., replica or backup copy) of storage volume A, the fault domain constraint may indicate this fact. Accordingly, the storage manager 102 may assign storage volume B to a different storage node 106 than storage volume A. Various degrees of constraint may be specified. For example, a fault domain constraint may simply require a different storage device 108 but not require a different storage node 106. A fault domain constraint may require that storage nodes 106 to which storage volumes are assigned by in separate subnetworks, different geographic locations, or have some other degree of separation. Similar fault domain constraints may be specified for roles 1312, which may be constrained to execute on different compute nodes 110 in order to provide redundant services and reduce downtime.

The provisioning constraints 1502 based on fault domains and/or latency may be combined with one or more other constraints. For example, a performance constraint (IOPs/second) for a storage node may be imposed. Accordingly, only those compute nodes meeting the performance requirement and the fault domain and/or latency requirements will be selected for provisioning.

As noted above, provisioning 1306 may define a processing requirement, such as a number of processing cores and an amount of storage for a role. Accordingly, compute nodes 110 may be selected at step 1508 such that both the latency requirement and processing requirement are met.

Figure 16:
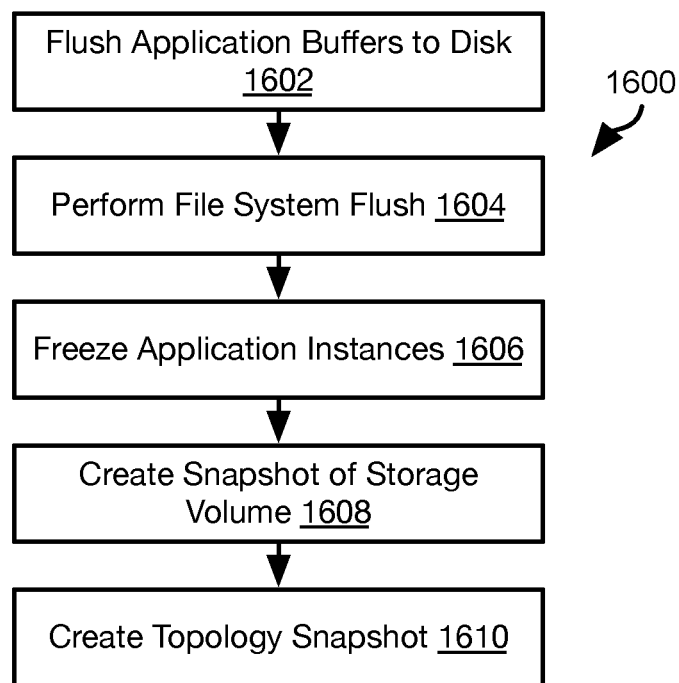
FIG. 16 is a process flow diagram of a method for creating a snapshot of a multi-role application in accordance with an embodiment of the present invention.

Referring to FIG. 16, the illustrated method 1600 may be executed by the orchestration layer 1302 with respect to a bundled application 1302 in order to create a snapshot of the bundled application 1302 that can be later restored (see the method 1700 of FIG. 17).

The method 1600 may include flushing 1602 application buffers to disk. In many instances, performance of an application is accelerated by maintaining data in a cache in memory, such that data in the cache is accessed and updated without requiring writing to a disk in many instances, as known in the art. Accordingly, this buffer may be flushed 1602 to disk by writing all valid data (i.e., not outdated due to a subsequent write) in the cache to the storage device 108 to which that data is addressed, e.g., to which the storage volume referenced by the data is assigned.

In a like manner, a file system flush may be performed 1604. Performing a file system flush may include ensuring that all IOPs pending to be performed by the file system have been executed, i.e. written to disk. As for step 1602, data written to a cache for the file system this is valid may be written to a storage device 108 to which the data is addressed, e.g., to which the storage volume referenced by the data is assigned.

The method 1600 may then include freezing 1606 the application instances 1322 of each role 1312. In particular, inasmuch as each instance 1322 is executing within container 1320, the containers 1320 for the roles 1312 may be instructed to pause execution of each instance 1322. This may include stopping execution and saving a state of execution of each instance 1322 (state variables, register contents, program pointers, function stack, etc.).

The method 1600 may further include creating 1608 a snapshot of storage volumes provisioned for the bundled application. This may include executing the method 200 of FIG. 2 or any of the above-described approaches for implementing a snapshot of a storage volume.

The method 1600 may further include creating 1610 a topology snapshot for the bundled application 1302. The topology of an application may include some or all of the following information as constituted at the time of executing step 1610 a listing of the roles 1312, which may include one or more instances 1322 of the same role 1322, relationships between application instances 1322 of roles 1312 (name space cross-references, configuration parameters), storage volumes assigned to roles 1312, or other information that describes the topology of the bundled application 1302. Applications may create metadata describing their state of operation. This data may also be saved as part of the topology snapshot.

After the snapshot is created according to the method 1600, the application instances may be restarted and the bundled application 1302 may continue to operate. If desired, the application may then be rolled back to the snapshot created according to the method 1600, as described below with respect to FIG. 17.

Figure 17:
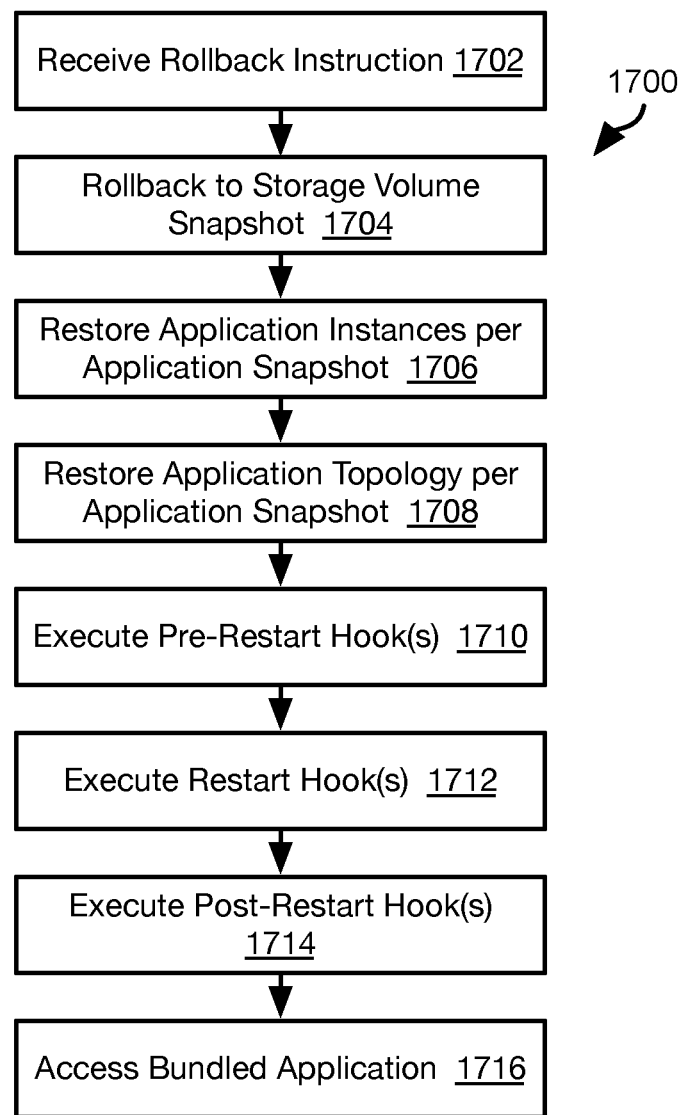
FIG. 17 is a process flow diagram of a method for rolling back a multi-role application in accordance with an embodiment of the present invention.

FIG. 17 illustrates a method 1700 for rolling back a bundled application 1302 to a snapshot, such as a snapshot created according to the method 1600. The method 1700 may be executed by one or both of the orchestration layer 1300 and the storage manager 102.

The method 1700 includes receiving 1702 a rollback instruction, such as from an administrator desiring to return to a stable version of the bundled application 1302. The remaining steps of the method 1300 may be executed in response to the rollback instruction.

The method 1700 may include rolling 1704 back storage volumes assigned to the bundled application 1302 to the snapshots created for the snapshot of the bundled application 1302 (e.g., at step 1608 of the method 1600). This may include executing the method 1000 of FIG. 10 or performing any other approach for rolling back a storage volume to a prior state.

The method 1700 may include restoring 1706 application instances from the application snapshot. As described above with respect to step 1606 of the method 1600, an application instance 1322 may be frozen. Accordingly, data describing a state of execution of the application instance 1322 may be reloaded into a container 1302 for that instance. If needed, the container for that application instance 1322 may be created and the instance 1322 loaded into it prior to loading the state of execution. This is particularly the case where the number of application instances has changed since the application snapshot was create.

The method 1700 may further include restoring 1708 the application topology saved for the bundled application at step 1610. Accordingly, relationships between application instances 1322 of roles 1312 (name space cross-references, configuration parameters), storage volumes assigned to roles 1312, or other information that describes the topology of the bundled application 1302 may be restored as it was at the time the application snapshot was created The method 1700 further include executing 1710, 1712, 1714 a pre-restart hook, restart hook, and post restart hook defined for the bundled application. As described above, each hook may be a routine defined by a developer to be executed for a particular action, restarting in this case. In step 1712, execution of the instances 1322 for the roles 1322 may be restarted, along with any other actions specified by the developer in the restart hook.

The bundled application 1302 as restored at steps 1704-1714 may then be accessed 1716 as defined by the programming of the application instances and the restored application topology.

Note that the snapshot of the bundled application 1302 may be restarted on different storage and compute nodes 106, 110 than those on which the bundled application 1302 was executing when the snapshot was created. Accordingly, the application snapshot may be restarted as a clone of the bundled application 1302 or moved to different hardware when executing the method 1700.

In some instances, the hooks of steps 1710, 1712, 1714 may be different when the application snapshot is being restarted as a clone as desired by a developer. For example, a developer may desire to scale the clone application to increase or decrease a number of databases, number of partitions of a database, or other aspect of the clone application. Accordingly, the hooks of steps 1710, 1712, 1714 may implement routines to implement this increase or decrease.

For example, some applications are able to automatically detect the number of partitions of a database. In such instances, some or all of the hooks 1710, 1712, 1714 may reduce the number of partitions in a database of the clone applications and rely on the application to discover this change. In other instances, some or all of the hooks 1710, 1712, 1714 may be programmed to configure an application to access the database with the reduced number of partitions where the application is unable to configure itself.

Figure 18:
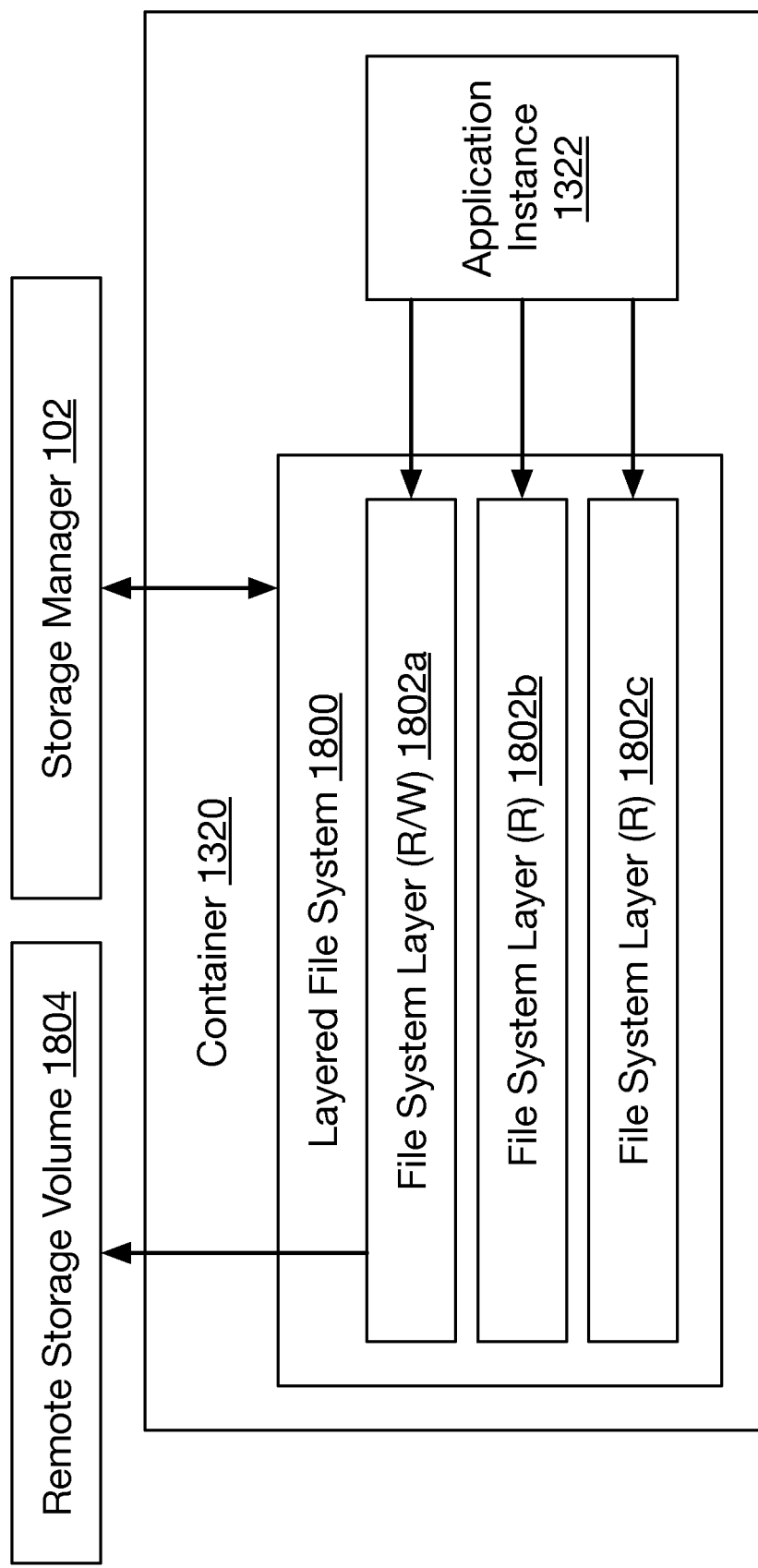
FIG. 18 is a diagram illustrating the use of a layered file system to improve application portability in accordance with an embodiment of the present invention.

Referring to FIG. 18, as noted above, containers 1320 may be implemented as DOCKER containers. However, DOCKER containers are not particularly suited for implementing stateful applications in which some or all of the state of an application is stored in persistent storage. This may be a disadvantage, particularly where a snapshot of an application is to be create and used for rolling back or cloning (see discussion of FIG. 17).

In the illustrated approach, a DOCKER container 1320 is modified to use an external graph driver plugin for storing persistent data. In the illustrated embodiment, the graph driver plugin implements a layered file system 1800. In the illustrated implementation, the layered file system includes various layers 1802a-1802c that are combined with one another to define a file system as known in the art of graph driver plugins for use with DOCKER containers. In the illustrated embodiment, only one layer 1802a is a read/write (R/W) layer and the remaining layers are read only layers. The R/W layer 1802a may be configured to mount a remote storage volume 1804 implemented by a storage node 106 according to the methods described herein (see, e.g., FIGS. 1 through 7). As described above, the storage volume 1804 may be a virtualized storage volume that is implemented without the container 1320 having data regarding a storage node 106 or device 108 on which the storage volume is actually stored.

In this manner, any persistent data written or changed by an application instance 1322 executed by the container 1320 will be performed on the remote storage volume 1804. Accordingly, when a snapshot of the container 1320 is made or the container is moved to a different location, the persistent data may be copied or recreated using the remote storage volume. No tracking of changes or other awareness of the persistent state of the application instance 1322 is required in order to achieve this functionality due to the use of the remote storage volume 1804 to implement the R/W layer 1802a.

Figure 19:
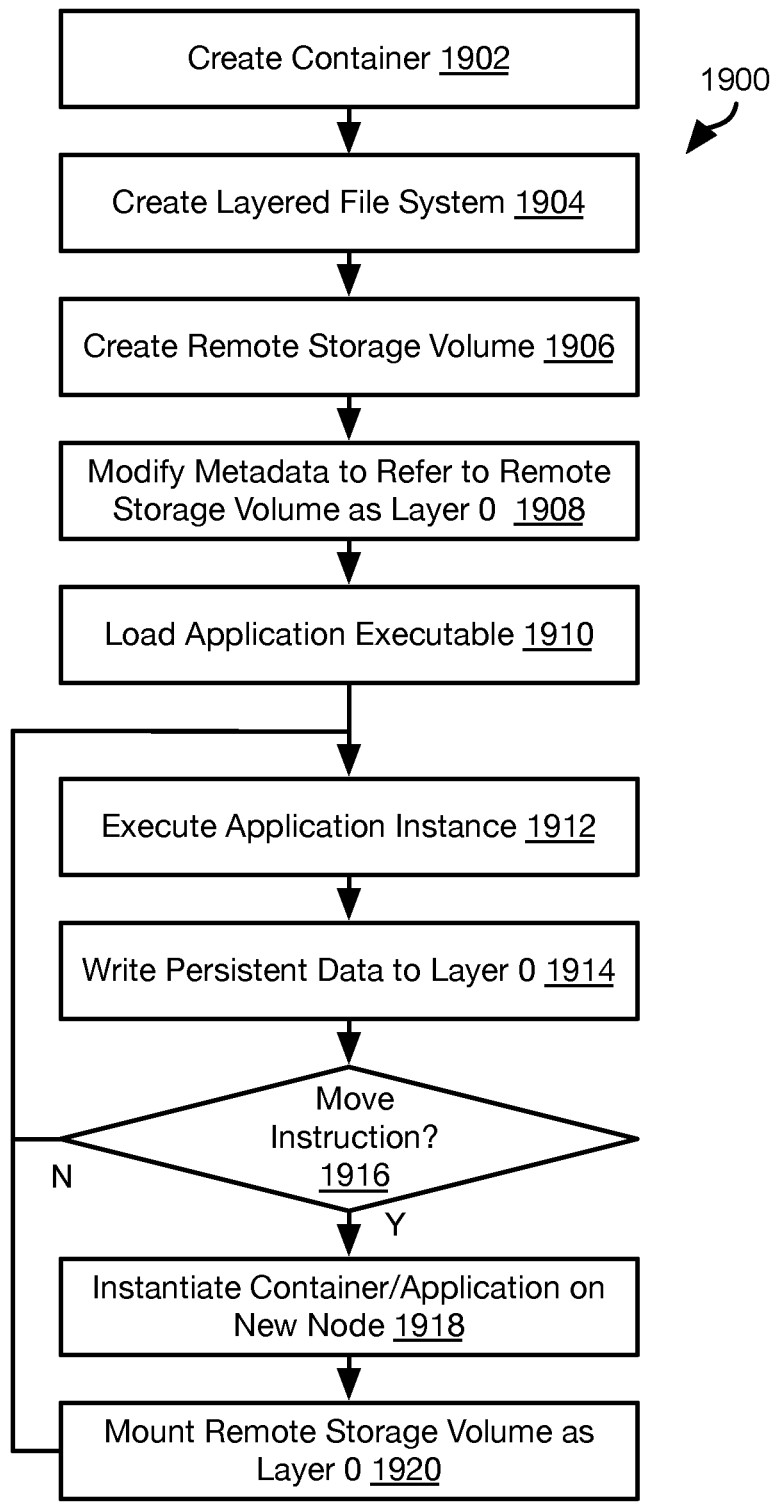
FIG. 19 is a process flow diagram of a method for creating and moving a portable application in accordance with an embodiment of the present invention.

FIG. 19 illustrates a method 1900 for using the architecture shown in FIG. 18. The method 1900 may be executed on a compute node 110 or hybrid node. The method 1900 may be executed as part of deployment of a bundled application 1300 in order to create and start a container 1320 on the compute node 110.

The method 1900 may include creating 1902 a container 1320, e.g. a DOCKER container, on the compute node 110 and creating 1904 a layered file system, such as by associating a graph driver plugin with the container 1320. A remote storage volume may also be created 1906, as described above with respect to FIGS. 1 through 7. Creating 1906 a storage volume may be performed by requesting allocation of a storage volume by the storage manager 102.

The method 1900 may include modifying 1908 metadata of the layered file system to refer to the remote storage volume as layer 0 (the R/W layer) of the layered file system.

An instance 1322 of an application executable may be loaded 1910 into the container 1320 as well. The application instance 1322 may be executed 1912, which may result in writing 1914 of persistent date data for the application instance 1322. These writes will be routed by the graph driver plugin to the remote storage volume and persistently stored therein.

If a move instruction is found 1916 to have been received, the method 1900 may include instantiating 1918 a new container at a new location, e.g., a different compute node. The container may be loaded with an instance 1322 of the executable application. The method 1900 may further include mounting 1920 the remote storage volume from step 1906 to the new container as layer 0 of the layered file system. This may include modifying the metadata for the new container as described above with respect step 1908. The state of the application instance 1322 may therefore be created using the data in the remote storage volume.

In some embodiments, the container to be moved may be frozen and copied to the new location, rather than creating a new container. In that case, a clone of the remote storage volume storing the persistent state data may be mounted to create a clone of the container.

The move instruction of step 1916 may be an instruction to move the application instance or be part of a process of cloning the application instance. In either case, execution of the move may be proceeded with creating a snapshot of the application as described above with respect to FIG. 16. Likewise, steps 1918 and 1920 may be executed as part of the rollback process of FIG. 17.

Figure 20:
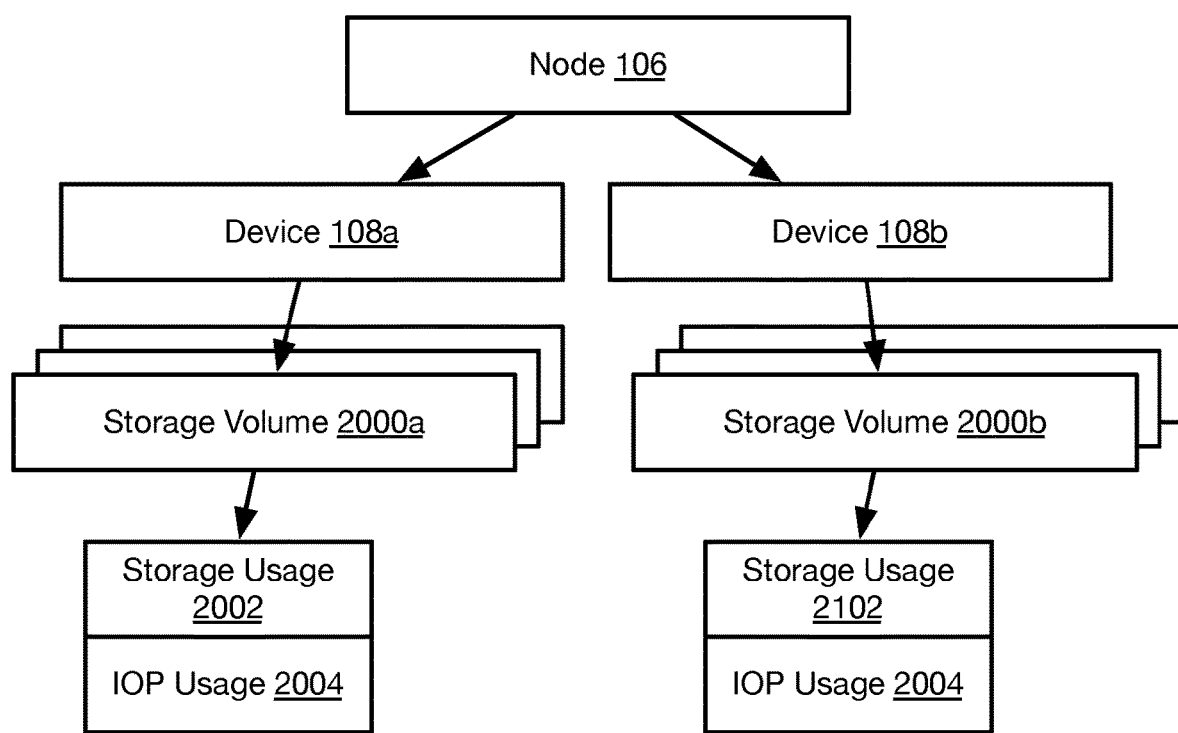
FIG. 20 is a schematic block diagram of components of a storage node in accordance with an embodiment of the present invention.

Referring to FIG. 20, a node 106, such as a storage node or hybrid node, has a plurality of storage devices 108a-108b mounted thereto, the storage devices 108a-108b being hard disk drives (HDD), solid state drives (SSD), cloud storage, or some other type of storage device. Each device 108a-108b stores one or more storage volumes 2000a or one or more slices of one or more storage volumes 2000a, 2000b, such as according to the approach described herein above. In particular, as described above, slices may be assigned individually to devices 108a, 108b such that an entire storage volume 2000a, 2000b need not reside on the same device 108a, 108b or even devices mounted to the same node 106.

For each device 108a, 108b, the node 106 may collect usage statistics. For example, a software component implementing disk virtualization in coordination with the storage manager 102 may track IOPs and usage of the storage volumes 2000a-2000b and/or slices of storage volumes 2000a, 2000b. In particular, storage usage 2002 may indicate the amount of actual data stored in a storage volume 2000a, 2000b or slice of a storage volume 2000a, 2000b, such as in the form of a number of allocated segments. IOP usage 2004 may indicate a number of IOPs addressed to a storage volume 2000a, 2000b or slice of a storage volume 2000a, 2000b. IOP usage may track one or both of write IOPs and read IOPs and may track a total number of IOPs per unit time.

Figure 21:
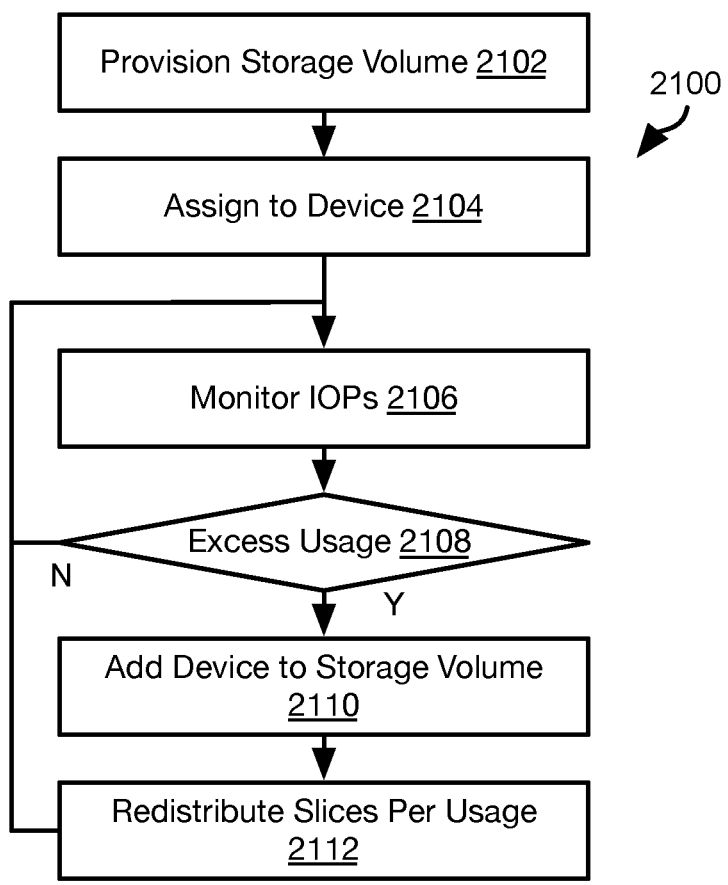
FIG. 21 is a process flow diagram of a method for assigning storage volumes to a disk of a storage node in accordance with an embodiment of the present invention.

FIG. 21 illustrates a method 2100 for assigning storage volumes to devices 108a, 108b of a node 106. The method 2100 may include provisioning 2102 a storage volume 2000a for use by a bundled application 1302 according to the methods described above. The storage volume 2000a may then be assigned 2104 to a device 108a of the node 106. For example, the node 106 may be notified of the assignment and the assignment to the node 106 and device 108a may be recorded in the volume map 300 for the storage volume 2000a.

The method 2100 may further include monitoring IOPs 2106 for the storage volume 2000a and evaluating 2108 whether IOP usage is excessive. In particular, this may include comparing the number of IOPs in a given time window, e.g. 10 ms, 100 ms, 1 second, or the like, to an IOP threshold. If this threshold is exceeded, then the IOPs may be determined 2108 to be excessive. The threshold may be static or dynamic. For example, it may be a function of an average number of IOPs per storage volume assigned to the node 106. The evaluation of step 2108 may evaluate the number of IOPs in the time window for those slices of the storage volume 2000a assigned to the device 108a separately from the IOPs for slices assigned to other devices 108b or nodes.

If the usage is found 2108 to be excessive, then another device may be added 2110 to the storage volume 2000a and one or more slices of the storage volume may be redistributed 2112. For example, a load balancing approach may be used. The number of IOPs in a time window for the slices of the volume 2000a may be measured (or past measurements are reused). A first set of slices may be assigned to the first device 108a and a second set of slices may be assigned to the second device such that the total number of IOPs in the time window for the slices of the first set is approximately equal to the total number of IOPs in the time window for the slices in the second set. "Approximately equal" may mean equal to within a value between the number of IOPs in the time window for the slice with the highest number of IOPs in the time window and the number of IOPs in the time window for the slice with the lowest number of IOPs in the time window.

Steps 2106-2112 may be performed periodically such that IOPs are monitored 2106 for a next time window after (and possibly overlapping) the window used at step 2106 of a previous iteration. Subsequent iterations may result in addition of devices or further redistributing 2112 of slices based on excess usage. In some instances, redistribution 2112 may be performed during an iteration of steps 2106-2112 without adding 2110 a device, such as when neither device 108a, 108b is found to be being used within a threshold percentage of its IOPs capacity within the time window of step 2106.

Figure 22:
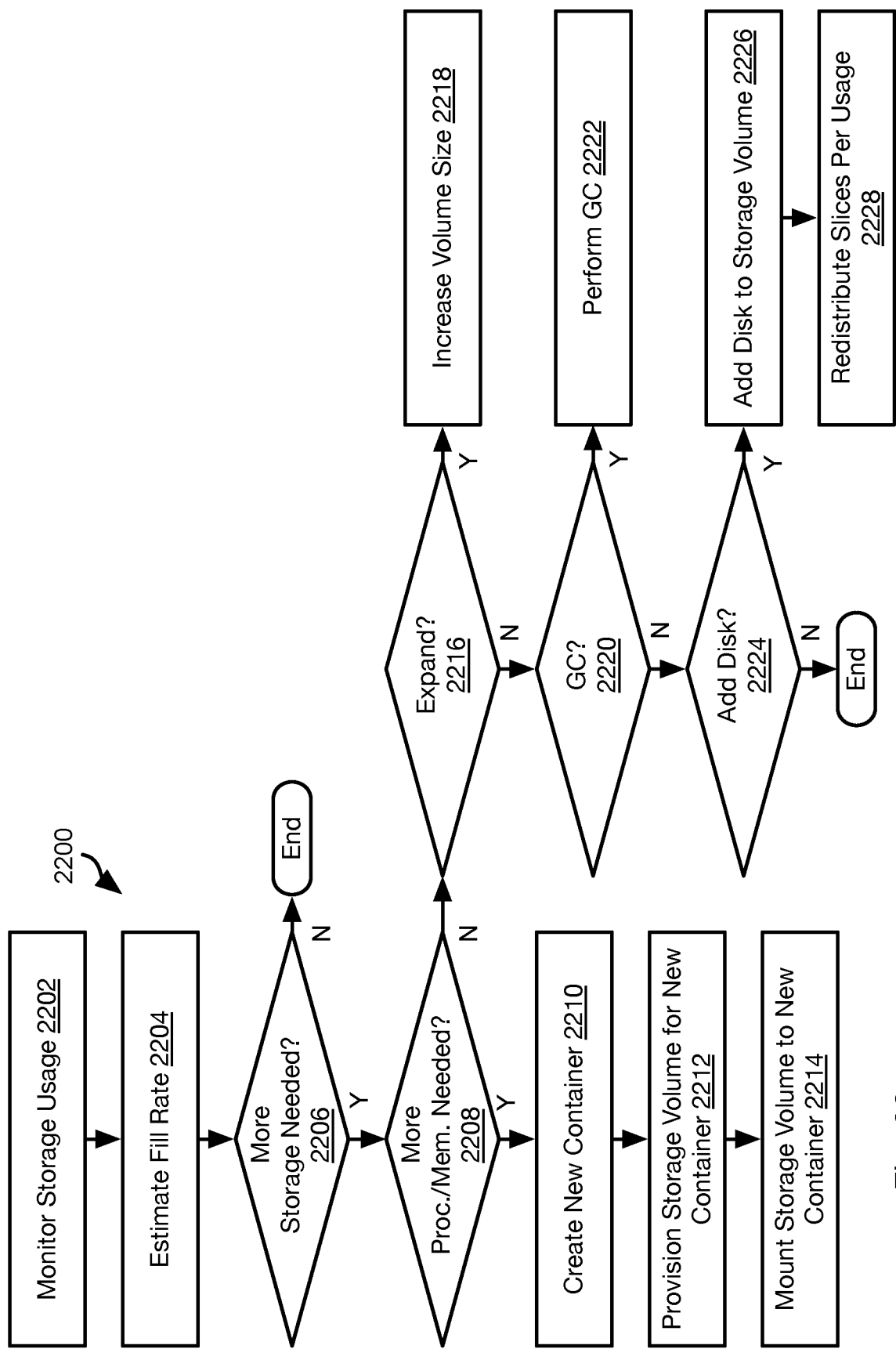
FIG. 22 is a process flow diagram of a method for managing storage volumes of a bundled application in accordance with an embodiment of the present invention.

Referring to FIG. 22, the illustrated method 2200 may be performed by the node 106 and/or the orchestration layer 1300 in order to adjust the storage available for a bundled application on the node 106.

The method 2200 may include monitoring 2202 storage usage of the storage volumes hosted by the node 106. For example, storage usage may include counting, by an agent implementing the storage scheme described herein, the number of segments allocated to each storage volume 2000a, 2000b and/or slice of each storage volume 2000a, 2000b. For example, this information may be obtained from the segment map 314.

The method 2200 may further include estimating 2204 a fill rate for the storage volumes 2000a, 2000b on the node 106, which may include the fill rate for the set of slices of a particular storage volume 2000a, 2000b on a particular device 108a, 108b. The method 2200 may be performed for multiple storage volumes separately ("the subject volume"). In particular, a rate of write TOP generation, segment allocation, or other metric of storage increase per unit time on the node 106 for the subject volume within a predetermined time window may be calculated. The fill rate for the subject volume may be evaluated with respect to some or all of (a) an amount of unused storage in the subject volume, (b) an amount of unused storage in slices of the subject volume assigned to the node 106, (c) an amount of unused storage on an individual device 108a, 108b, and (d) a total amount of unused storage on all devices 108a, 108b mounted to the storage node 106. Using these values, step 2204 may further include estimating a time until full as one or more of the values of (a)-(d) divided individually by the fill rate.

The method 2200 may include evaluating 2206 whether more storage is needed for the subject node. In particular, if a time until full according to or more of values (a)-(d) is below a threshold time, it may be determined 2206 that more storage is needed for the subject volume.

If no storage is found 2206 to be needed, then the method 2200 may end and be repeated at a later time, such as according to a predefined repetition period.

If more storage is found 2206 to be needed, the method 2200 may further include evaluating 2208 whether more memory, processors, or other computing resources are needed. In particular, high usage of storage may be accompanied by additional requirements for processing, memory, network bandwidth, or other resources.

Accordingly, step 2200 may include evaluating current (e.g., measured during a time window defined for measuring) memory usage, processor usage, network bandwidth usage, NIC usage (network interface controller), rack usage (e.g., number of rack blades in use and amount of use of each blade), or other usage statistic. For example, where the node 106 is a hybrid node, then these statistics may be measured to characterize processing needs of one or more containers hosted by the node 106 and to which the subject volume is mounted. A measured usage value may be compared to a corresponding threshold, which, if exceeded, results in a positive outcome to the evaluation of step 2208.

For example, where step 2208 indicates more processing or memory is needed, the method 2200 may include creating 2210 a new container 1320, provisioning 2212 a new storage volume, and mounting 2214 the new storage volume to the new container 1320. In particular, the new container may be loaded with an instance 1322 of the same application as is accessing the subject volume. In this manner, IOPs may be distributed across multiple containers 1320 and multiple storage volumes thereby resolving the need for more storage and more processors and/or memory. In a like manner, provisioning a new container and storage volume at a different location in a distributed computing system may also eliminate bottlenecks for network traffic determined to be present at step 2208.

Where steps 2210-2214 are executed, the orchestration layer 1300 may notify the bundled application 1302 of the available new container and configure the bundled application 1302 to use the new container, such as by executing a hook 1310 that performs these functions as specified by a developer of the application 1302.

If more storage is found 2206 to be needed but more processing, memory, or other resources are not found 2208 to be needed, the method 2200 may evaluate one or more alternatives to handle the need for additional storage.

For example, the method 2200 may include evaluating 2216 whether expanding of the subject volume, i.e., increasing its size, is possible and desirable. For example, if a device 108a-108b has unused storage capacity, the size of the subject volume may be increased 2218 to use up some or all of this capacity, such that the amount of unused storage capacity is above some threshold for excess capacity.

In some embodiments, step 2216 may include evaluating usage of the application's 1302 use of the subject volume. For example, where growth is slow and IOPs are nearly balanced between read and write IOPs, growing of the subject volume may be determined to be a suitable alternative.

If expanding is found 2216 not to be possible, the method 2200 may include evaluating 2220 whether performing garbage collection (GC) on the subject volume would resolve the lack of storage. For example, step 2220 may include evaluating some or all of the following: (a) an elapsed time since GC was performed on the subject volume, (b) an amount of invalid data in the subject volume, (c) and amount of valid data in the subject volume. Determining the amount of valid and invalid data in a slice of a storage volume may be performed as describe above (see description of FIG. 6). Values according to (a) or (c) may be compared to a corresponding threshold condition, which, if met, may invoke performing 2222 GC. For example, if the elapsed time is greater than an elapsed time, then GC may be performed. If the amount of invalid data is above an invalid data threshold, GC may be performed in some embodiments. If the amount of valid data is below a valid data threshold, GC may be performed in some embodiments.

The method 2200 may further include evaluating 2224 whether adding a disk is needed. In some embodiments, if neither of steps 2216-2220 are found to indicate other options for increasing storage, adding 2224 of a disk is found 2224 to be needed. In other cases, additional considerations may be evaluated at step 2224, such as whether an additional disk is mounted to the node 106 or is available for mounting to the node, such as based on an inventory or topology of a network as provided to the node 106 or orchestration layer. If addition of a disk to the subject volume is determined 2224 to be possible and desirable, the method 2200 may include adding 2226 an additional disk to the subject volume and redistributing 2228 slices of the subject volume, such as in the manner described for steps 2110 and 2112 of the method 2100.

The method 2200 may be repeated periodically in order to accommodate changes in usage.

Figure 23:
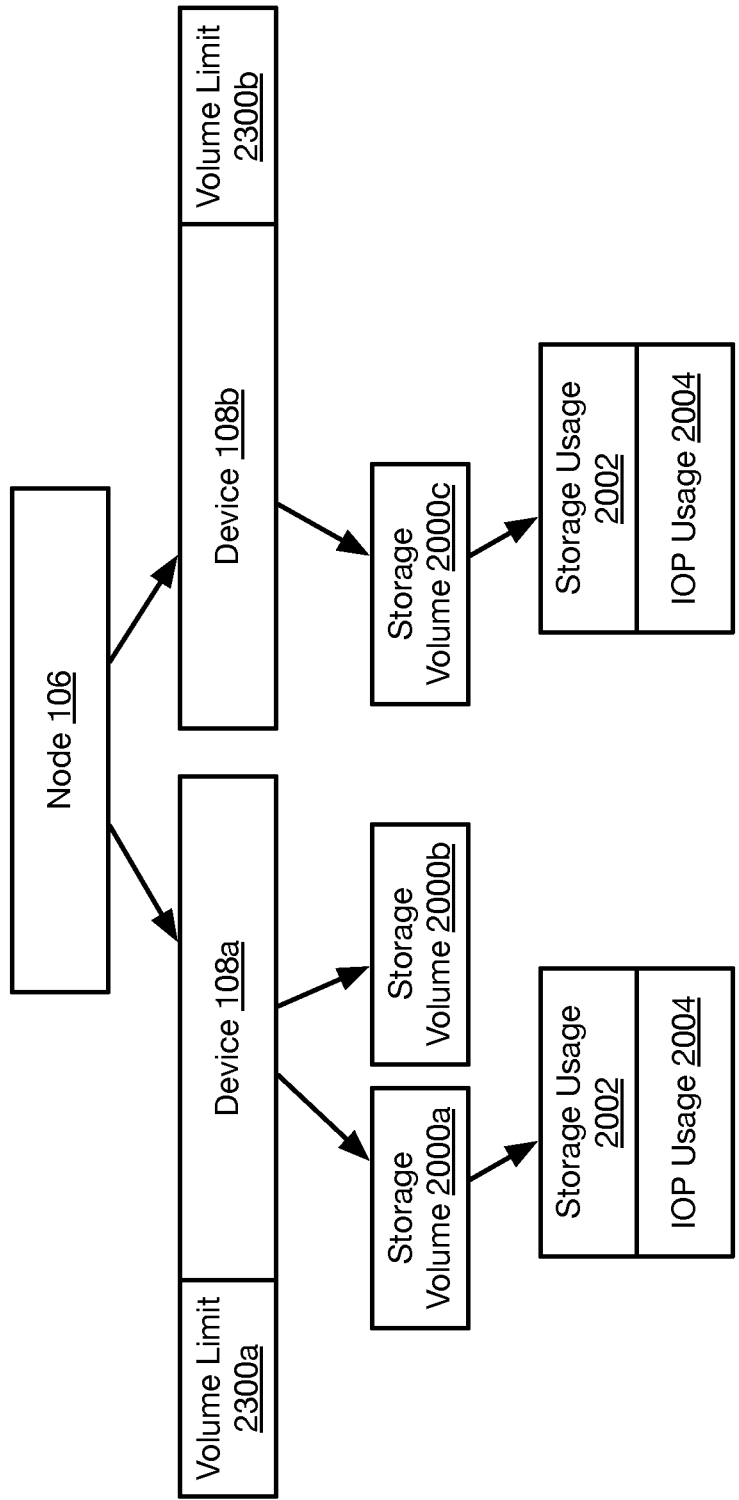
FIG. 23 is a schematic block diagram of data structures for managing a number of volumes per disk in accordance with an embodiment of the present invention.

Referring to FIG. 23, In some embodiments, the node 106 may additionally maintain a volume limit 2300a, 2300b for each device 108a, 108b that specifies the number of storage volumes 2000a-2000c that may be allocated to that device 108a, 108b. The limit may be specified as a number of volumes, a number of slices, a maximum quantity of storage represented by allocated storage volumes (GB, TB, etc.). The limits 2300a, 2300b may be set initially by the orchestration layer 1300 and may subsequently be adjusted by logic executing on the node 106 or orchestration layer 1300 as described with respect to FIG. 24.

Figure 24:
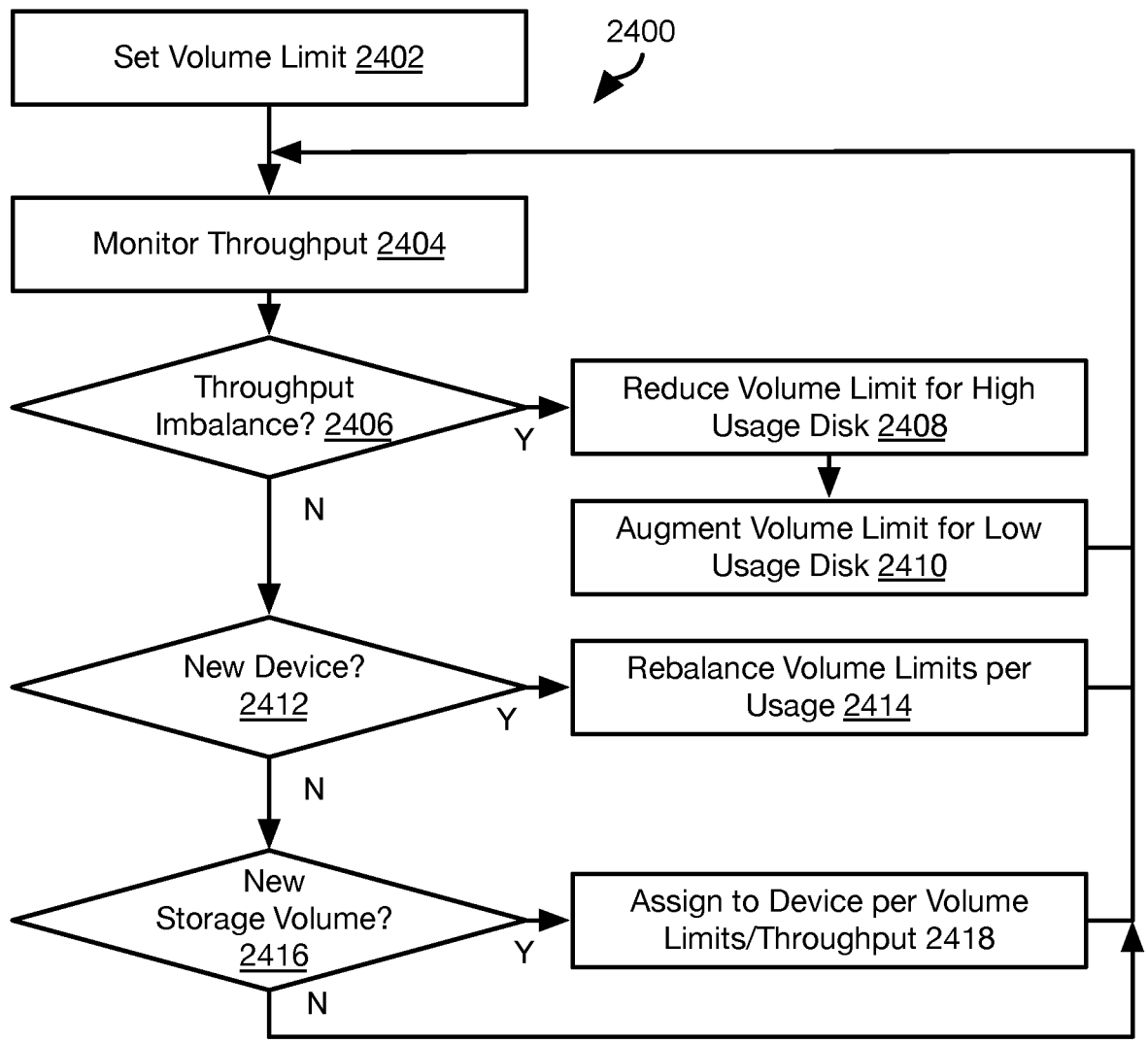
FIG. 24 is a process flow diagram of a method for managing the number of volumes per disk in accordance with an embodiment of the present invention.

FIG. 24 illustrates a method 2400 for adjusting the volume limit for devices 108a, 108b of a node 106 and which may be executed by the node 106 and/or orchestration layer 1300.

The method 2400 may include setting 2402 an initial volume limit. This may be a system-wide default implemented by the orchestration layer 1300 or an application-wide limit specified by the bundled application 1302. The volume limit may be specified by a bundled application 1302 for each role 1312. The volume limit may be distributed by the orchestration layer 1300 to the nodes 106 to which storage devices 108a, 108b are mounted.

The method 2400 may further include monitoring 2404 throughput (IOPs) of the storage volumes 2000a, 2000b or slices of these volumes. In particular, the number of IOPs per unit time (e.g., per 10 ms, 100 ms, 1 second, or other period) may be measured periodically. Read and write IOPs may be counted separately or aggregated.

The method 2400 may further include evaluating 2406 whether there is a throughput imbalance on the device 108a, 108b of the node 106. Evaluating throughput may include evaluating read and write IOPs and may also include evaluating IOPs from performing garbage collection (GC), replication, or other sources of IOPs. For example, if the aggregate throughput of the volumes or slices of volumes on a device 108a, 108b may be determined to be imbalanced based on one or more of the following criteria:

1. The aggregate throughput is above a predetermined upper threshold for the device 108a, 108b.
2. The aggregate throughput is below a predetermined lower threshold for the device 108a, 108b.
3. The aggregate throughput of a first device 108a, 108b is above the throughput of a second device 108b, 108a of the node by some relative amount, e.g. T1 is greater than X*T2, where T1 is the throughput of the first device, T2 is the throughput of the second device, and X is a value greater than 1.
4. The aggregate throughput of a first device 108a, 108b is above the throughput of a second device 108b, 108a of the node by some relative amount, e.g. T1 is greater than Y+T2, where T1 is the throughput of the first device, T2 is the throughput of the second device, and Y is a predetermined number of IOPs per unit time.

If an imbalance is found 2406, the method 2400 may include reducing 2408 the volume limit for the device 108a, 108b having high throughput according to conditions 1, 3, or 4, above. For example, if the volume limit is 10, only two volumes (or some number of slices of volumes) have been assigned to device 108a, and its throughput is high enough to meet one of the conditions 1, 3, or 4, the volume limit for device 108a may be reduced, such as to a limit of two.

If an imbalance is found, the method 2400 may further include augmenting 2410 the volume limit for a device 108a, 108b that has low throughput according to condition 2 or is the second device where a first device meets condition 3 or 4. For example, a device 108b that has a number of volumes assigned thereto meeting the volume limit may have its volume limit increased to permit the assignment of more storage volumes or slices inasmuch as its throughput is low.

Note that in some instances only step 2408 is executed where an imbalance found 2406. In other instances, both of steps 2408a and 2410 are executed. In still others only step 2410 is performed. For example, if condition 1 is met, only step 2408 is performed in some embodiments. If condition 2 is met, only step 2410 is performed in some embodiments.

The method 2400 may further include evaluating 2412 whether a new device has been added to the node 106. In that case, the method 2400 may include rebalancing 2414 volume limits according to usage. For example, the volume limit of a first device having higher throughput relative to a second device of the node may be reduced in response to addition of a third device such that additional volumes will be assigned to the third device. Where the rebalancing of the load limits causes the volume limit of the first device to be less than the number of volumes assigned to it, one or more volumes assigned to the first device may be transferred to the third device. This transfer may be based on usage. For example, volumes may be transferred to the third device based on throughput with the lowest throughput volumes being transferred until the volume limit is met on the first device.

In the event that a new storage volume is found 2416 to be added to the node 106, the storage volume maybe assigned 2418 to a device based on the current load limits as adjusted according to any of the foregoing steps and throughput of the devices. For example, the new volume may be assigned to the device having the lowest throughput of those devices having volumes assigned thereto under their volume limits.

Figure 25:
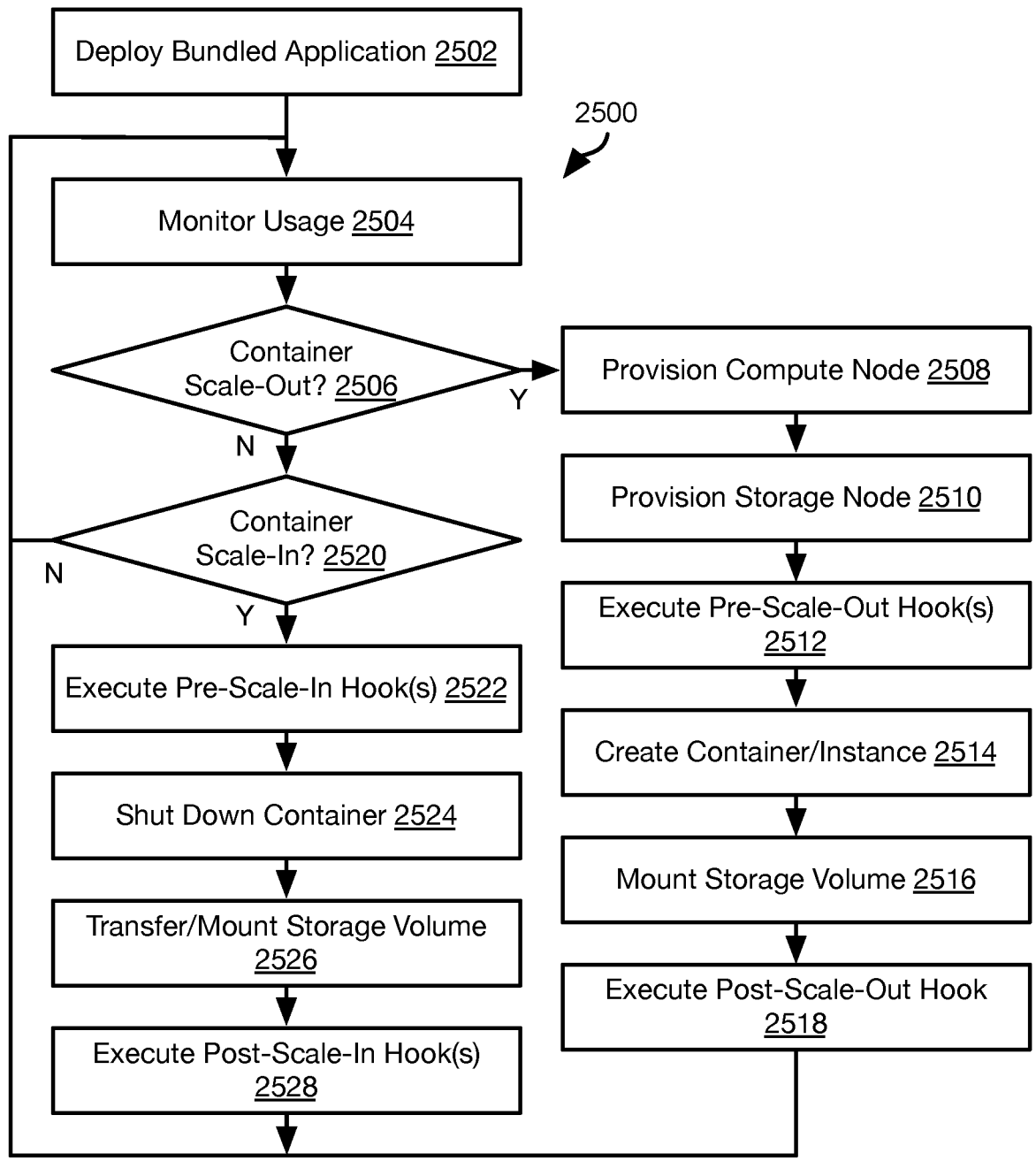
FIG. 25 is a process flow diagram of a method for scaling out an application in accordance with an embodiment of the present invention.

Referring to FIG. 25, the illustrated method 2500 may be used to adjust the topology of a bundled application 1302 following deployment.

The method 2500 may include deploying 2502, by the orchestration layer 1300, a bundled application 1302, such as according to the methods described above, see, e.g., FIGS. 13 and 14. The method 2500 may further include monitoring 2504 usage of the components of the bundled application 1302 following deployment. Monitoring may include monitoring IOPs processing of storage volumes (see, e.g., step 2106 of FIG. 21, 2404 of FIG. 24). Monitoring 2504 may further include evaluating usage of containers 1320. For example, statistics from containers 1320 or application instances 1322 executing within the containers may be stored in log files accessible by the orchestration layer 1300 or otherwise reported to the orchestration layer 1300 by the containers 1320 and/or application instances 1322. In other embodiments, a bundled application 1302 may define a software component that characterizes loading of the application instances 1322 of the bundled application 1302. Accordingly, the orchestration layer 1300 may access this component, such as by means of an exposed API, in order to monitor loading of the application instance 1322 of the bundled application 1302.

The method 2500 may further include evaluating 2506 whether the usage as determined at step 2504 is such that scaling out of the containers 1320 and corresponding application instances 1322 is needed. For example, the provisioning 1306 for the bundled application may specify a usage for a role 1312 at which scaling out of the at role 1312 is required. Alternatively, provisioning 1306 may specify a maximum loading per instance 1322 for a role 1312 after which another instance 1322 and corresponding container 1320 are to be added.

If such a condition in the provisioning 1306 is found 2506 is found to be met for a role 1312 ("the subject role"), the method 2500 may include providing one or more additional containers and corresponding storage volumes, such as according to steps 2508-2518.

The method 2500 may include provisioning 2508 a compute node 110 or hybrid node that may be different from nodes currently executing instances 1322 of the subject role. Provisioning 2508 may be performed subject to provisioning constraints 1314 for the subject role. In particular, the node selected at step 2508 may be selected such that it:

Satisfies any fault domain ("anti-affinity") constraints such that the node selected is not the same node hosting another container 1320 of the bundled application 1302 that is in a different fault domain.

Satisfies any latency ("affinity") constraints such that the node selected is on the same node as a storage volume required to be co-located with the container (the storage volume may be moved to a new node to achieve this in some embodiments) or is otherwise in a required proximity (same node, rack, data center, etc.) to another resource (container, storage volume) of the bundled application 1302 as specified by the bundled application 1302.

The method 2500 may further include provisioning 2510 a storage node 106. Where the node selected at step 2508 is a hybrid node that also functions as a storage node, step 2510 may be omitted. Step 2510 may include selecting the storage node 106 according to any provisioning constraints 1314 of the subject role. For example, the new storage node may be selected such that it:

Satisfies any fault domain ("anti-affinity") constraints such that the node selected is not the same node hosting another storage volume of the bundled application 1302 that is in a different fault domain.

Satisfies any latency ("affinity") constraints such that the node selected is on the same node as a container required to be co-located with the storage volume (the container may be moved to a new node to achieve this in some embodiments) or is otherwise in a required proximity (same node, rack, data center, etc.) to another resource (container, storage volume) of the bundled application 1302 as specified by the bundled application 1302.

Where scale out is found 2506 to be needed, the method 1300 may further include executing 2512 one or more pre-scale-up hooks 1310 with respect to the instances 1322 of the subject role. For example, any pre-scale-up hook 1310 may be executed after the provisioning steps of 2508, 2510. As noted above, a hook 1310 is a script executed by or with respect to an application instance as part of an action. Accordingly, where a hook has been defined for scaling out, this hook 1310 may be executed with respect to one or more executing instance 1322 of the subject role and/or instance 1322 of other roles that are determined by a developer to be impacted by the scaling out of the subject role.

The method 2500 may further include creating 2514 a container 1320 and loading it with an application instance 1322 for the subject role. In some embodiments, an image is defined of a container 1320 loaded with the application instance 1322. Accordingly, step 2514 may include loading this image on to the node selected at step 2508.

The method 2500 may further include mounting 2516 a storage volume to the container 1320 created at step 2514, such as a storage volume provisioned on the node selected at step 2510. The storage volume may be implemented according to the methods described herein (see, e.g., FIGS. 1-12).

The method 2500 may further include executing 2518 any post-scale-up hook 1310 defined by the bundled application 1302 for scaling out of the subject role. The post-scale-up hook 1310 may include one or more scripts that are executed by the orchestration layer 1300 with respect to the new container 1320 and instance 1322 created at steps 2514 or any other container 1320 and instance 1322 for the subject role or an instance 1322 of a different role of the bundled application 1302. For example, the post-scale-up hook 1310 may configure one or more other application instances 1322 to use a service provide by the new container 1320 and instance 1322. For example, where a component distributes tasks to the instance 1322 of a role 1312, this component may be configured to distribute tasks to the new container 1320 and instance 1322 for the subject role along with any previously-provisioned containers 1320 and instances 1322.

The method 2500 may further include evaluating 2520 whether usage is such that scaling in is necessary for the subject role. For example, the provisioning 1306 for the bundled application may specify a usage for a role 1312 at which scaling in of that role 1312 is required. Alternatively, provisioning 1306 may specify a minimum loading per instance 1322 for a role 1312 after which an instance 1322 and corresponding container 1320 are to be removed. In a typical application, the minimum loading is less than the maximum loading at which the subject role will be scaled up (see step 2506). In this manner, there is a range of loading values between the maximum and minimum loadings within which no scaling out or scaling in is performed.

If the condition of step 2520 is met for scaling in the subject role, the method 2500 may include executing 2522 any pre-scale-down hook 1310 specified by a developer for the subject role. For example, the pre-scale down hook 1310 may transfer tasks from a container 1320 to be shut down ("the selected container"), e.g. a least loaded container or randomly selected container, to another container 1320 for the subject role.

The method 2500 may further include shutting down 2524 the selected container. At step 2526, the method 2500 may include one or (a) transferring data stored in a storage volume mounted to the selected container to another container 1320 hosting an instance 1322 of the subject role and (b) mounting the storage volume to the other container 1320. The method 2500 may further include executing 2528 a post-scale-down hook 1310 specified by the developer for the subject role. For example, the post-scale-down hook may configure other components of the bundled application to no longer refer to the eliminated container 1320.

The method 2500 may be repeated periodically with scaling out or scaling in performed as needed.

Figure 26:
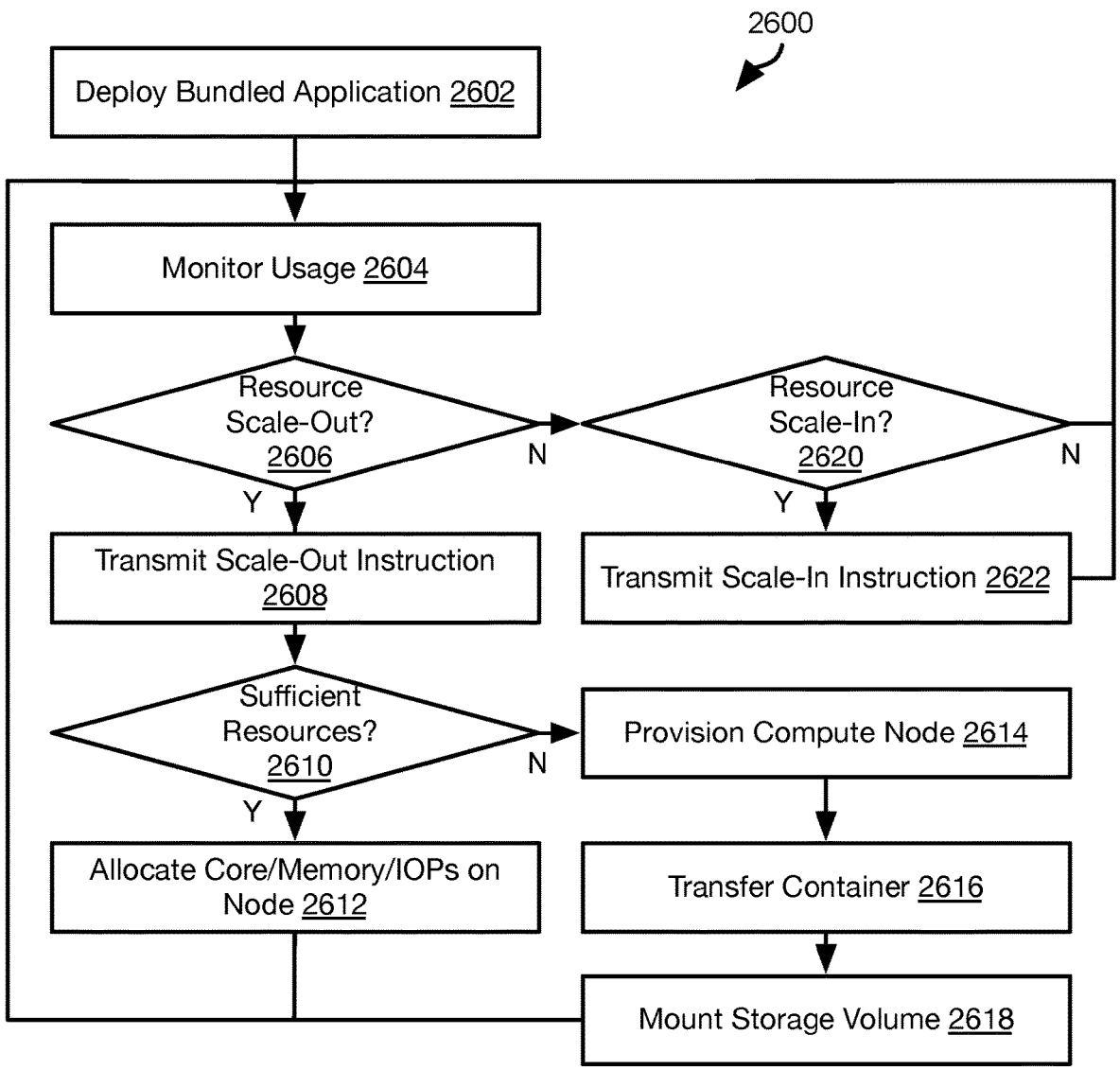
FIG. 26 is a process flow diagram of a method for increasing computing resources for an application in accordance with an embodiment of the present invention.

Referring to FIG. 26, the illustrated method 2600 may be used to increase or decrease the amount of computing resources (processor cores, memory) used by a container 1320 and its hosted application instance 1322 on a node (compute node 110 or hybrid node).

The method 2600 may include deploying 2602 a bundled application 1302 and monitoring 2604 usage of the bundled application 1302, such as in the manner described for steps 2502 and 2504 of the method 2500.

The method 2600 may include processing some or all of the containers 1320 of a bundled application according to the remaining steps of the method 2600. For example, the method 2600 may include evaluating 2606 for each container 1320 of the bundled application 1302 ("the subject container") whether scaling out of computing resources is required. For example, for the role 1312 for which the each container executes an application instance 1322 ("the subject role"), the provisioning 1306 may define a relationship between loading (number of IOPs or other metric of loading) of a container 1320 of the subject role and computing resources provisioned to the container 1320. For example, for a range of loading values, the provisioning 1306 may define a number of processor cores and amount of memory required for loading within that range. Accordingly, if the amount of resources currently provisioned for the subject container is less than what is specified in the provisioning 1306 for the current loading of the subject container, additional computing resources may be provisioned as described below. Note that the threshold loading for adding additional computing resources may be different from (e.g., lower than) a threshold loading at which an additional container will be provisioned according to the method 2500.

The step of monitoring 2604 and evaluating 2606 loading may be performed on the computing device hosting the orchestration layer 1300 or may be performed locally on the node executing the subject container ("the subject node"). Where steps 2604 and 2606 are performed by the orchestration layer 1300, the orchestration layer 1300 may transmit 2608 a scale out instruction to the subject node. Where steps 2604 and 2606 are performed locally, step 2608 may be omitted and scaling out may be performed in response to detecting a need for additional resources at step 2606.

The method 2600 may include evaluating 2610 whether a sufficient amount of computing resources is available on the subject node. For example, where M processor cores are available on the subject node and N cores are currently allocated, step 2610 may include evaluating whether M-N is greater than or equal to the number of cores required to be allocated to the subject container to meet the requirements evaluated at step 2606.

In a similar manner, where step 2606 indicates that more memory is needed, step 2610 may include evaluating whether an amount of memory of the subject node that is available to be allocated to containers 1320 and that is not already allocated to a container 1320 is greater than or equal to the amount of additional memory required by the subject container as determined at step 2608.

If the condition of step 2610 is met, then additional cores and/or memory required to meet the requirements indicated at step 2606 are allocated 2612 on the subject node. For example, an agent executing on the subject node may communicate to the subject container that additional memory and/or cores are available as allocated at step 2612. In some instances, step 2612 may additionally require restarting of the subject container, such as in the case where the subject container is executing a Java Virtual Machine (JVM).

Note that in some embodiments, the amount of memory and cores on the subject node that are available for allocation may be stored by the orchestration layer 1300. Likewise, the orchestration layer 1300 may store the allocation of the memory and cores to containers 1320 of bundled applications 1302 during deployment of the bundled applications. Accordingly, step 2610 may be performed by the orchestration layer 1300 rather than being performed on the subject node. Accordingly, step 2610 may be performed prior to step 2608 in such instances. The orchestration layer 1300 may also invoke performing 2612 the allocation on the subject node and record this allocation for use in determining future allocations on the subject node.

If step 2610 indicates that there are insufficient resources, the method 2600 may include provisioning 2614, such as by the orchestration layer 1300, another compute node that has an amount of available memory and number of available cores meeting the requirements of the subject container as determined at step 2606. The node selected at step 2614 may be selected subject to provisioning constraints (see step 2508 of FIG. 25).

The subject container may then be transferred 2616 to the new node selected at step 2614. For example, the state of the subject container may be transferred to a new container on the new node according to the approach described with respect to FIGS. 18 and 19 and/or the approach described with respect to FIGS. 16 and 17 for creating and restoring a snapshot of an application, including the containers thereof.

The method 2600 may further include mounting 2618 a storage volume formerly mounted to the subject container to the new container created at step 2616.

As for other embodiments disclosed herein, transferring of a container to a new node may be accompanied by executing pre-transfer and post-transfer hooks 1310 as specified by a developer for the subject role.

The method 2600 may include evaluating 2620 whether scaling in of computing resources is needed. For example, if the usage from step 2604 corresponds to a lower amount of computing resources than are currently allocated to the subject container as specified by the provisioning 1306 of the bundled application 1302.

In that case, the resources of the subject container may be scaled 2622 down. This may include the agent executing on the subject node reducing the resources available to the subject container. Step 2622 may include transmitting an instruction to scale down from the orchestration layer 1300 to the agent on the subject node and/or to the subject container, which will then process the instruction by reducing the allocation of computing resources by the subject container.

Figure 27:
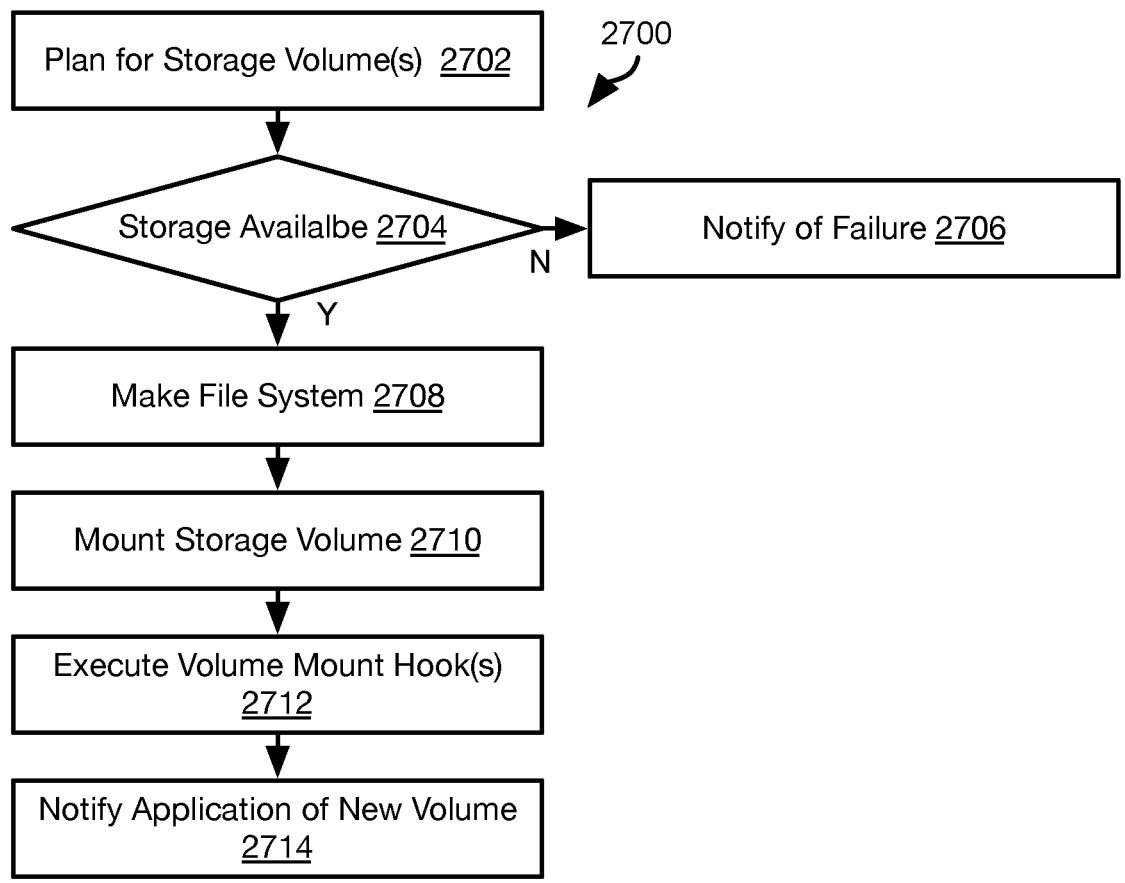
FIG. 27 is a process flow diagram of a method for adding a storage volume to an application in accordance with an embodiment of the present invention.

FIG. 27 illustrates an example method 2700 for provisioning one or more storage volumes ("the subject storage volumes"). The illustrated method 2700 may be performed by the orchestration layer 1300. The illustrated method 2700 may be performed during deployment and provisioning of a bundled application 1302 (see FIGS. 13-17 and corresponding description). The illustrated method 2700 may be performed when a storage volume is provisioned or moved based on usage (see, e.g., FIGS. 21-30 and corresponding description). For example, the bundled application 1302 may invoke the creation of a plurality of subject storage volumes for all the roles 1312 of the bundled application 1302, all containers 1320 or a role, or for any other set of components of the bundled application 1302.

The method 2900 may include planning 2702 for the subject storage volumes. As described below with respect to FIG. 28, this may include selecting a storage device 108 for each subject storage volume such that the devices for the subject storage volumes satisfy affinity and anti-affinity rules for the subject storage volumes by the bundled application 1302. In some embodiments, planning for the placement of new storage volumes and previously-provisioned storage volumes may be performed at step 2702. Accordingly, where the planning of step 2702 results in a different location for a storage volume, that storage volume may be moved to a new storage device 108 defined according to the planning 2702.

For any of the subject storage volumes for which storage is not found 2704 to be available during the planning step 2702, the method 2700 may include notifying 2706 of failure. The notification may be addressed to a user, in the form of an entry in a log file, output on a graphical user interface, or other means.

For each subject storage volume for which storage was found 2704 to be available during the planning step 2702, the method 2700 may include making 2708 a file system on the device selected for the each subject storage volume. This file system may then be mounted 2710 to a container 1320 of the bundled application. In particular, the orchestration layer 1300 may instruct the storage node 106 and a compute node 110 to communicate with one another to mount the subject storage volume to a container 1320 on the compute node 110 as specified by the bundled application 1302. Where the subject storage volume is implemented by a hybrid node, the storage volume may be mounted 2710 to a container 1320 executing on the hybrid node.

The method 2700 may further include executing 2712 one more hooks 1310 defined by the bundled application 1302 for addition of a volume. For example, a post-creation hook may invoke restarting of the container 1320 to which the subject storage volume is mounted. Alternatively, the hook may restart the application instance 1322 executing within the container. The hook 1310 may configure one or more other application instances to which the subject storage volume is not mounted to use the subject storage volume. The one or more hooks 1310 may be executed by the orchestration layer 1300. The one or more hooks 1310 may be invoked by the orchestration layer 1300 to execute on the node hosting the device 108 on which the subject storage volume is created, the node hosting the container 1320 to which the subject storage volume is mounted, or any other node on which a component of the bundled application 1302 executes.

The method 1300 may further include notifying 2714 the bundled application that the subject storage volumes have been provisioned. In some embodiments, this notification may be implemented by a post-creation hook 1310.

Figure 28:
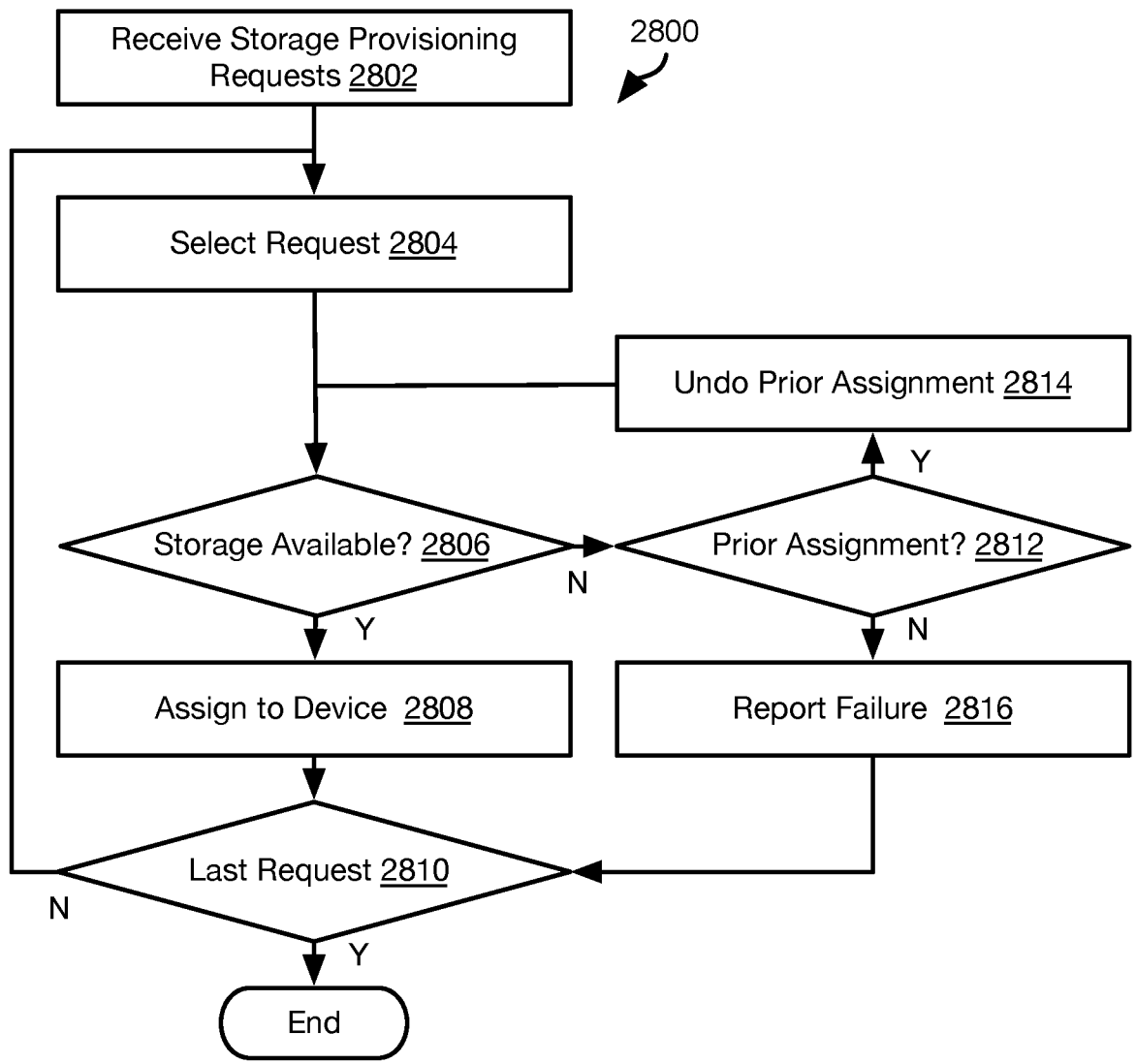
FIG. 28 is a process flow diagram of a method for assigning storage volumes to storage devices in a distributed computing system in accordance with an embodiment of the present invention.

FIG. 28 illustrates a method 2800 for planning 2702 for the subject storage volumes. The method 2800 may be executed by the orchestration layer 1300. The method 2800 includes receiving 2802 a storage provisioning request including requests for the subject storage volumes and the provisioning constraints 1314 for the subject storage volumes. Processing of the provisioning request may also include evaluating of any prior assignments of storage volumes to storage devices 108 of the distributed computing system 100. Accordingly, records made of such assignments may be provided with the storage provisioning request or accessed by the orchestration layer 1300 as part of the method 2800.

The method 2800 may include assigning storage volumes to storage devices 108 in order. Accordingly, one of the requests for the subject storage volumes that has not currently assigned to a storage device 108 may be selected 2802 as the current request for processing according to the remaining steps of the method 2800. This selection may be random, based on order (first in first out), or based on size—the request for a storage volume with the largest size may be processed first. Any other ordering for processing the storage requests may be used.

The method 2800 may include evaluating 2806 whether a storage device is available and satisfies any affinity and/or anti-affinity constraints for the current request. This may include evaluating whether there is a storage device 108 with remaining capacity greater than or equal to a size specified in the current request that is in a different fault domain than another storage volume or container 1320 for which an anti-affinity constraint is defined. Step 2806 may further include evaluating whether there is a storage device 108 having remaining capacity greater than or equal to the size specified in the current request that is in required proximity to another storage volume or container 1320 for which an affinity constraint is defined. In some embodiments, any devices 108 identified at step 2806 are constrained to meet a performance requirement (e.g., available IOPs capacity) specified in the current request. The evaluation of step 2806 may be performed while taking into account assignments made according to the method 2800, i.e. any assignments of storage provisioning requests to devices according to the method 2800 may be taken into account when evaluating affinity and anti-affinity rules for the current request such that any assignment of the current request to a device 108 does not violate these rules with respect to any of the previously-assigned storage provisioning request.

If the condition of step 2806 is met, the method 2800 may include assigning 2808 the current request to one of the devices identified at step 2806, such as to the device of those identified at step 2806 that has the smallest remaining capacity. A storage volume corresponding to the current request may then be created on the device selected at step 2808, such as according to the method 2700.

If the condition of step 2806 is not met, the method 2800 may include evaluating 2812 whether another storage provisioning request has been assigned to a device 108 according to a previous iteration of steps 2806 and 2808. If so, one or more previous assignments of storage volume requests may be undone 2814. For example, the most recent assignment made at step 2808 may be undone 2814. The method may then repeat from step 2806. Steps 2812-3214 may be performed repeatedly until the condition of step 2806 is met or there are no prior assignments remaining to be undone 2814. In particular, assignments may be undone 2814 until storage is found 2806 to be available or no assignments remain to be undone. Storage provisioning requests for which assignments are undone 2814 may be returned to the pool of storage provisioning requests to be assigned according to the method 2800, such as to the end of an ordering of the storage provisioning requests.

If no prior assignments remain to be undone, failure to assign the current request may be reported 2816, such as to a user, the orchestration layer 1300, or some other entity. In some instances, where a storage volume request cannot be assigned, the method 2800 may end.

In other instances, processing continues at step 2810 with an evaluation of whether any storage volume requests from step 2802 remain to be assigned. If so, processing continues at step 2804 with selection of another unassigned storage volume request for processing starting at step 2806. In a like manner, if the current request is successfully assigned 2808 to a device and a storage volume request if found 2810 to remain to be assigned, then processing continues at step 2804.

Figure 29:
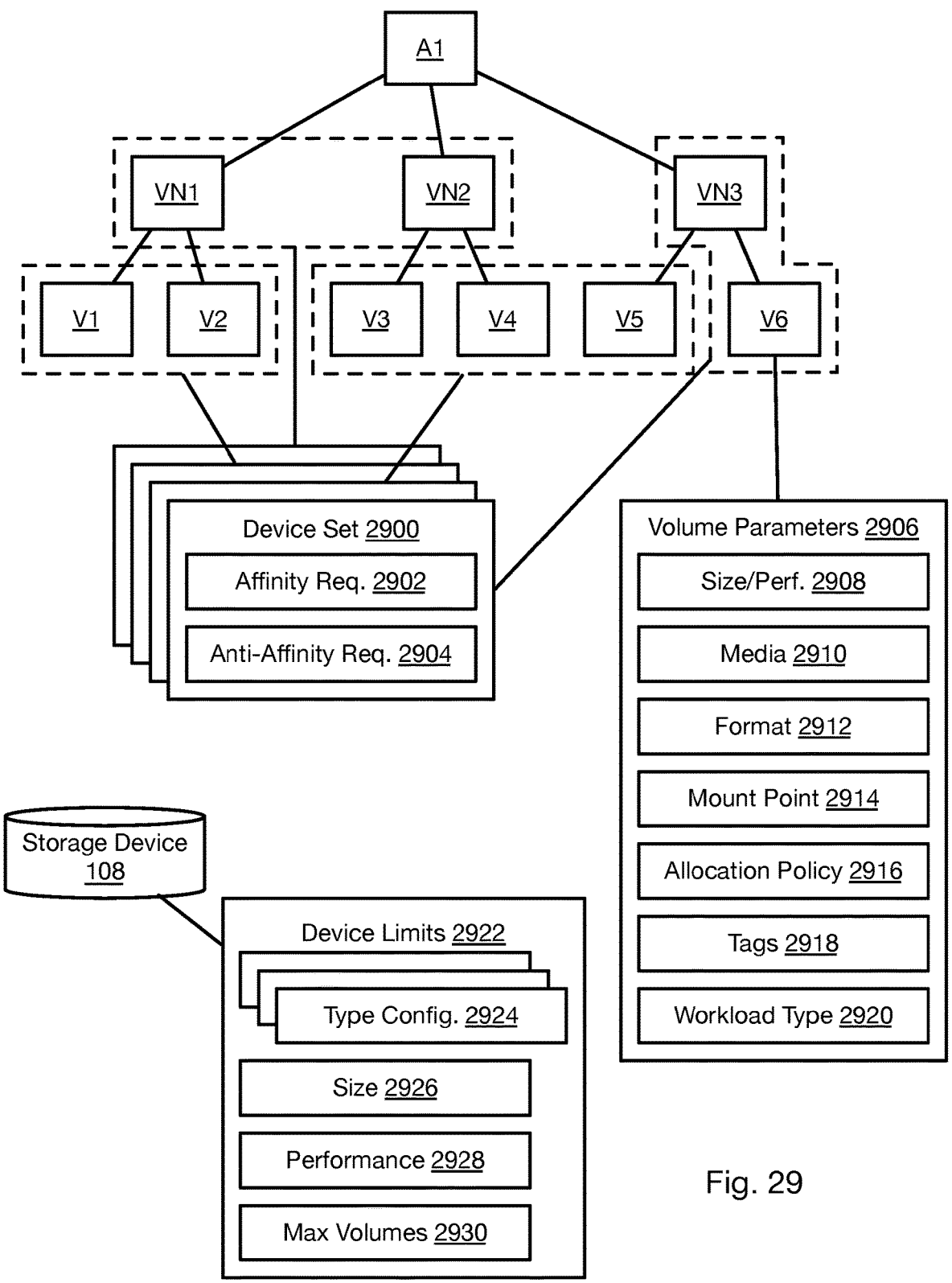
FIG. 29 is a schematic block diagram illustrating the implementation of affinity, anti-affinity and other allocation constraints in accordance with an embodiment of the present invention.

Referring to FIG. 29, provisioning constraints 1314 as described above with respect to FIGS. 13, 15, and 28 enable an application developer to specify constraints on the allocation of resources (computing and storage) to containers 1320 and storage volumes. As noted above, these may include affinity constraints that require a certain degree of proximity (same device, same rack, same datacenter, etc.) or anti-affinity constraints that require a degree of separation (not on the same device, not on the same rack, not in the same datacenter, etc.).

In some embodiment, the orchestration layer 1300 may process these constraints 1314 to generate device sets 2900. For example, containers 1300 of an application A1 may be designated as virtual nodes VN1-VN3. Virtual nodes that are subject to an affinity constraint to one another are added to a common device set 2900. In the illustrated example, VN1 and VN2 are subject to an affinity constraint and are added to the same device set 2900. In some embodiments, device sets may be hierarchical, e.g. some devices are assigned to a first device set requiring a first degree of affinity. Among those devices, a first portion may be assigned to a second sub-device set with a second degree of affinity greater than the first degree of affinity. For example, the first degree of affinity maybe datacenter affinity and the second degree of affinity may be server rack affinity. Any levels sub-device sets may be included such that the device sets are arranged in a hierarchy from lower degree of affinity to higher degree of affinity.

In a like manner virtual storage volumes implemented according to the methods described herein may be subject to affinity constraints and be added to corresponding device sets 2900. In the illustrated example, storage volumes V1 and V2 are subject to an affinity constraint and are added to the same device set 2900. Storage volumes V3, V4, and V5 are subject to an affinity constraint and are therefore added to the different device set 2900.

Storage volumes and virtual nodes may be added to the same device set 2900. As shown in FIG. 29, virtual node VN3 and storage volume V6 are assigned to the same device set.

Each device set 2900 may include one or more parameters in addition to the entities (containers 1320 and/or storage volumes) assigned to it. An affinity requirement 2902 may define a degree of affinity for the entities of the device set 2900 (same storage device, same node (compute/hybrid), same rack, same data center, a minimum network latency, etc.). An anti-affinity requirement 2904 may identify one or more other device sets. For example, the orchestration layer 1300 may assign a unique identifier within the name space of the application A1 to each device set 2900. Accordingly, the anti-affinity requirement 2904, if any, may include one or more references to other device sets 2900. For a given device set referenced in the anti-affinity requirement 2904, the anti-affinity requirement 2904 may include a degree of anti-affinity (not on the same device, not on the same node (compute/hybrid) not on the same rack, not in the same data center, etc.). Note that the anti-affinity requirement 2904 for a device set may be obtained from the provisioning constraints 1314 for the application A1 that specifies the anti-affinity among entities to be provisioned according to the bundled application 1302.

Various other parameters may be defined by a bundled application 1302 for entities to be provisioned by the orchestration layer 1300 for the bundled application 1302. For example, the bundled application 1302 may specify one or more parameters 2906 for each storage volume to be provisioned. As discussed above, a volume may have a size (number of GB, TB, etc.) as well as a performance requirement 2908 (e.g., number of IOPs per second). The parameters 2906 may specify a type of media required for the storage volume (e.g., hard disk drive (HDD) or solid state drive (SSD), a format 2912 for a file system (File Allocation Table (FAT), New Technology File System (NTFS), Apple File System (APFS), Unix File System (UFS), etc.), and a mount point 2914 (e.g., path in a directory on a storage or compute node at which to mount the storage volume ("/data", for example)).

The parameters 2906 may further include an allocation policy 2916. The allocation policy 2916 may apply to an individual storage volume and specify how slices of the storage volume are to be distributed over one or more available storage devices 108. The allocation policy 2916 may apply to storage volumes 2900 belonging to a device set 2900.

Examples of an allocation policy include a round robin approach in which slices of a storage volume are allocated among a set of storage devices 108 (on the same or different storage nodes 106). For example, each time a slice is allocated, a device 108 is selected among available storage devices 108 randomly or according to a sequence (disk 1, disk 2, disk 3, disk 1, disk 2, disk 3, etc.). For multiple storage volumes, storage volumes or slices of storage volumes may be assigned to storage devices in a similar manner.

Another example of an allocation is a packing approach in which slices of a storage volume are assigned to a storage device 108 until it is full, meets its maximum volume limit (see discussion of FIG. 24), or otherwise is no longer able to accept assignment of slices. At that point, if slices remain to be assigned, another storage device 108 is selected and slices are assigned to it until it is no longer able to accept assignment of slices, and so on. For multiple storage volumes, storage volumes may be assigned to storage devices according to the packing approach in the manner described above with respect to slices or slices of the multiple storage volumes may be assigned to devices in the same manner described above.

The parameters 2906 for a storage volume may further include tags 2918. Tags 2918 may be specific allocation constraints specified by a developer. For example, a tag 2918 may specify a specific node type (compute, storage node 106, or hybrid node), specific node (e.g. node identifier for a specific node), or set of nodes (e.g., particular rack or particular datacenter) to which the storage volume is to be assigned. A tag 2918 may specify a particular geographic location constraint for a storage volume or other constraint.

The volume parameters 2906 may further include a workload type 2920 for the storage volume. A workload type indicates an expected usage for the storage volume. Examples of workload types include throughput, latency, dedicated and ordinary. A throughput workload type indicates a high volume of writes that require a high throughput. A latency workload type indicates many reads and writes that require low latency. A dedicated workload type indicates that the storage volume should be the only storage volume for a given storage device 108. An ordinary workload indicates no particular requirement with respect to throughput and latency. Note that these types may be assigned by an application developer and represent the result of human judgment as to how a storage volume may be used.

A storage device 108 may have corresponding device limits 2922 that may be used to determine fitness for allocation to a particular storage volume. The device limits 2922 may be stored by a storage manager 102 or the orchestration layer 1300 for each storage device 108 and may include data automatically acquired from a controller of a storage device and/or manually specified information.

The device limits 2922 may include one or more type configurations 2924. Each type configuration specifies a number for one or more types of storage volumes that may be allocated to the storage device 108. For example, a storage device may have the following type configurations:
1. 1 dedicated.
2. 5 throughput
3. 4 latency
4. 3 throughput, 2 latency.
5. 3 throughput, 5 ordinary.
6. 2 latency, 6 ordinary.

Accordingly, when determining how to assign storage volumes to devices 108, the storage volumes assigned to a device 108 will meet the type configuration constraint, i.e. the configuration of the number of volumes of each type will be at or below the number specified in at least one type configuration 2924.

The device limits 2922 may further include a storage size 2926 limit, i.e. total available storage for the device 108, and a performance limit 2928, i.e. the total number of IOPs/second that may be executed by the device 108. As noted with respect to FIGS. 23 and 24, the storage device 108 may also have a volume limit 2930. Alternatively, the type configuration 2924 may function as volume limit.

Figure 30:
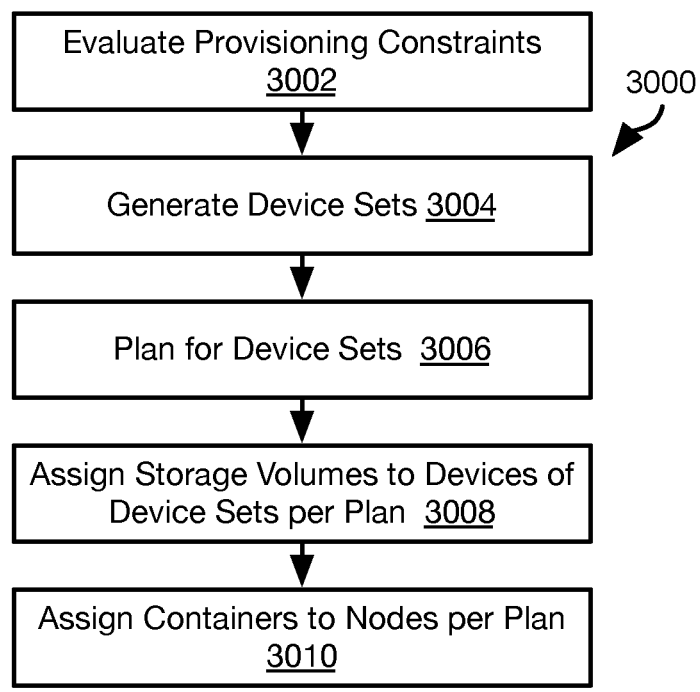
FIG. 30 is a process flow diagram of method for allocating storage volumes in accordance with an embodiment of the present invention.

FIG. 30 illustrates a method 3000 for assigning entities (containers 1320 and storage volumes) to nodes (compute nodes 110 and hybrid nodes) and to storage devices 108. The method 3000 may be executed by the computer system executing the orchestration layer with respect to a bundled application 1302.

The method 3000 may include evaluating 3002 provisioning constraints 1314 for the roles 1312 of the bundled application 1302. In particular, for each entity ("the subject entity"), other entities having affinity to the entity ("affinity entities") and anti-affinity ("anti-affinity entities") may be obtained from the constraints 1314.

The method 3000 may then include generating 3004 device sets. In particular, first entities having one another as an affinity entity may be added to a first device set. Any second device sets including any anti-affinity entities of the first entities may then be listed in the anti-affinity requirement 2904 of the first device set. As noted with respect to FIG. 29, for each device set the degree of affinity specified in the provisioning constraints 1314 may be listed in the affinity requirement 2902 of the first device set and the degree of anti-affinity for the anti-affinity entities in the second device sets may be added to the anti-affinity requirement 2904.

The method 3000 may further include planning 3006 for the device sets identified at step 3004. In particular, a set of assignments of entities (containers and storage volumes) of the bundled application to hardware (nodes and storage devices) may be generated that meets the affinity and anti-affinity requirements 2902, 2904 of the device sets, the requirements of volume parameters 2906 for storage volumes, and satisfies the device limits 2922 of storage devices. Methods for planning 3006 for the device sets may include the method 3100 described below or the approach of the method 2800.

The method 3000 may further include assigning 3008 storage volumes to devices 108 specified by the plan determined at step 3006. In particular, for a given device set, the plan may specify a set of devices 108 to which the storage volumes of that device set are assigned. The storage volumes may then be distributed over the set of devices 108 according to the allocation policy 2916 for those storage volumes as described above, e.g. packing, round robin, or other approach specified in the allocation policy.

The method 3000 may further include assigning 3010 containers 1320 to nodes (compute nodes 110 or hybrid nodes) specified for the containers 1320 in the plan. Accordingly, containers 1320 executing the application instance 1322 specified in the bundled application 1302 may be instantiated on the assigned nodes as determined at step

3006. Note that in some implementations, where possible, hybrid nodes are preferred inasmuch as it reduces latency between a container 1320 and the storage volumes of the hybrid nodes and reduces the size of the fault domain including these storage volumes and the container. Accordingly, the plan as generated according to the methods described herein may include a preference to implementing hybrid nodes where possible.

Figure 31:
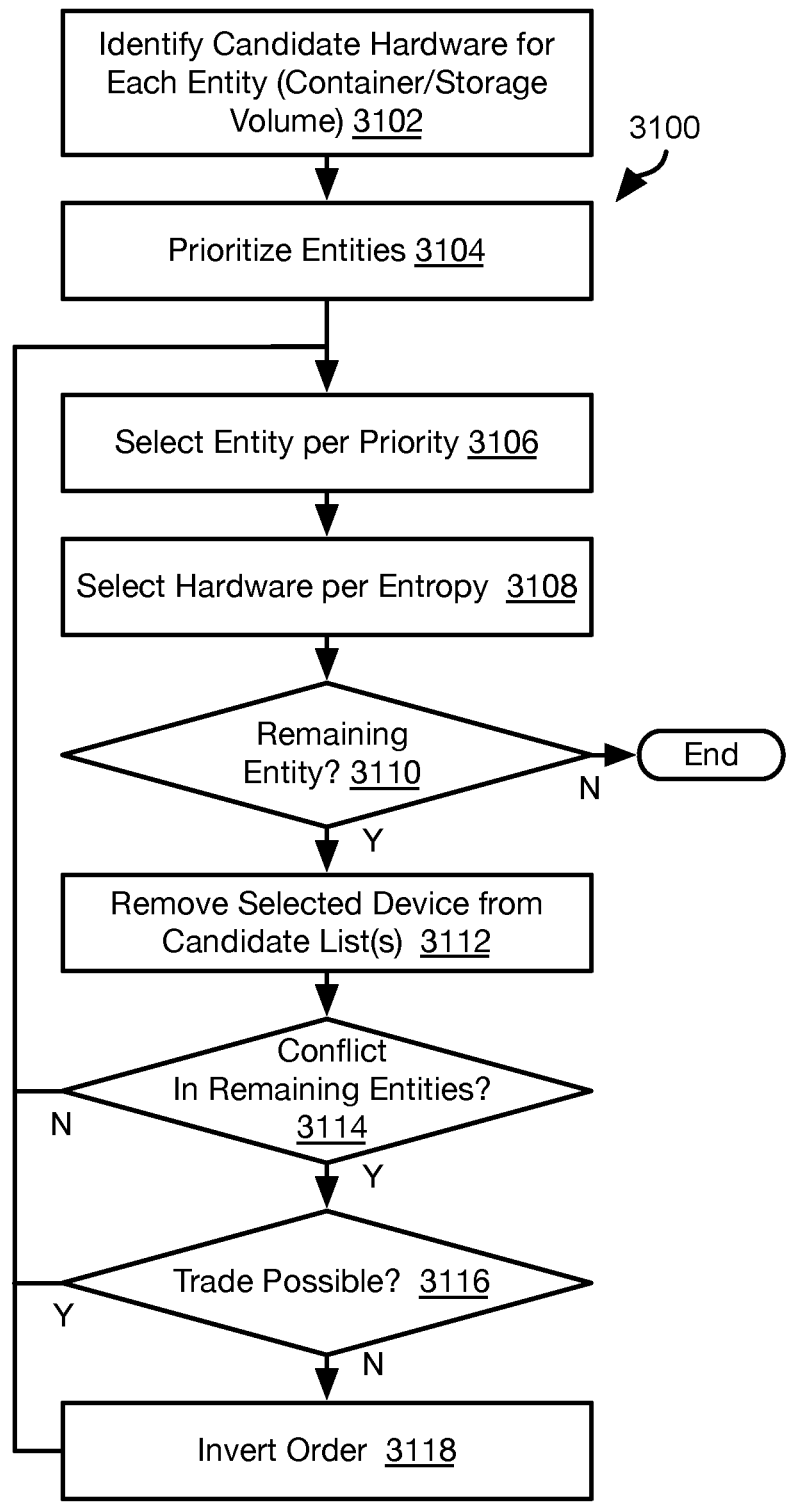
FIG. 31 is a process flow diagram of a method for assigning multiple storage volumes to devices in a distributed storage system in accordance with an embodiment of the present invention.

FIG. 31 illustrates a method 3100 for planning for multiple entities (containers 1320 and storage volumes) with respect to possible choices of hardware (compute nodes 110, hybrid nodes, and storage devices 108). The method 3100 may be executed by the computer system implementing the orchestration layer 1300 or some other computer system. The method 3100 may be executed when a bundled application 1302 is deployed and may be re-executed where the topology of the bundled application 1302 is changed, such as when performing scaling out or scaling in of the bundled application 1302 according to the methods disclosed herein.

The method 3100 is described below with respect to entities and hardware such that it is implied that planning for both containers 1320 and storage volumes are performed simultaneously. However, in other approaches, planning for containers 1320 and planning for storage volumes may be performed separately with either containers 1320 or storage volumes being planned for first.

The method 3100 may include identifying 3102 candidate hardware for each entity. In particular, hardware meeting the volume parameters 2906 for a storage volume may be identified. Note that where no assignments have been made, the affinity and anti-affinity requirements for an entity are not considered in some embodiments at step 3102. Where some assignments have already been made, then affinity and anti-affinity requirements for an entity may be considered to determine whether hardware with a prior assignment of another entity meets these requirements.

Storage devices that meet size and performance requirements 2908, media type 2910, and tags 2918, and workload type 2920 of a storage volume may be identified as candidate hardware for the storage volume. For a container 1320, a node having sufficient processing and memory specified for that container 1320 in the provisioning 1306 of the bundled application 1302 may be determined to be candidate hardware.

In some embodiments, tags of an entity may be embodied as bits set in an entity variable. Hardware devices (storage device, hybrid nodes, compute nodes 110) may have a corresponding host variable having corresponding bits sets for the tags satisfied by that hardware device. For example, a bit may indicate a requirement for a hybrid node in the entity variable and the corresponding bit position may indicate that a node is a hybrid node in the host variable. Accordingly, the entity variable may be compared of the host variable to determine whether each bit set in the entity variable is also set in the host variable of a hardware device. If so, then the hardware device may be determined to satisfy the tags of the entity.

In some instances, a tag may be a "negative tag," meaning that a hardware device must not have a particular tag (e.g., bit position) set. Accordingly, the host variable may be inverted (1s to 0s and 0s to 1s) and compared (e.g., ANDed) with the negative tag. Where the inverted host variable of a hardware device has a bit set in the position corresponding to the negative tag, the hardware device may be determined to be compatible with the negative tag.

Accordingly, a result of step 3102 is lists of hardware devices HN (storage device 108, compute node 100, or hybrid node) meeting the requirements of each entity EN ("the original candidate lists"):

E1: H1, H3, H5;
E2: H1, H2, H4;
E3, H1, H2, H3, H4, H5.

The method 3100 may then include prioritizing 3104 the entities. For example, each entity may be assigned a score according to a function of number of values. These values may be assigned weights according to criticality. Example of values may include of:

number of candidate hardware devices (e.g., increasing with the decreasing number of candidate hardware devices) in the entity's original candidate list, size (increasing with size of a storage volume), memory requirement (increasing with increasing memory requirement of a container 1320), processor core requirement (increasing with increasing number of required cores), number of tags (increasing with number of tags), number of affinity requirements (increasing with number of affinity requirements, number of anti-affinity requirements (increasing with number of anti-affinity requirements), a total number of requirements (increasing with total number of affinity and anti-affinity requirements).

Among containers 1320, some are more important and others have few options accordingly these may be given priority. Likewise, it may be more difficult to identify a storage device for a larger storage volume, accordingly priority increases with size. Constraints imposed by tags and affinity or anti-affinity requirements may be difficult to meet and therefore the number of these constraints may be used to determine priority.

Some or all of these values may be weighted and summed to obtain a score for an entity. The weight may be selected according to human judgment and indicate which of these values is more likely to impact assignment of an entity to a hardware device. For example, affinity and anti-affinity requirements and tags may be very strict and require coordination with the assignment of other entities. Accordingly, the number of these requirements may be given more weight than others of these values.

The entities may be prioritized according to their scores, i.e. a higher score meaning higher priority resulting in an original prioritized list of entities.

The method 3100 may then include selecting 3106 an entity for evaluation ("the subject entity") from a list of remaining entities that is initially set equal to the original prioritized list of entities prior to the first iteration of step 3106. The subject entity may be selected as the entity having the highest priority in the list of remaining entities.

The method 3100 may then include selecting 3108 a hardware device ("the selected hardware device") from the current candidate list for the subject entity. The current candidate list for each entity is the original candidate list after step 3102 as modified according to iterations of the remaining steps of the method 3100 as described below.

The selection 3108 may be performed based on entropy: the extent to which selection of the hardware device impacts the current candidate lists of entities in the list of remaining entities. For example, selecting a storage device that is the only hardware device in the candidate list for another storage volume will have a large impact on a later attempt to assign the other storage volume. Accordingly, the entropy for a hardware device increases with the decrease in the number of hardware candidates in the candidate lists of remaining entities including that hardware device.

For example, for a given hardware device ("the subject hardware device"), an output of a function may be calculated for each entity including the subject hardware device in the each entity's current candidate list, either excluding or including the subject entity depending on the embodiment. A sum of these outputs may then be used as the entropy of the subject hardware. The function may take as its input the number of hardware candidates in the current candidate list for each entity including the subject hardware in the each entity's current candidate list.

The function used may be any function that increases with decreasing number, such as $\exp(-Ax)$, where exp is the exponential function, A is a predefined parameter, and x is the number of candidates in the current candidate list. Other options may include $1/x$, $1/x^n$, where n is an integer, or any other function that increases with decreasing magnitude of its input.

The hardware device having the lowest entropy may then be selected 3108 for allocation to the subject entity. In some embodiments, to reduce processing time, the hardware device having the lowest entropy after a predefined maximum number of iterations of an algorithm that evaluates the entropy of various hardware devices represented in the current candidate lists.

The method 3100 may then include evaluating 3110 whether any entities are in the remaining entities list. If so, the hardware device selected at step 3108 is removed from the current candidate lists of each entity in the remaining entities list for which the assignment of the selected hardware device to the subject entity makes assignment to the each remaining entity impermissible due to constraints (affinity, anti-affinity, tags, workload type configuration limit, or any of the limits discussed above with respect to FIG. 29). For example, by assigning the subject entity to a selected hardware device, affinity and anti-affinity constraints must now be satisfied with respect to other entities in the device set of the subject entity and other devices sets having an anti-affinity relationship with respect to the device set of the subject entity. Accordingly, step 3110 may include:

Removing candidate hardware devices from the current candidate lists of other entities in the device set of the subject entity that do not have the required affinity with respect to the selected hardware device.

Removing candidate hardware devices from the current candidate lists of other entities in device sets having an anti-affinity relationship with respect to the device set of the subject entity that do not satisfy the anti-affinity requirement with respect to the hardware device selected at step 3108.

The method 3100 may further include evaluating 3114 whether a conflict exists among the remaining entities, i.e., the current candidate lists of the remaining entities following step 3112 require simultaneous allocation of incompatible entities to the same hardware device. For example, if EA and EB remain to be assigned and both have HC as their only remaining candidate hardware device, then there may be a conflict, such as if EA and EB have an anti-affinity requirement with respect to one another or have combined requirements exceeding the capacity (size, performance, workload type, memory, cores) of hardware device HC.

If no conflict is found 3114, then the method 3100 continues at step 3106 with selection of another entity from the list of remaining entities as the subject entity.

If a conflict is found 3114, the method 3100 may include evaluating 3116 whether a trade is possible. In particular, for each entity that has been assigned to a hardware device according to step 3106-3108 ("assigned entities"), the method 3100 may include comparing the original candidate lists of the assigned entities to the original candidate lists of the conflicting entities identified at step 3114 and identifying those hardware devices in the original candidate lists of the conflicting entities that have been assigned to one of the assigned entities. Step 3116 may include evaluating whether reassigning one of the assigned entities and assigning one of the conflicting entities to the hardware device to which the one of the assigned entities was assigned will resolve the conflict. In some instances, reassignment of multiple of the assigned entities may be evaluated to determine whether the conflict can be resolved.

For example, suppose the method 3100 is planning for 10 containers (C1 to C10) on 4 nodes. Suppose that C1 to C8 are assigned resources (processor cores, memory, storage) in previous iterations of steps 3106 and 3108. Suppose that at step 3114 it is determined that the resource requirements of C9 cannot be met because of fragmentation (Example: C9 needs 8 GB RAM, but there is only 2 GB on each node and C9 needs all 8 GB on the same node). This is just one example. There are many other variables that might not be met such as processor cores, HDD, SSD, page size, etc. C9 will initiate a trade.

Accordingly, step 3116 may include performing a trade. For example, this may include identifying probable candidates to trade, such as according to a policy. An example policy may include:

Check the last allocated container (C8 in this example) to see if C9 and C8 are identical in terms of resources requirements. If not, unallocate C8 and try to allocate to C9, then replan for C8.

Un-allocate multiple nodes (e.g., C8 and C7) to see if C9 can then be allocated. If so, then C9 is allocated and C8 and C7 are then reallocated.

Un-allocate multiple nodes (e.g., C8 and C7) to see if C9 can then be allocated. If so, then C9 is allocated and C8 and C7 are then reallocated. This process may repeat up to a configured limit of iterations to avoid infinite back tracking. In a dynamic environment where resources are allocated and deallocated all the time, the limit is a reasonable trade off to large planning times potentially taking minutes to hours on large setups.

In some embodiments, the evaluation of trading possibility is performed only with respect to the assigned entity having the largest original candidate list of those assigned entities having the conflicted hardware candidate of the current candidate lists of the conflicting entities identified at step 3114.

If no trade is found 3116 to be possible the method 3100 may include inverting the priority order of one or more entities. For example, as noted above, trading may be limited to the assigned entity ("the tradable entity") having the largest original candidate list of those assigned entities having the conflicted hardware candidate of the current candidate lists of the conflicting entities identified at step 3114. Accordingly, inverting 3118 the order may include trading places of one of the conflicted entities with the tradable entity in the original prioritized list of entities from step 3104, such as the entity of the conflicted entities with the highest priority in the original prioritized list of entities.

In some instances, where no trading is found 3116 to be possible (without the constraint to the tradable entity as identified above), the method 3100 may include inverting 3118 the priority order of one of the conflicting entities in the original prioritized list of entities. All previous assignments may be released and the process may then be repeated having the current candidate lists set equal to the original candidate lists and the list of remaining entities set to the original prioritized list of entities as modified according to step 3118.

Alternatively, assignments of entities having lower priority than the new priority of the one of the conflicting entities traded at step 3118 ("the traded entity") may be released and any hardware devices referenced by these assignments may be returned to the current candidate lists of entities having these hardware devices in the original candidate lists thereof. Likewise, these entities having priority lower than the new priority of the traded entity may be returned to the list of remaining candidates. The process may then repeat from step 3106 starting with the traded entity as the subject entity.

The illustrated method 3100 has a number of benefits. The prioritization step 3104 and selection 3106 based on entropy reduce backtracking, e.g. inverting and reassignment as described with respect to step 3118. In particular, the higher priority entries are those with more restrictions and these are assigned first. The lower entropy hardware devices have less impact on the assignment of other entities and therefore are selected first. This reduces time spent evaluating unsuccessful paths through a hierarchy of possible solutions and reduces the set of possible solutions that need to be evaluated.

Figure 32:
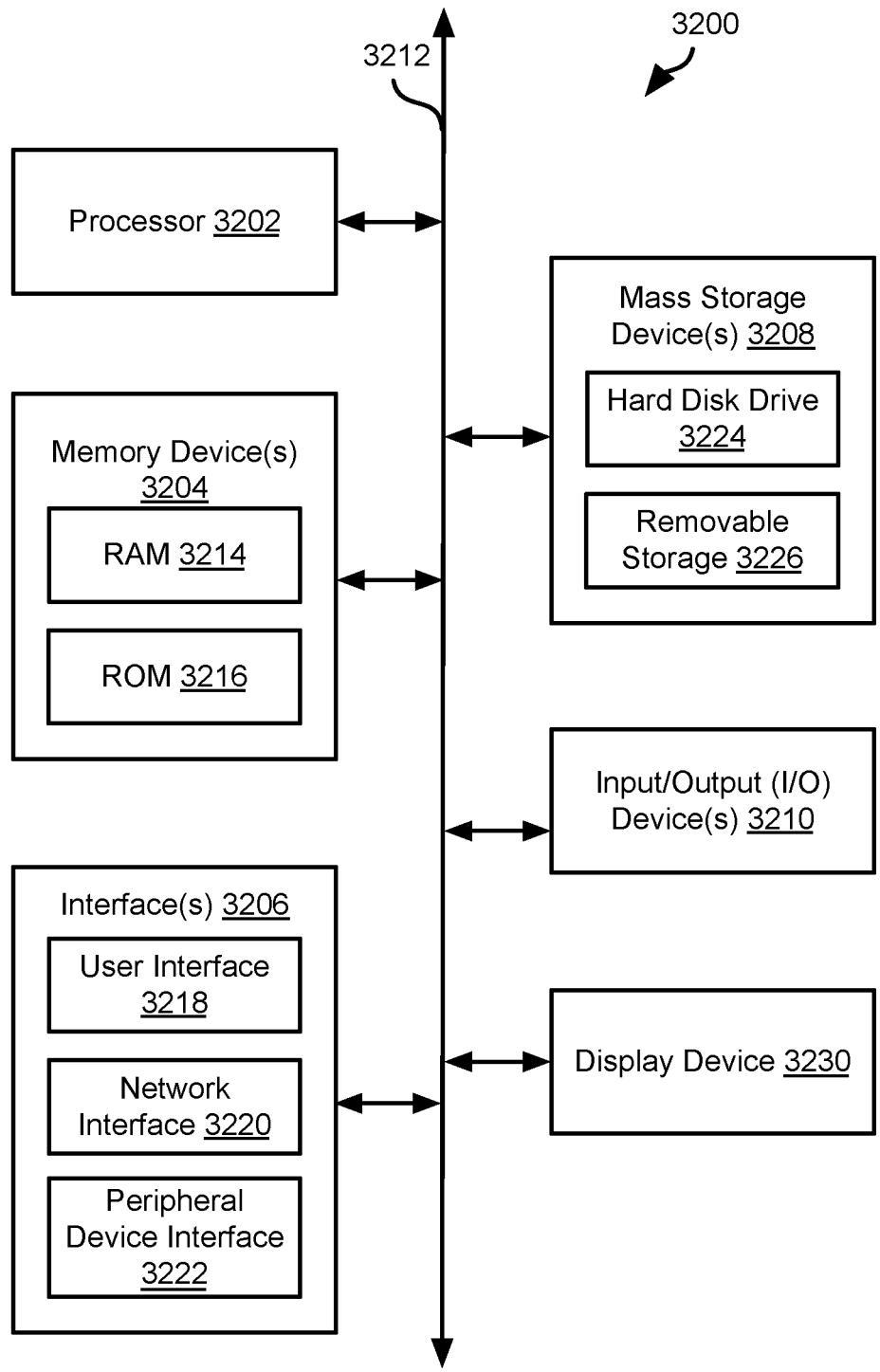
FIG. 32 is a schematic block diagram of an example computing device suitable for implementing methods in accordance with embodiments of the invention.

FIG. 32 is a block diagram illustrating an example computing device 3200. Computing device 3200 may be used to perform various procedures, such as those discussed herein. The storage manager 102, storage nodes 106, compute nodes 110, and hybrid nodes, or any computing device referenced herein may have some or all of the attributes of the computing device 3200.

Computing device 3200 includes one or more processor(s) 3202, one or more memory device(s) 3204, one or more interface(s) 3206, one or more mass storage device(s) 3208, one or more Input/output (I/O) device(s) 3210, and a display device 3230 all of which are coupled to a bus 3212. Processor(s) 3202 include one or more processors or controllers that execute instructions stored in memory device(s) 3204 and/or mass storage device(s) 3208. Processor(s) 3202 may also include various types of computer-readable media, such as cache memory.

Memory device(s) 3204 include various computer-readable media, such as volatile memory (e.g., random access memory (RAM) 3214) and/or nonvolatile memory (e.g., read-only memory (ROM) 3216). Memory device(s) 3204 may also include rewritable ROM, such as Flash memory.

Mass storage device(s) 3208 include various computer readable media, such as magnetic tapes, magnetic disks, optical disks, solid-state memory (e.g., Flash memory), and so forth. As shown in FIG. 32, a particular mass storage device is a hard disk drive 3224. Various drives may also be included in mass storage device(s) 3208 to enable reading from and/or writing to the various computer readable media. Mass storage device(s) 3208 include removable media 3226 and/or non-removable media.

I/O device(s) 3210 include various devices that allow data and/or other information to be input to or retrieved from computing device 3200. Example I/O device(s) 3210 include cursor control devices, keyboards, keypads, microphones, monitors or other display devices, speakers, printers, network interface cards, modems, lenses, CCDs or other image capture devices, and the like.

Display device 3230 includes any type of device capable of displaying information to one or more users of computing device 3200. Examples of display device 3230 include a monitor, display terminal, video projection device, and the like.

Interface(s) 3206 include various interfaces that allow computing device 3200 to interact with other systems, devices, or computing environments. Example interface(s) 3206 include any number of different network interfaces 3220, such as interfaces to local area networks (LANs), wide area networks (WANs), wireless networks, and the Internet. Other interface(s) include user interface 3218 and peripheral device interface 3222. The interface(s) 3206 may also include one or more peripheral interfaces such as interfaces for printers, pointing devices (mice, track pad, etc.), keyboards, and the like.

Bus 3212 allows processor(s) 3202, memory device(s) 3204, interface(s) 3206, mass storage device(s) 3208, I/O device(s) 3210, and display device 3230 to communicate with one another, as well as other devices or components coupled to bus 3212. Bus 3212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 3200, and are executed by processor(s) 3202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:

receiving, by a computing device, a bundled application including a manifest defining a plurality of entities to be provisioned and one or more provisioning constraints;

generating, by the computing device, a plurality of device sets, each device set having a portion of the plurality of entities assigned thereto;

for each device set of the plurality of device sets, associating an affinity requirement with the each device set according to the one or more provisioning constraints; and assigning, by the computing device, the plurality of entities to a plurality of hardware devices in a distributed computing system such that, for each device set of the plurality of device sets, the entities of the portion of the plurality of entities of the each device set are assigned to one or more hardware devices of the distributed computing system satisfying the affinity requirement of the portion of the plurality of entities, wherein the affinity requirement associated with the each device set specifies a required degree of proximity to one another of the one or more hardware devices to which the portion of the plurality of entities assigned to the each device set are assigned, the required degree of proximity being at least one of:

the one or more hardware devices being a single hardware device;

the one or more hardware devices being on a same rack; and the one or more hardware devices being in a same data center; and for each device set of the plurality of device sets, instantiating the portion of the plurality of entities assigned to the each device set on the one or more hardware devices to which the portion of the pluralities of entities assigned to the each device set are assigned.

2. The method of claim 1, wherein the entities include a plurality of storage volumes and a plurality of containers executing instances of executables, the executables implementing roles of the bundled application, the manifest defining mounting of the plurality of storage volumes to the plurality of containers; and wherein the plurality of hardware devices include a plurality of computing nodes and a plurality of storage devices.

3. The method of claim 2, further comprising, for each device set of a portion of the plurality of device sets having the portion of the plurality of entities thereof including first storage volumes:

associating an allocation policy with the each device set according to the manifest;

when the allocation policy is a round-robin policy:
assigning, by the computing device, one of (a) portions of the first storage volumes and (b) individual storage volumes of the first storage volumes to the one or more hardware devices to which the each device set is assigned in a round-robin manner; and when the allocation policy is a packing policy:
assigning, by the computing device, the one of (a) portions of the first storage volumes and (b) individual storage volumes of the first storage volumes to a first hardware device of the one or more hardware devices to which the each device set is assigned until the first hardware device is full before assigning any of the portions of the first storage volumes to a second hardware device of the one or more hardware devices to which the each device set is assigned.

4. The method of claim 2, wherein:

each storage volume of the plurality of storage volumes has a workload type associated therewith;

each storage device of the plurality of storage devices has one or more type configurations associated therewith and each including for each workload type of a plurality of possible workload types, a maximum number for the each workload type; and the method further comprises assigning the plurality of storage volumes to the plurality of storage devices such that, for each storage device of the plurality of storage devices, a number of storage volumes of each workload type assigned to the each storage device satisfies at least one type configuration of the one or more type configurations for the each storage device.

5. The method of claim 1, wherein the one or more provisioning constraints further include one or more anti-affinity constraints, the method further comprising:

associating with a first device set of the plurality of device sets an anti-affinity requirement with respect to a second device set of the plurality of device sets, the anti-affinity requirement being according to the one or more anti-affinity constraints;

assigning the portion of the plurality of entities of the first device set to a first set of hardware devices; and assigning the portion of the plurality of entities of the second device set to a second set of hardware devices that is separated from the first set of hardware devices according to the anti-affinity requirement, the anti-affinity requirement specifying a degree of separation between the first set of hardware devices and the second set of hardware devices.

6. The method of claim 5, wherein the anti-affinity requirement for each device set of the plurality of device sets defines the degree of separation, the degree of separation being at least one of: different device separation, different server rack separation, and different data center separation.

7. The method of claim 1, wherein assigning the plurality of entities to the plurality of hardware devices in the distributed computing system comprises:

for each entity of the plurality of entities, identifying an original candidate list, the candidate list including a portion of the plurality of hardware devices meeting provisioning requirements for the each entity in the manifest and the one or more provisioning constraints;

generating a ranked list of entities including the plurality of entities ranked according to both of (a) a number of hardware devices in the original candidate list of each entity of the plurality of entities and (b) the provisioning requirements for each entity of the plurality of entities in the manifest and the one or more provisioning constraints, each entity of the plurality of entities having a set of remaining candidates that is initially equal to the original candidate list, the ranked list being set as an initial state of a list of unassigned entities;

(a) selecting a subject entity from the list of unassigned entities having highest rank;

(b) assigning the subject entity to a selected hardware device in the set of remaining candidates of the subject entity;

(c) removing the selected hardware device from any of the sets of remaining candidates for the entities in the list of unassigned entities in which the selected hardware device is included;

(d) removing the subject entity from the list of unassigned entities; and (e) repeating (a) through (d) until the list of unassigned entities is empty.

8. The method of claim 7, wherein (b) comprises selecting the selected hardware device according to entropy, wherein entropy indicates a degree of limitation imposed on the sets of remaining candidates for other entities in the list of unassigned entities resulting from removal of the selected hardware device.

9. The method of claim 8, further comprising:

(f) after performing (d), when two or more conflicting entities in the list of unassigned entities have conflicting sets of remaining candidates with respect to one another:

evaluating (g) whether releasing an assignment of a previously-assigned entity to a first hardware device in the original candidate lists of one of the two or more conflicting entities but not in the set of remaining candidates resolves a conflict between the two or more conflicting entities;

when (g) is true, releasing the assignment of the previously-assigned entity to the first hardware device and assigning the one of the two or more conflicting entities to the first hardware device.

10. The method of claim 8, further comprising:

(f) after performing (d) for each subject entity, when two or more conflicting entities in the list of unassigned entities have conflicting sets of remaining candidates with respect to one another:

evaluating (g) whether releasing an assignment of a previously-assigned entity to a first hardware device in the original candidate lists of one of the two or more conflicting entities but not in the set of remaining candidates resolves a conflict between the two or more conflicting entities;

when (g) is not true:

releasing the assignment of the previously-assigned entity to the first hardware device;

(h) trading places between the one of the two or more conflicting entities and the previously-assigned entity in the ranked list of entities;

repeating (a) through (f) with respect to the ranked list of entities as modified according to (h).

11. A system comprising:

a distributed computing system comprising a plurality of hardware devices, the plurality of hardware devices including a plurality of computing nodes and a plurality of storage devices operably coupled to at least a portion of the plurality of computing nodes;

an orchestration computing device comprising one or more processing devices and one or more memory devices operably coupled to the one or more processing devices, the one or more memory devices storing executable code effective to cause the one or more processing devices to:

receive a bundled application including a manifest defining a plurality of entities to be provisioned and one or more provisioning constraints;

generate a plurality of device sets, each device set having a portion of the plurality of entities assigned thereto for each device set of the plurality of device sets, associate an affinity requirement with the each device set according to the one or more provisioning constraints; and assign the plurality of entities to a plurality of hardware devices in a distributed computing system such that, for each device set of the plurality of device sets, the entities of the portion of the plurality of entities of the each device set are assigned to one or more hardware devices of the distributed computing system satisfying the affinity requirement of the portion of the plurality of entities, wherein the affinity requirement associated with the each device set specifies a required degree of proximity to one another of the one or more hardware devices to which the portion of the plurality of entities assigned to the each device set are assigned, the required degree of proximity being at least one of:

the one or more hardware devices being a single hardware device;

the one or more hardware devices being on a same rack; and the one or more hardware devices being in a same data center.

12. The system of claim 11, wherein the entities include a plurality of storage volumes and a plurality of containers executing instances of executables, the executables implementing roles of the bundled application, the manifest defining mounting of the plurality of storage volumes to the plurality of containers.

13. The system of claim 12, wherein the executable code is further effective to cause the one or more processing devices to, for each device set of a portion of the plurality of device sets having the portion of the plurality of entities thereof including first storage volumes:

associate an allocation policy with the each device set according to the manifest;

when the allocation policy is a round-robin policy:

assign one of (a) portions of the first storage volumes and (b) individual storage volumes of the first storage volumes to the one or more hardware devices to which the each device set is assigned in a round-robin manner; and when the allocation policy is a packing policy:

assign the one of (a) portions of the first storage volumes and (b) individual storage volumes of the first storage volumes to a first hardware device of the one or more hardware devices to which the each device set is assigned until the first hardware device is full before assigning any of the portions of the first storage volumes to a second hardware device of the one or more hardware devices to which the each device set is assigned.

14. The system of claim 12, wherein:

each storage volume of the plurality of storage volumes has a workload type associated therewith;

each storage device of the plurality of storage devices has one or more type configurations associated therewith and each including for each workload type of a plurality of possible workload types, a maximum number for the each workload type; and wherein the executable code is further effective to cause the one or more processing devices to assign the plurality of storage volumes to the plurality of storage devices such that, for each storage device of the plurality of storage devices, a number of storage volumes of each workload type assigned to the each storage device satisfies at least one type configuration of the one or more type configurations for the each storage device.

15. The system of claim 11, wherein the one or more provisioning constraints further include one or more anti-affinity constraints, the executable code being further effective to cause the one or more processing devices to:

associate with a first device set of the plurality of device sets an anti-affinity requirement with respect to a second device set of the plurality of device sets, the anti-affinity requirement being according to the one or more anti-affinity constraints;

assign the portion of the plurality of entities of the first device set to a first set of hardware devices; and assign the portion of the plurality of entities of the second device set to a second set of hardware devices that is separated from the first set of hardware devices according to the anti-affinity requirement, the anti-affinity requirement specifying a degree of separation between the first set of hardware devices and the second set of hardware devices.

16. The system of claim 15, wherein the anti-affinity requirement for each device set of the plurality of device sets defines the degree of separation, the degree of separation being at least one of: different device separation, different server rack separation, and different data center separation.

17. The system of claim 11, wherein the executable code is further effective to cause the one or more processing devices to:

for each entity of the plurality of entities, identify an original candidate list, the candidate list including a portion of the plurality of hardware devices meeting provisioning requirements for the each entity in the manifest and the one or more provisioning constraints;

generate a ranked list of entities including the plurality of entities ranked according to both of (a) a number of hardware devices in the original candidate list of each entity of the plurality of entities and (b) the provisioning requirements for each entity of the plurality of entities in the manifest and the one or more provisioning constraints, each entity of the plurality of entities having a set of remaining candidates that is initially equal to the original candidate list, the ranked list being set as an initial state of a list of unassigned entities;

(a) select a subject entity from the list of unassigned entities having highest rank;

(b) assign the subject entity to a selected hardware device in the set of remaining candidates of the subject entity;

(c) remove the selected hardware device from any of the sets of remaining candidates for the entities in the list of unassigned entities in which the selected hardware device is included;

(d) remove the subject entity from the list of unassigned entities; and (e) repeat (a) through (d) until the list of unassigned entities is empty.

18. The system of claim 17, wherein the executable code is further effective to cause the one or more processing devices to perform (b) by selecting the selected hardware device according to entropy, wherein entropy indicates a degree of limitation imposed on the sets of remaining candidates for other entities in the list of unassigned entities resulting from removal of the selected hardware device.

19. The system of claim 18, wherein the executable code is further effective to cause the one or more processing devices to:

(f) after performing (d), when two or more conflicting entities in the list of unassigned entities have conflicting sets of remaining candidates with respect to one another:

evaluate (g) whether releasing an assignment of a previously-assigned entity to a first hardware device in the original candidate lists of one of the two or more conflicting entities but not in the set of remaining candidates resolves a conflict between the two or more conflicting entities;

when (g) is true, release the assignment of the previously-assigned entity to the first hardware device and assigning the one of the two or more conflicting entities to the first hardware device.

20. The system of claim 19, wherein the executable code is further effective to cause the one or more processing devices to:

when (g) is not true:

release the assignment of the previously-assigned entity to the first hardware device;

(h) trade places between the one of the two or more conflicting entities and the previously-assigned entity in the ranked list of entities;

repeat (a) through (f) with respect to the ranked list of entities as modified according to (h).

* * * * *